(12) United States Patent
Richards et al.

(10) Patent No.: US 7,099,367 B2
(45) Date of Patent: Aug. 29, 2006

(54) METHOD AND APPARATUS FOR CONVERTING RF SIGNALS TO BASEBAND

(75) Inventors: James L. Richards, Fayetteville, TN (US); Larry W. Fullerton, Brownsboro, AL (US)

(73) Assignee: Time Domain Corporation, Huntsville, AL (US)

( * ) Notice: Subject to any disclaimer, the term of this patent is extended or adjusted under 35 U.S.C. 154(b) by 692 days.

(21) Appl. No.: 10/173,249

(22) Filed: Jun. 14, 2002

(65) Prior Publication Data

US 2003/0232612 A1    Dec. 18, 2003

(51) Int. Cl.
H04B 1/69 (2006.01)
(52) U.S. Cl. .................................. 375/130; 375/149
(58) Field of Classification Search ............... 375/147, 375/149, 203, 239, 326, 329, 130, 256, 259, 375/316, 349, 355, 367
See application file for complete search history.

(56) References Cited

U.S. PATENT DOCUMENTS

| | | | |
|---|---|---|---|
| 4,641,317 A | 2/1987 | Fullerton | 375/1 |
| 4,743,906 A | 5/1988 | Fullerton | 342/27 |
| 5,345,471 A | 9/1994 | McEwan | 375/1 |
| 5,629,639 A * | 5/1997 | Williams | 327/60 |
| 5,677,927 A * | 10/1997 | Fullerton et al. | 375/130 |
| 5,748,891 A | 5/1998 | Fleming et al. | 375/200 |
| 6,266,518 B1 | 7/2001 | Sorrells et al. | 455/118 |
| 6,421,389 B1 * | 7/2002 | Jett et al. | 375/256 |
| 6,552,677 B1 * | 4/2003 | Barnes et al. | 342/22 |
| 6,630,897 B1 * | 10/2003 | Low et al. | 341/157 |
| 6,909,877 B1 * | 6/2005 | Rofheart et al. | 455/41.2 |
| 6,925,108 B1 * | 8/2005 | Miller et al. | 375/150 |
| 6,937,663 B1 * | 8/2005 | Jett et al. | 375/256 |

* cited by examiner

Primary Examiner—Chieh Fan
Assistant Examiner—Naheed Ejaz
(74) Attorney, Agent, or Firm—Venable LLP; Robert S. Babayi

(57) ABSTRACT

The present invention relates to the conversion of signals from RF to baseband using transition functions, or edge functions. These functions typically transition from positive to negative, or from negative to positive, synchronously with the transition of the received pulse signal, effecting detection essentially by synchronously rectifying a signal cycle of the received pulse, producing a net signal at baseband that can be further processed to detect modulation according to the modulation format. It is further disclosed how to configure these systems for optimal reception with a filter optimized for a given detect signal function. Generalizations of the matched filter embodiment lead to further embodiments employing alternative detection functions. Also disclosed is a two-stage version which applies a decode signal to the rectified signal. This step can be performed by a single correlator or by a plurality of correlators in parallel. Coding methods are disclosed to employ two-stage systems for enhanced channelization, and interference rejection.

18 Claims, 41 Drawing Sheets

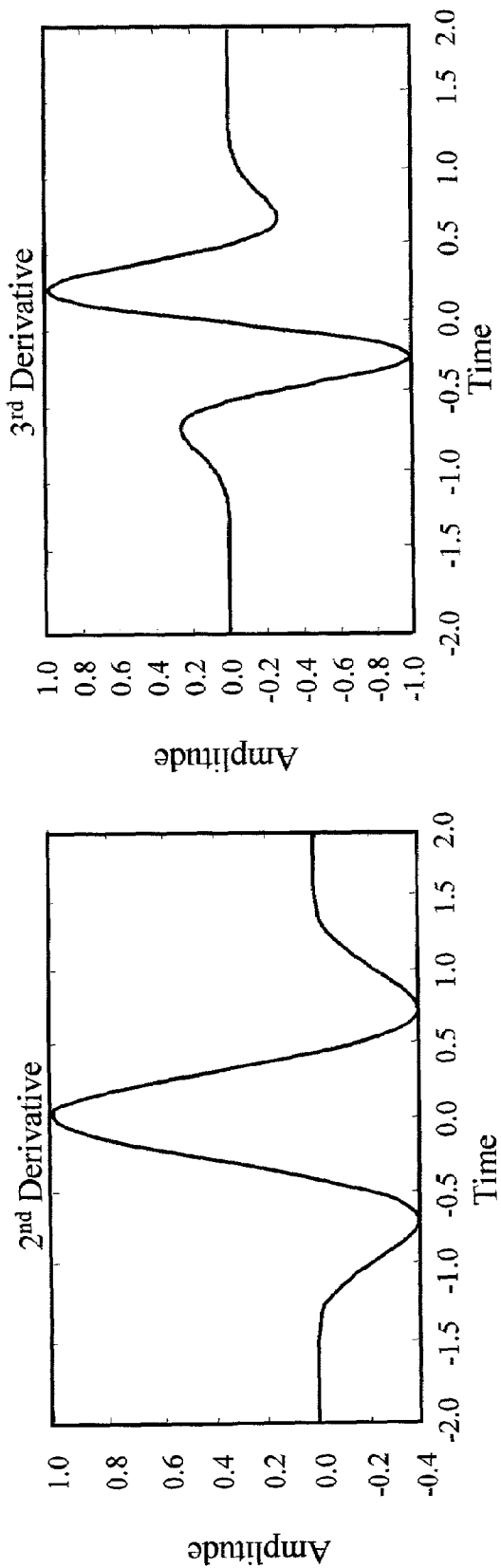

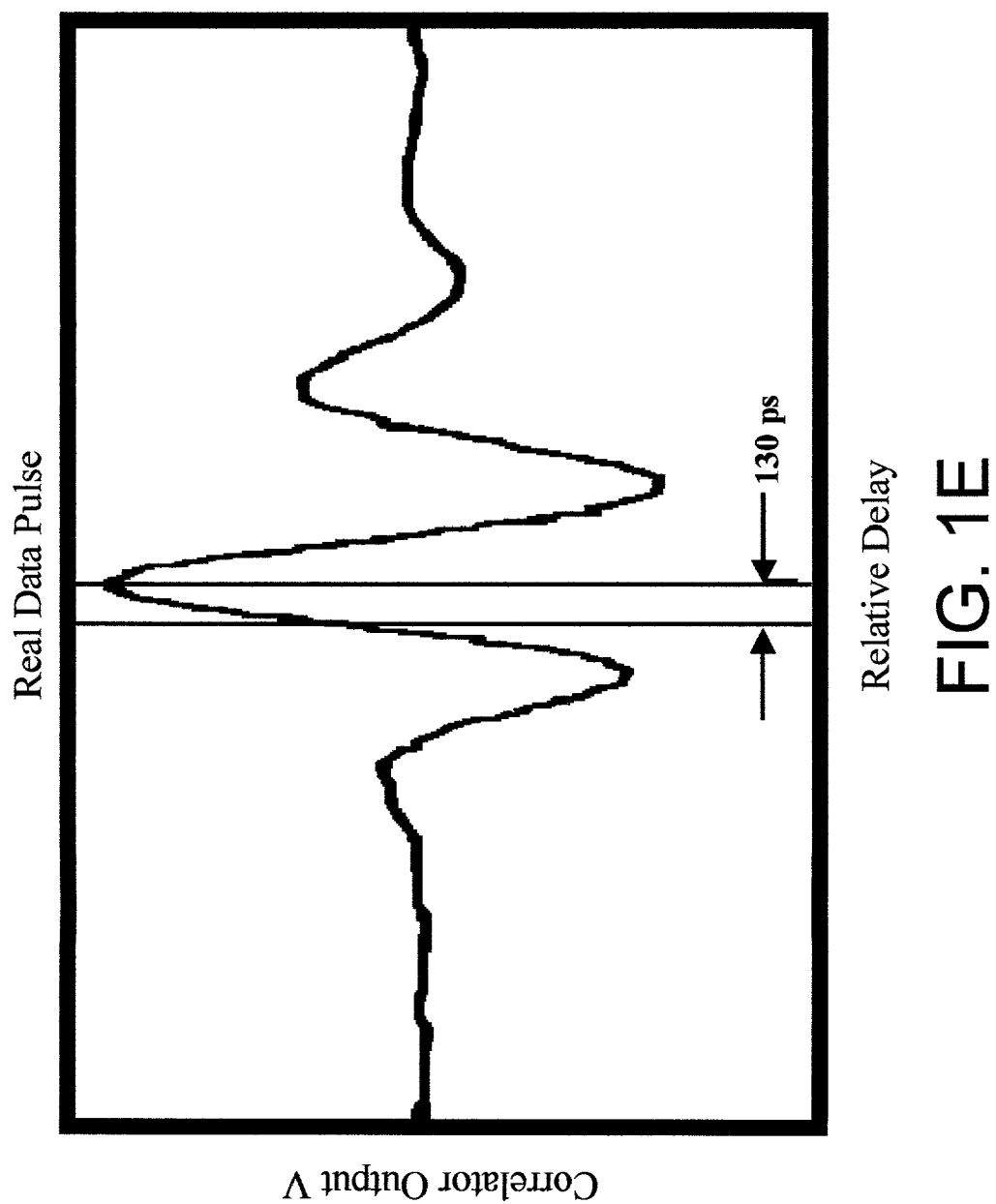

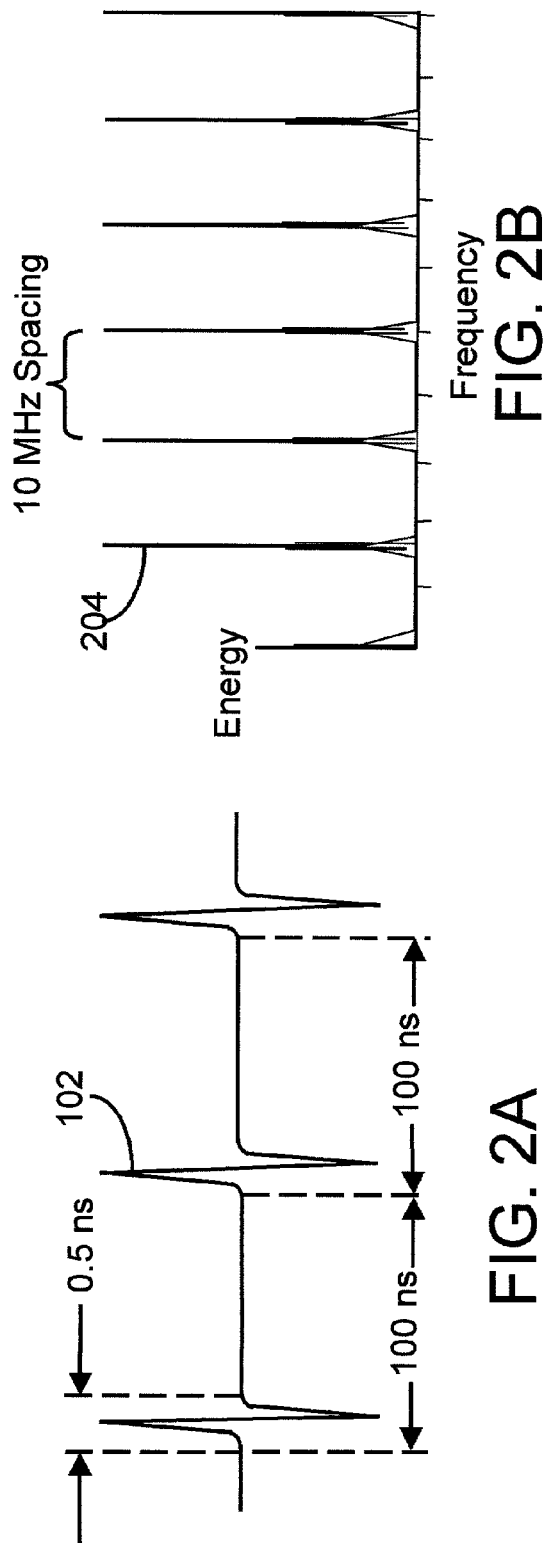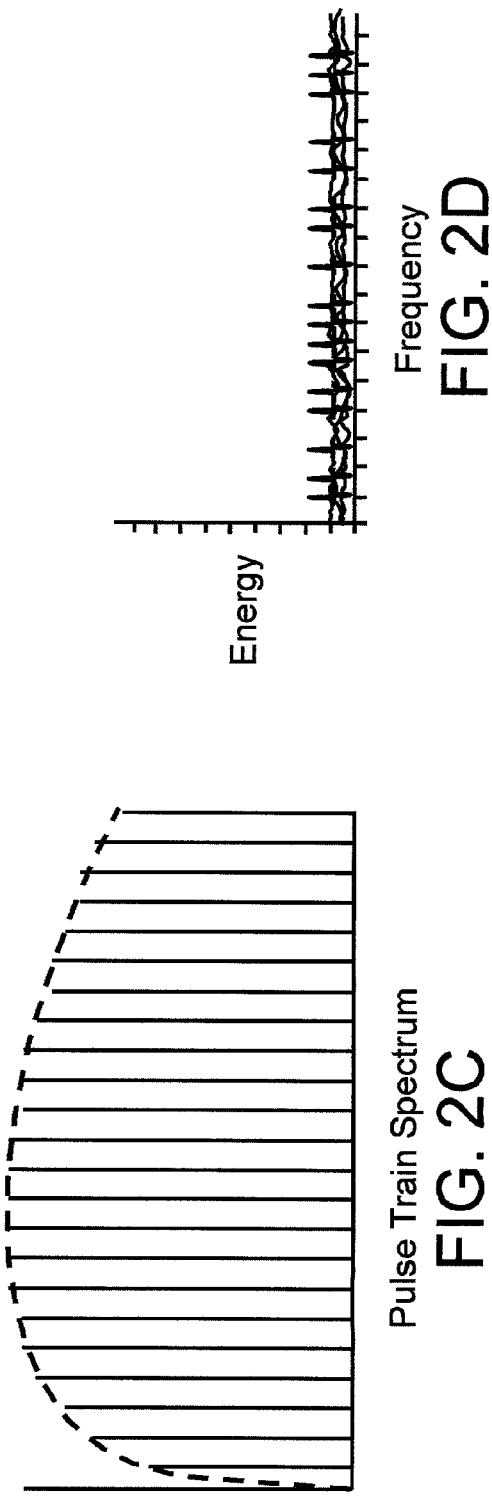

Flip Modulation

One of Many Modulation

Early – Late Modulation

Vector Modulation

Quad Flip Modulation

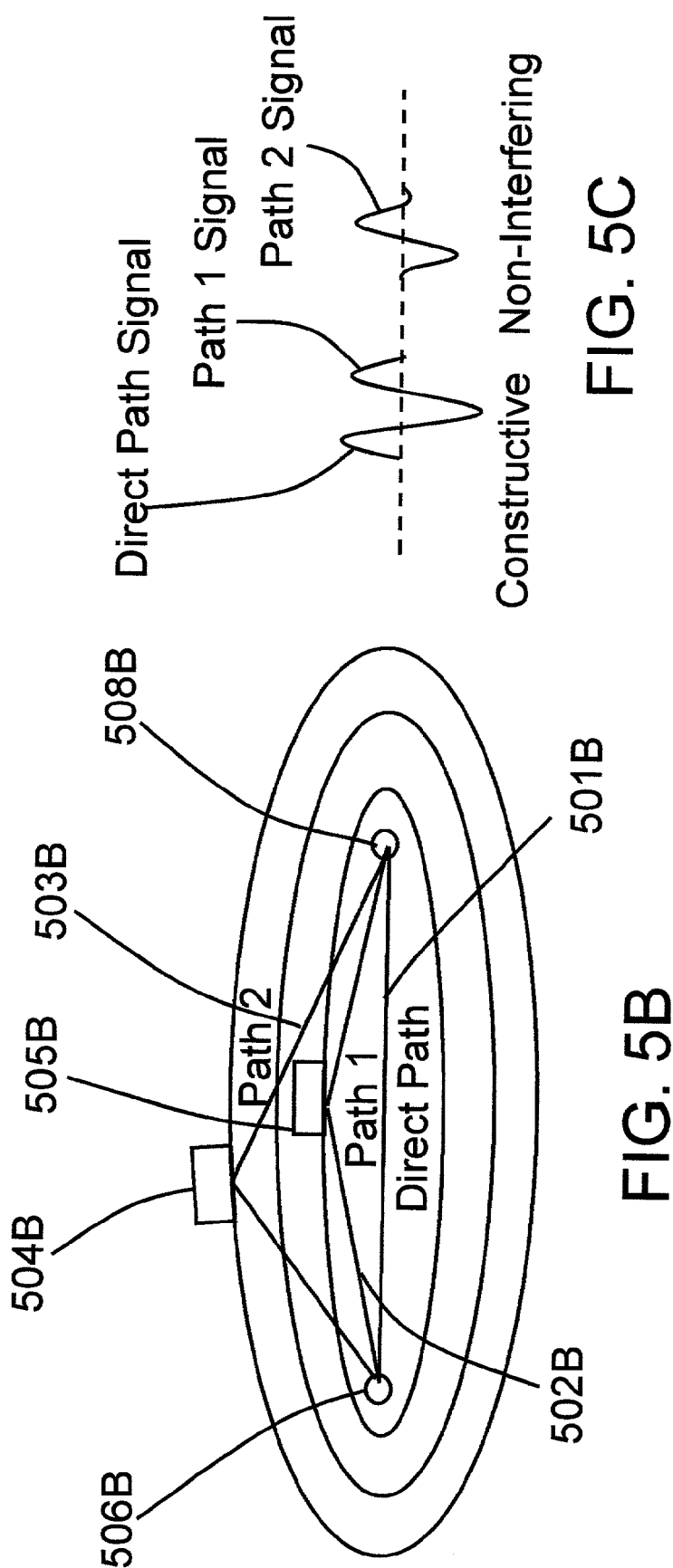

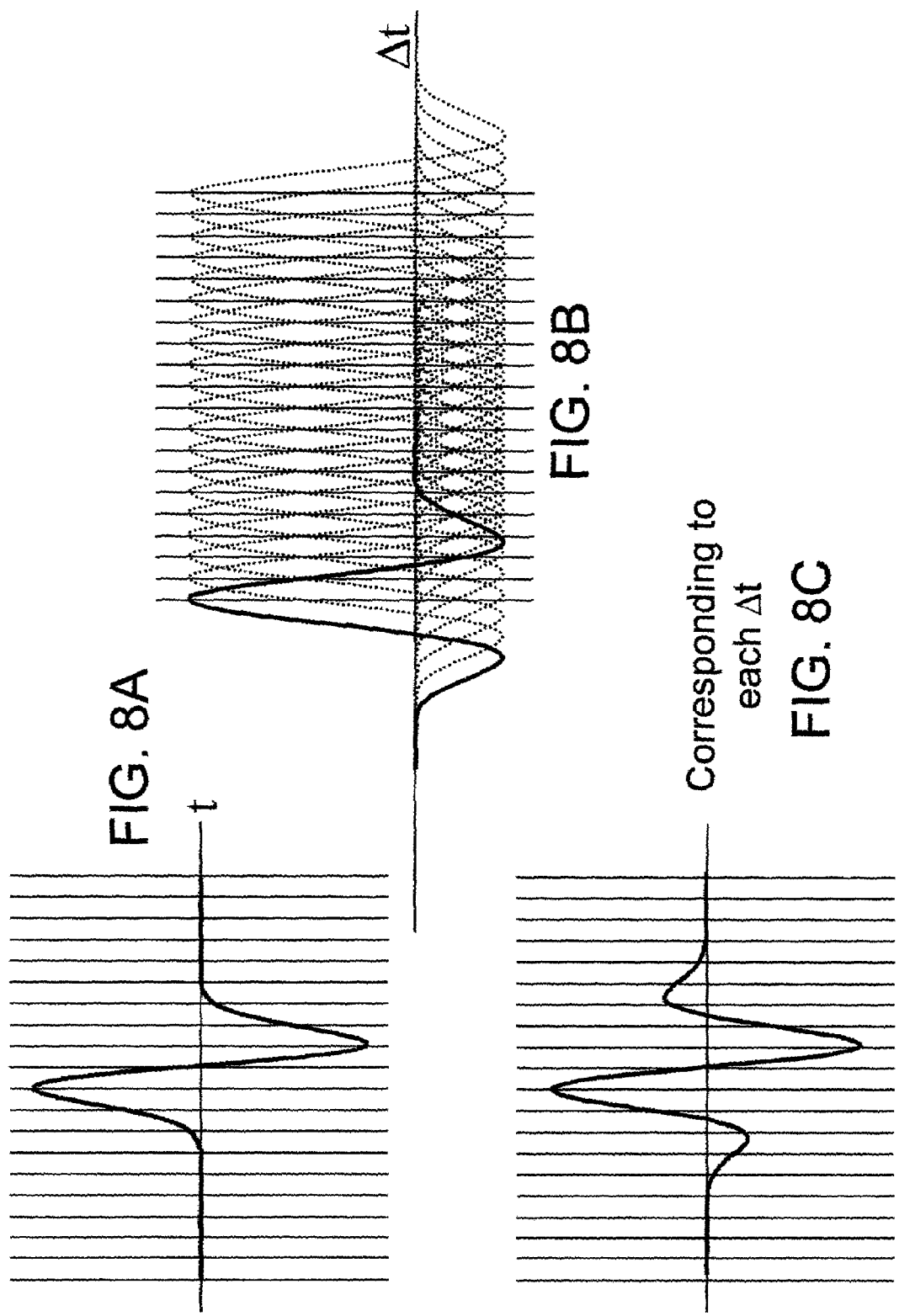

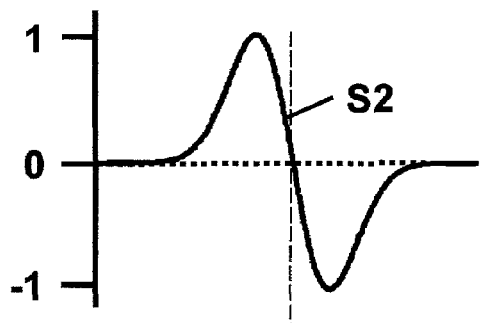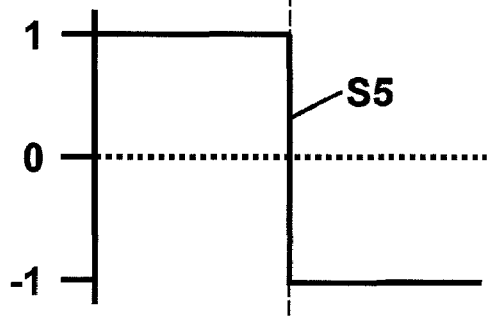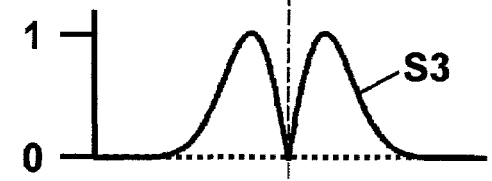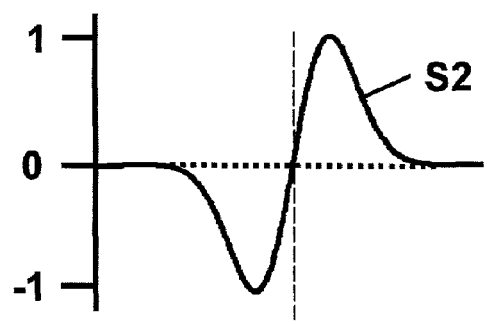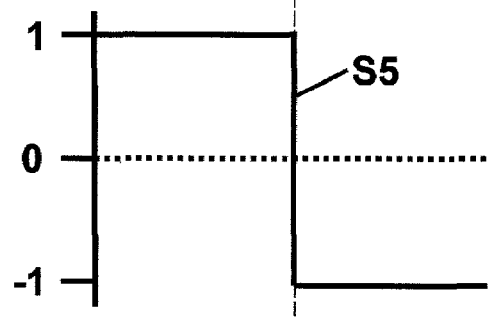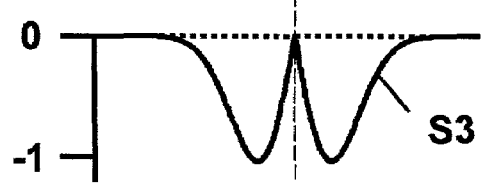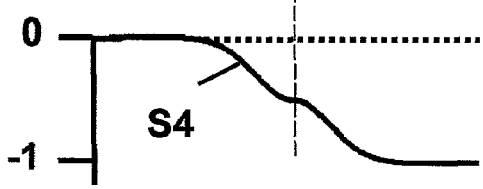
FIG. 9A   FIG. 9B

METHOD AND APPARATUS FOR CONVERTING RF SIGNALS TO BASEBAND

BACKGROUND

In the field of ultra wideband transmission, there have been numerous methods devised to convert the radio frequency (RF) signal to baseband for further demodulation. One method uses a template pulse, a pulse similar to that of the received pulsed, generated within the receiver, correlated with, or simply multiplied with the received pulse and integrated to increase signal-to-noise ratio. Another example of this method is the transmit reference method which uses a delayed version of the received pulse as the template pulse. Another method correlates a sampling, or gating, pulse with the received. Impulse radios often use coherent detection methods, e.g., synchronous mixing of received pulses with gating pulses (also referred to as sampling pulses) or template pulses, along with integration of the output, to convert pulsed signals to base band. Gating pulses or template pulses are used as mixing pulses in order to increase pulse strength prior to integration. Typically, the mixing pulses are applied such that the template pulses substantially coincide with the peak of the received pulses.

A problem with these methods arises, however. The template and/or gating pulses are typically 150 picoseconds or less. For gigapulse transmission rates, the system must resample within 1 nanosecond. The template pulse generator, and correlator are iteratively powered and unpowered during this process resulting in two edges required for each conversion. These two edges must be carefully timed relative to one another and must have a rapid transition rate for high data rate systems. In addition, re-energizing the detection circuitry takes some appreciable amount of time and, thus creates inherent data latency. Current timing circuitry has difficulty responding to such a timing demand.

The time required to re-energize the detection circuitry at the sample rate places a limit on the achievable data rate. This is particularly relevant to high data rate systems, which tend to rely on high-chip rates to advance the data stream. High chipping rate systems are often preferred for very high data rate or high channel capacity systems. In these systems, events (pulses, clocks, samples, etc.) occur in rapid succession. Each event requires a settling time before a new event can occur without undue coupling from one to the next. Circuitry implementing these methods tends to be unduly complex and because of the amount of components involved, results in limits on the minimum size of devices employing this technology.

Thus, a new method for converting RF signals to baseband is required that requires less complex circuitry yet enables high chipping rates. In addition, an apparatus employing this method is needed.

SUMMARY OF THE INVENTION

Accordingly, the present invention is a method and apparatus that overcomes these and other problems associated with the current technology. The method comprises the steps of converting received RF signals which are in the form of pulses to rectified pulses by applying to the pulses a detect signal comprised of a sequence of detecting transitions such that the transitions are precisely timed to occur at or about a zero crossing of each pulse. The rectified pulses are then integrated to obtain a baseband signal.

A further embodiment of the method uses transitions that are substantially instantaneous.

A further embodiment applies to the rectified pulses a decode signal.

Another embodiment creates optimized detecting transitions by designing a detect signal function M(f) generator such that $$M(f) = \frac{S(f)H(f)}{|H(f)|^2}$$

where S(f) is a received signal in the frequency domain and H(f) is a filter response in the frequency domain. A variation of this method integrates or differentiates the detect function M(f) or the filter response H(f).

A further embodiment uses a detect signal comprised of both detecting transitions and non-detecting transitions.

An apparatus employing the method is described comprising an antenna, and a detect signal generator which provides a detect signal comprised of precisely timed detecting transitions to a multiplier such that the detecting transitions occur substantially coincident with zero crossings of received pulses. The output of the multiplier is provided to a short term integrator. The detect signal generator comprises a code source, a timing generator and a transition generator.

Another embodiment of this apparatus further comprises a decode signal generator providing a decode signal to a second multiplier or correlator which is responsive to the first multiplier.

Another embodiment of the invention incorporates a filter having a response H(f), such that $$H(f) \neq \begin{cases} e^{-2\pi f t} S(f), \\ 1 \end{cases}$$

where S(f) is a received signal, f is frequency and t is time, and wherein said detect signal generator has an output, M(f), such that $$M(f) = \frac{S(f)H(f)}{|H(f)|^2}.$$

A variation of this apparatus incorporates a integrator and/or a differentiator responsive the filter and the detect signal generator respectively.

Another embodiment of the invention comprises one or more correlators responsive to the first multiplier and responsive to a decode signal generator.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 1C represents the second derivative of a Gaussian pulse;

FIG. 1D represents the third derivative of the Gaussian pulse;

FIG. 1E represents the Correlator Output vs. the Relative Delay of a measured pulse signal;

FIG. 2A illustrates a pulse train comprising pulses as in FIG. 1A;

FIG. 2B illustrates the frequency domain amplitude of the waveform of FIG. 2A;

FIG. 2C illustrates the pulse train spectrum;

FIG. 2D is a plot of the Frequency vs. Energy;

FIG. 5B depicts a typical geometrical configuration giving rise to multipath received signals;

FIG. 5C illustrates exemplary multipath signals in the time domain;

FIG. 8A illustrates a representative received pulse signal at the input to the correlator;

FIG. 8B illustrates a sequence of representative impulse signals in the correlation process;

FIG. 8C illustrates the output of the correlator for each of the time offsets of FIG. 8B.

FIGS. 9A and 9B illustrate the operation of the present invention using an exemplary set of waveforms;

FIGS. 18, 18A–C illustrate exemplary code sequences for use with the present invention.

DETAILED DESCRIPTION OF THE EMBODIMENTS

Overview of the Invention

Figures 1A, 1B:
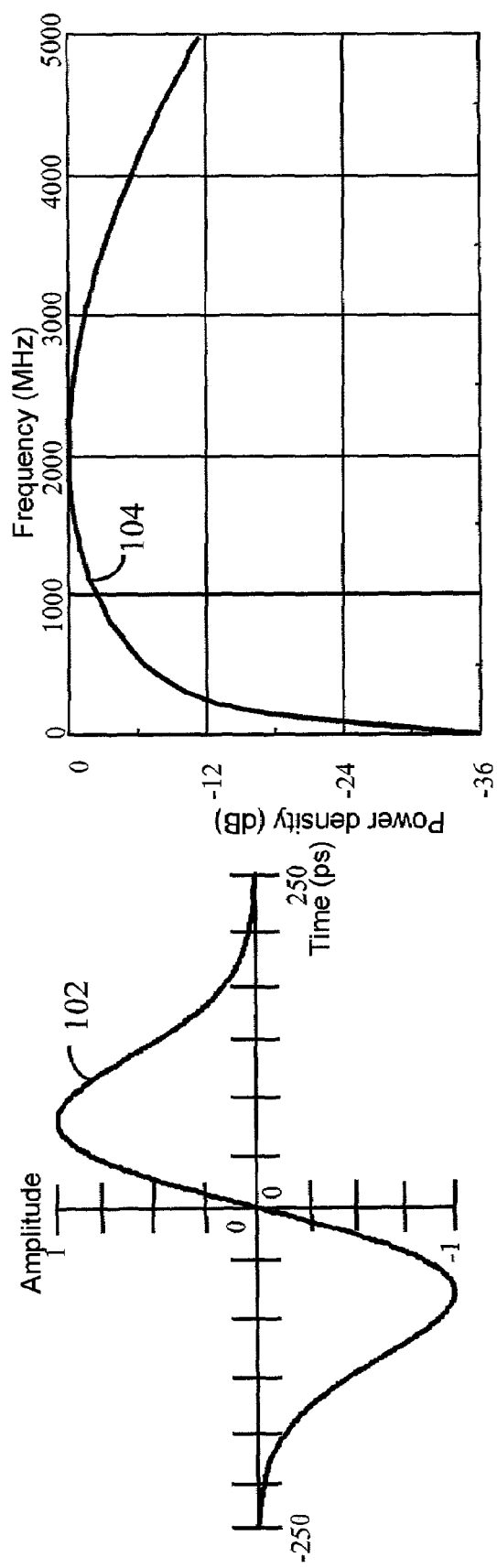
FIG. 1A illustrates a representative Gaussian Monocycle waveform in the time domain.
FIG. 1B illustrates the frequency domain amplitude of the Gaussian Monocycle of FIG. 1A.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in art. Like numbers refer to like elements throughout.

Ultra Wideband Technology Overview

Ultra Wideband is an emerging RF technology with significant benefits in communications, radar, positioning and sensing applications. Earlier this year (2002), the Federal Communications Commission (FCC) recognized these potential benefits to the consumer and issued the first rulemaking enabling the commercial sale and use of products based on Ultra Wideband technology in the United States of America. The FCC adopted a definition of Ultra Wideband to be a signal that occupies a fractional bandwidth of at least 0.25, or 1.5 GHz bandwidth at any center frequency. The 0.25 fractional bandwidth is more precisely defined as:

$$FBW = \frac{2(f_h - f_l)}{f_h + f_l},$$

where FBW is the fractional bandwidth, $f_h$ is the upper band edge and $f_l$ is the lower band edge, the band edges being defined as the 10 dB down point in spectral density.

There are many approaches to UWB including impulse radio, direct sequence CDMA, ultra wideband noise radio, direct modulation of ultra high-speed data, and other methods. The present invention has its origin in ultra wideband impulse radio and will have significant application there as well, but it has potential benefit and application beyond impulse radio to other forms of ultra wideband and beyond ultra wideband to conventional radio systems as well. Nonetheless, it is useful to describe the invention in relation to impulse radio to understand the basics and then expand the description to the extensions of the technology.

The following is an overview of impulse radio as an aid in understanding the benefits of the present invention.

Impulse radio has been described in a series of patents, including U.S. Pat. No. 4,641,317 (issued Feb. 3, 1987), U.S. Pat. No. 4,813,057 (issued Mar. 14, 1989), U.S. Pat. No. 4,979,186 (issued Dec. 18, 1990) and U.S. Pat. No. 5,363,108 (issued Nov. 8, 1994) to Larry W. Fullerton. A second generation of impulse radio patents includes U.S. Pat. No. 5,677,927 (issued Oct. 14, 1997), U.S. Pat. No. 5,687,169 (issued Nov. 11, 1997), U.S. Pat. No. 5,764,696 (issued Jun. 9, 1998), and U.S. Pat. No. 5,832,035 (issued Nov. 3, 1998) to Fullerton et al, which are incorporated herein by reference.

Uses of impulse radio systems are described in U.S. patent application Ser. No. 09/332,502, titled, "System and Method for Intrusion Detection using a Time Domain Radar Array" and U.S. patent application Ser. No. 09/332,503, titled, "Wide Area Time Domain Radar Array" both filed on Jun. 14, 1999 both of which are assigned to the assignee of the present invention. The above patent documents are incorporated herein by reference.

This section provides an overview of impulse radio technology and relevant aspects of communications theory. It is provided to assist the reader with understanding the present invention and should not be used to limit the scope of the present invention. It should be understood that the terminology 'impulse radio' is used primarily for historical convenience and that the terminology can be generally interchanged with the terminology 'impulse communications system, ultra-wideband system, or ultra-wideband communication systems'. Furthermore, it should be understood that the described impulse radio technology is generally applicable to various other impulse system applications including but not limited to impulse radar systems and impulse positioning systems. Accordingly, the terminology 'impulse radio' can be generally interchanged with the terminology 'impulse transmission system and impulse reception system.'

Impulse radio refers to a radio system based on short, wide bandwidth pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Many waveforms having very broad, or wide, spectral bandwidth approximate a Gaussian shape to a useful degree.

Impulse radio can use many types of modulation, including amplitude modulation, phase modulation, frequency modulation (including frequency shape and wave shape modulation), time-shift modulation (also referred to as pulse-position modulation or pulse-interval modulation) and M-ary versions of these. In this document, the time-shift modulation method is often used as an illustrative example. However, someone skilled in the art will recognize that alternative modulation approaches may, in some instances, be used instead of or in combination with the time-shift modulation approach.

In impulse radio communications, inter-pulse spacing may be held constant or may be varied on a pulse-by-pulse basis by information, a code, or both. Generally, conventional spread spectrum systems employ codes to spread the normally narrow band information signal over a relatively wide band of frequencies. A conventional spread spectrum receiver correlates these signals to retrieve the original information signal. In impulse radio communications, codes are not typically used for energy spreading because the monocycle pulses themselves have an inherently wide bandwidth. Codes are more commonly used for channelization, energy smoothing in the frequency domain, resistance to interference, and reducing the interference potential to nearby receivers. Such codes are commonly referred to as time-hopping codes or pseudo-noise (PN) codes since their use typically causes inter-pulse spacing to have a seemingly random nature. PN codes may be generated by techniques other than pseudorandom code generation. Additionally, pulse trains having constant, or uniform, pulse spacing are commonly referred to as uncoded pulse trains. A pulse train with uniform pulse spacing, however, may be described by a code that specifies non-temporal, i.e., non-time related, pulse characteristics.

In impulse radio communications utilizing time-shift modulation, information comprising one or more bits of data typically time-position modulates a sequence of pulses. This yields a modulated, coded timing signal that comprises a train of pulses from which a typical impulse radio receiver employing the same code may demodulate and, if necessary, coherently integrate pulses to recover the transmitted information.

The impulse radio receiver is typically a direct conversion receiver with a cross correlator front-end that coherently converts an electromagnetic pulse train of monocycle pulses to a baseband signal in a single stage. The baseband signal is the basic information signal for the impulse radio communications system. A subcarrier may also be included with the baseband signal to reduce the effects of amplifier drift and low frequency noise. Typically, the subcarrier alternately reverses modulation according to a known pattern at a rate faster than the data rate. This same pattern is used to reverse the process and restore the original data pattern just before detection. This method permits alternating current (AC) coupling of stages, or equivalent signal processing, to eliminate direct current (DC) drift and errors from the detection process. This method is described in more detail in U.S. Pat. No. 5,677,927 to Fullerton et al.

Waveforms

Impulse transmission systems are based on short, wide band pulses. Different pulse waveforms, or pulse types, may be employed to accommodate requirements of various applications. Typical ideal pulse types used in analysis include a Gaussian pulse doublet (also referred to as a Gaussian monocycle), pulse triplet, and pulse quadlet as depicted in FIGS. 1A through 1D. An actual received waveform that closely resembles the theoretical pulse quadlet is shown in FIG. 1E. A pulse type may also be a wavelet set produced by combining two or more pulse waveforms (e.g., a doublet/triplet wavelet set), or families of orthogonal wavelets. Additional pulse designs include chirped pulses and pulses with multiple zero crossings, or bursts of cycles. These different pulse types may be produced by methods described in the patent documents referenced above or by other methods understood by one skilled in the art.

For analysis purposes, it is convenient to model pulse waveforms in an ideal manner. For example, the transmitted waveform produced by supplying a step function into an ultra-wideband antenna may be modeled as a Gaussian monocycle. A Gaussian monocycle (normalized to a peak value of 1) may be described by:

$$f_{mono}(t) = \sqrt{e}\left(\frac{t}{\sigma}\right)e^{\frac{-t^2}{2\sigma^2}}$$

where σ is a time scaling parameter, t is time, and e is the natural logarithm base.

Figure 1F:
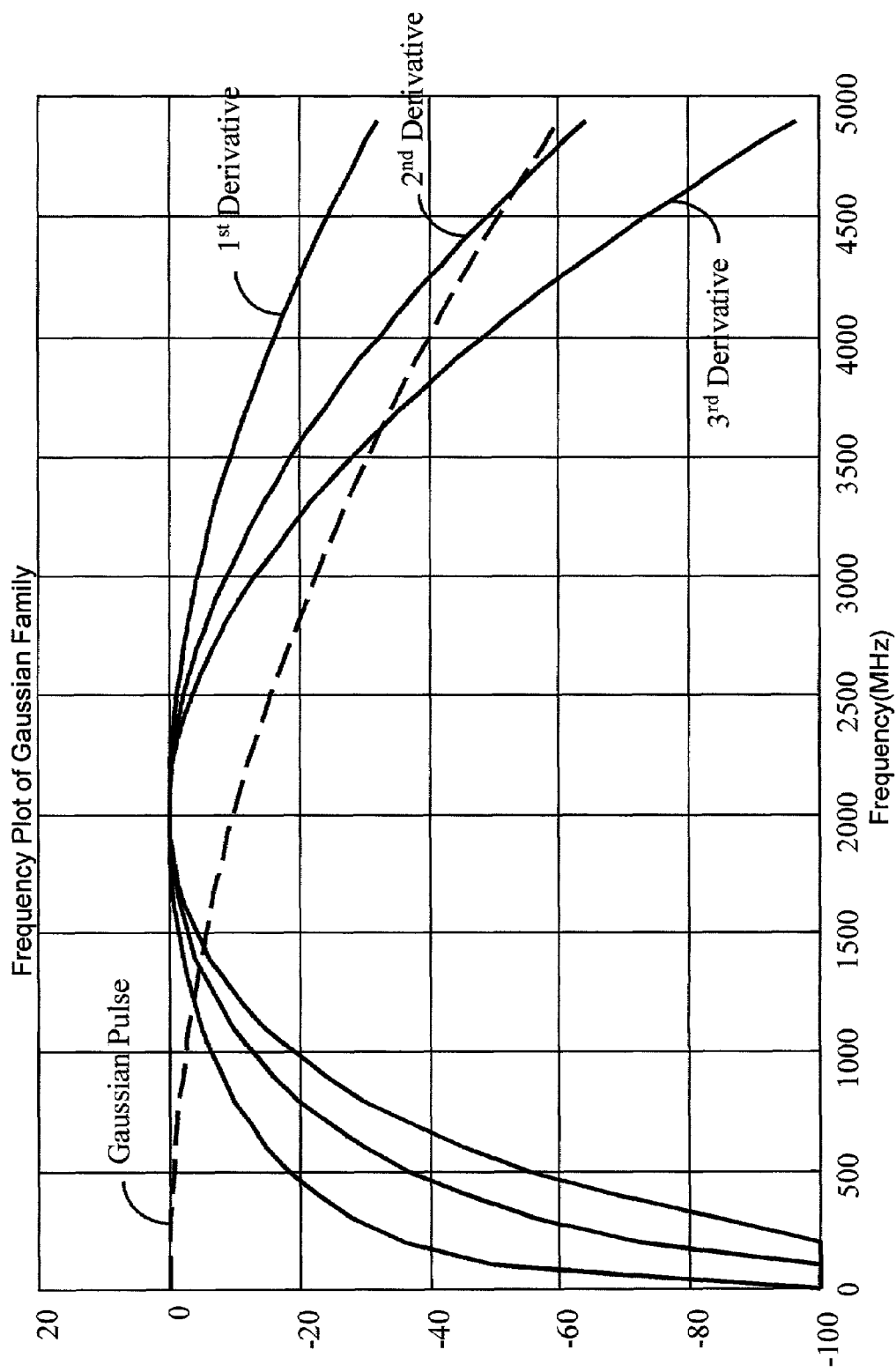
FIG. 1F depicts the frequency domain amplitude of the Gaussian family of the Gaussian Pulse and the first, second, and third derivative.

FIG. 1F shows the power spectral density of the Gaussian pulse, doublet, triplet, and quadlet normalized to a peak density of 1. The normalized doublet (monocycle) is as follows:

$$F_{mono}(f) = j(2\pi)\sqrt{e}\,\sigma f e^{-2(\pi\sigma f)^2}$$

Where $F_{mono}(\ )$ is the Fourier transform of $f_{mono}(\ )$, f is frequency, and j is the imaginary unit. The center frequency ($f_c$), or frequency of peak spectral density, of the Gaussian monocycle is:

$$f_c = \frac{1}{2\pi\sigma}$$

Pulse Trains

Impulse transmission systems may communicate one or more data bits with a single pulse; however, typically each data bit is communicated using a sequence of pulses, known as a pulse train. As described in detail in the following example system, the impulse radio transmitter produces and outputs a train of pulses for each bit of information. FIGS. 2A and 2B are illustrations of the output of a typical 10 megapulses per second (Mpps) system with uncoded, unmodulated pulses, each having a width of 0.5 nanoseconds (ns). FIG. 2A shows a time domain representation of the pulse train output. FIG. 2B illustrates that the result of the pulse train in the frequency domain is to produce a spectrum comprising a set of comb lines spaced at the frequency of the 10 Mpps pulse repetition rate. When the full spectrum is shown, as in FIG. 2C, the envelope of the comb line spectrum corresponds to the curve of the single Gaussian monocycle spectrum in FIG. 1F. For this simple uncoded case, the power of the pulse train is spread among roughly two hundred comb lines. Each comb line thus has a small fraction of the total power and presents much less of an interference problem to a receiver sharing the band. It can also be observed from FIG. 2A that impulse transmission systems may have very low average duty cycles, resulting in average power lower than peak power. The duty cycle of the signal in FIG. 2A is 0.5%, based on a 0.5 ns pulse duration in a 100 ns interval.

The signal of an uncoded, unmodulated pulse train may be expressed:

$$s(t) = a\sum_{i=1}^{n} w(c(t - iT_f), b)$$

where i is the index of a pulse within a pulse train of n pulses, α is pulse amplitude, b is pulse type, c is a pulse width scaling parameter, w(t, b) is the normalized pulse waveform, and $T_f$ is pulse repetition time, also referred to as frame time.

The Fourier transform of a pulse train signal over a frequency bandwidth of interest may be determined by summing the phasors of the pulses for each code time shift, and multiplying by the Fourier transform of the pulse function:

$$S(f) = a\left|\sum_{i=1}^{n} e^{-j2\pi f iT_f}\right| W(f)$$

where S(f) is the amplitude of the spectral response at a given frequency, f is the frequency being analyzed, $T_f$ is the relative time delay of each pulse from the start of time period, W(f) is the Fourier transform of the pulse, w(t,b), and n is the total number of pulses in the pulse train.

A pulse train can also be characterized by its autocorrelation and cross-correlation properties. Autocorrelation properties pertain to the number of pulse coincidences (i.e., simultaneous arrival of pulses) that occur when a pulse train is correlated against an instance of itself that is offset in time. Of primary importance is the ratio of the number of pulses in the pulse train to the maximum number of coincidences that occur for any time offset across the period of the pulse train. This ratio is commonly referred to as the main-lobe-to-peak-side-lobe ratio, where the greater the ratio, the easier it is to acquire and track a signal.

Cross-correlation properties involve the potential for pulses from two different signals simultaneously arriving, or coinciding, at a receiver. Of primary importance are the maximum and average numbers of pulse coincidences that may occur between two pulse trains. As the number of coincidences increases, the propensity for data errors increases. Accordingly, pulse train cross-correlation properties are used in determining channelization capabilities of impulse transmission systems (i.e., the ability to simultaneously operate within close proximity).

Coding

Specialized coding techniques can be employed to specify temporal and/or non-temporal pulse characteristics to produce a pulse train having certain spectral and/or correlation properties. For example, by employing a Pseudo-Noise (PN) code to vary inter-pulse spacing, the energy in the uncoded comb lines presented in FIGS. 2B and 2C can be distributed to other frequencies as depicted in FIG. 2D, thereby decreasing the peak spectral density within a bandwidth of interest. Note that the spectrum retains certain properties that depend on the specific (temporal) PN code used. Spectral properties can be similarly affected by using non-temporal coding (e.g., inverting certain pulses).

Figure 3:
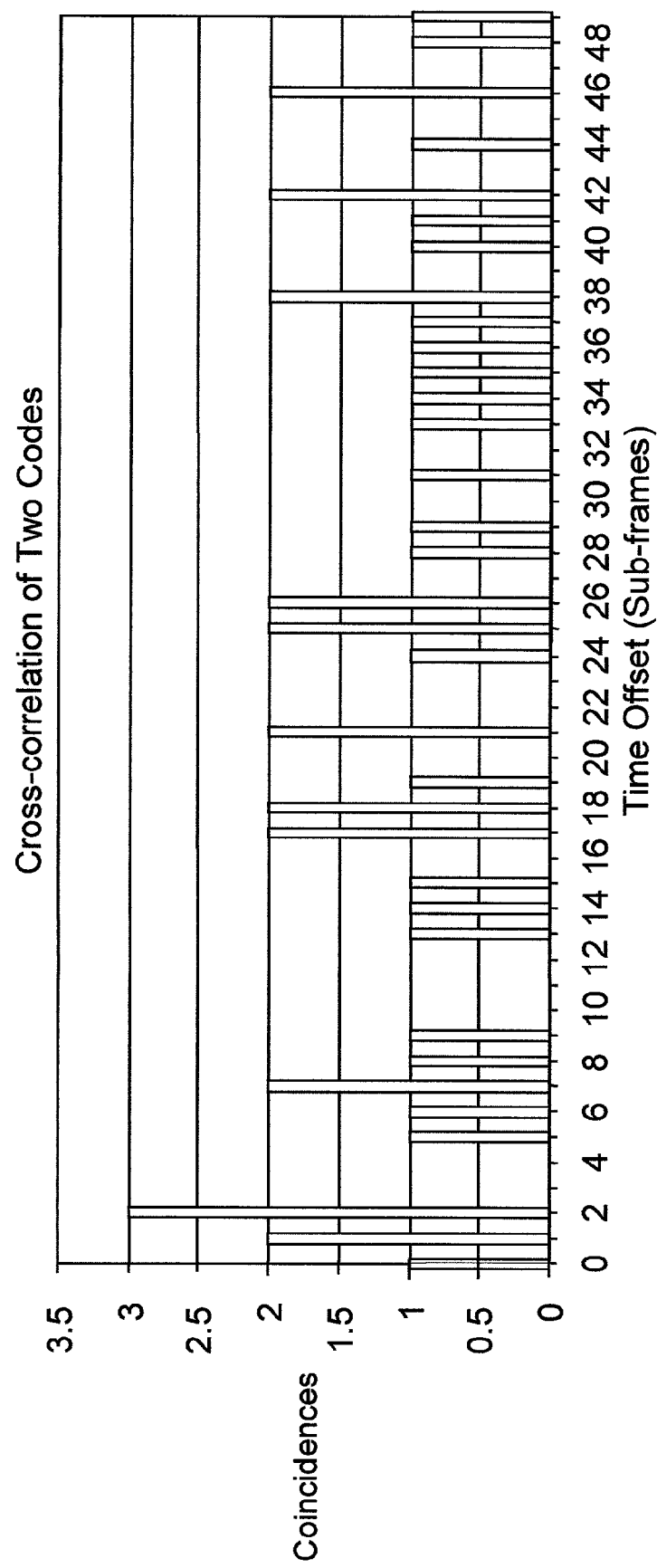
FIG. 3 illustrates the cross-correlation of two codes graphically as Coincidences vs. Time Offset.

Coding provides a method of establishing independent communication channels. Specifically, families of codes can be designed such that the number of pulse coincidences between pulse trains produced by any two codes will be minimal. For example, FIG. 3 depicts cross-correlation properties of two codes that have no more than four coincidences for any time offset. Generally, keeping the number of pulse collisions minimal represents a substantial attenuation of the unwanted signal.

Coding can also be used to facilitate signal acquisition. For example, coding techniques can be used to produce pulse trains with a desirable main-lobe-to-side-lobe ratio. In addition, coding can be used to reduce acquisition algorithm search space.

Coding methods for specifying temporal and non-temporal pulse characteristics are described in commonly owned, co-pending applications titled "A Method and Apparatus for Positioning Pulses in Time," application Ser. No. 09/592,249, and "A Method for Specifying Non-Temporal Pulse Characteristics," application Ser. No. 09/592,250, both filed Jun. 12, 2000, and both of which are incorporated herein by reference.

Typically, a code consists of a number of code elements having integer or floating-point values. A code element value may specify a single pulse characteristic or may be subdivided into multiple components, each specifying a different pulse characteristic. Code element or code component values typically map to a pulse characteristic value layout that may be fixed or non-fixed and may involve value ranges, discrete values, or a combination of value ranges and discrete values. A value range layout specifies a range of values that is divided into components that are each subdivided into subcomponents, which can be further subdivided, as desired. In contrast, a discrete value layout involves uniformly or non-uniformly distributed discrete values. A non-fixed layout (also referred to as a delta layout) involves delta values relative to some reference value. Fixed and non-fixed layouts, and approaches for mapping code element/component values, are described in co-owned, co-pending applications, titled "Method for Specifying Pulse Characteristics using Codes," application Ser. No. 09/592,290 and "A Method and Apparatus for Mapping Pulses to a Non-Fixed Layout," application Ser. No. 09/591,691, both filed on Jun. 12, 2000, both of which are incorporated herein by reference.

A fixed or non-fixed characteristic value layout may include a non-allowable region within which a pulse characteristic value is disallowed. A method for specifying non-allowable regions is described in co-owned, co-pending application titled "A Method for Specifying Non-Allowable Pulse Characteristics," application Ser. No. 09/592,289, filed Jun. 12, 2000, and incorporated herein by reference. A related method that conditionally positions pulses depending on whether code elements map to non-allowable regions is described in co-owned, co-pending application, titled "A Method and Apparatus for Positioning Pulses Using a Layout having Non-Allowable Regions," application Ser. No. 09/592,248 filed Jun. 12, 2000, and incorporated herein by reference.

The signal of a coded pulse train can be generally expressed by:

$$s_{tr}(t) = \sum_i (-1)^{f_i} a_i w(c_i(t - T_i), b_i)$$

where $s_{tr}(t)$ is the coded pulse train signal, i is the index of a pulse within the pulse train, $(-1)^{f_i}$, $a_i$, $b_i$, $c_i$, and $\omega(t,b_i)$ are the coded polarity, pulse amplitude, pulse type, pulse width, and normalized pulse waveform of the i'th pulse, and $T_i$ is the coded time shift of the $i^{th}$ pulse Various numerical code generation methods can be employed to produce codes having certain correlation and spectral properties. Detailed descriptions of numerical code generation techniques are included in a co-owned, co-pending patent application titled "A Method and Apparatus for Positioning Pulses in Time," application Ser. No. 09/592,248, filed Jun. 12, 2000, and incorporated herein by reference.

It may be necessary to apply predefined criteria to determine whether a generated code, code family, or a subset of a code is acceptable for use with a given UWB application. Criteria may include correlation properties, spectral properties, code length, non-allowable regions, number of code family members, or other pulse characteristics. A method for applying predefined criteria to codes is described in co-owned, co-pending application, titled "A Method and Apparatus for Specifying Pulse Characteristics using a Code that Satisfies Predefined Criteria," application Ser. No. 09/592,288, filed Jun. 12, 2000, and incorporated herein by reference.

In some applications, it may be desirable to employ a combination of codes. Codes may be combined sequentially, nested, or sequentially nested, and code combinations may be repeated. Sequential code combinations typically involve switching from one code to the next after the occurrence of some event and may also be used to support multicast communications. Nested code combinations may be employed to produce pulse trains having desirable correlation and spectral properties. For example, a designed code may be used to specify value range components within a layout and a nested pseudorandom code may be used to randomly position pulses within the value range components. With this approach, correlation properties of the designed code are maintained since the pulse positions specified by the nested code reside within the value range components specified by the designed code, while the random positioning of the pulses within the components results in particular spectral properties. A method for applying code combinations is described in co-owned, co-pending application, titled "A Method and Apparatus for Applying Codes Having Pre-Defined Properties," application Ser. No. 09/591,690, filed Jun. 12, 2000, and incorporated herein by reference.

Modulation

Figure 4C:
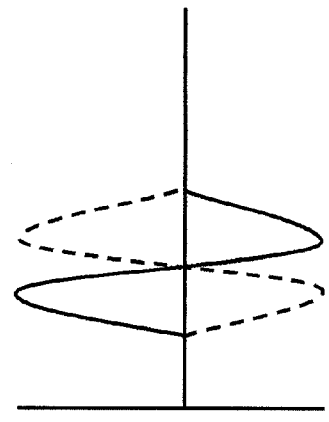
FIGS. 4A–4E illustrate five modulation techniques to include: Early-Late Modulation; One of Many Modulation; Flip Modulation; Quad Flip Modulation; and Vector Modulation.
Figure 4B:
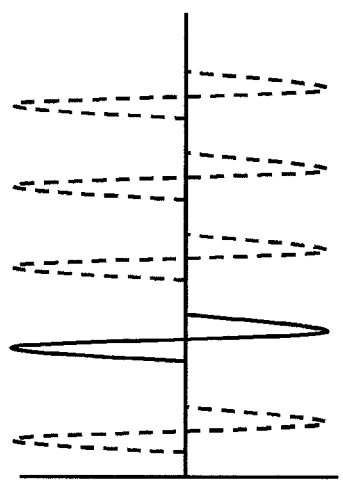
Figure 4A:
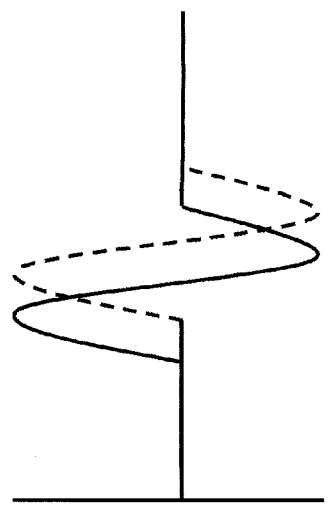

Various aspects of a pulse waveform may be modulated to convey information and to further minimize structure in the resulting spectrum. Amplitude modulation, phase modulation, frequency modulation, time-shift modulation and M-ary versions of these were proposed in U.S. Pat. No. 5,677,927 to Fullerton et al., previously incorporated by reference. Time-shift modulation can be described as shifting the position of a pulse either forward or backward in time relative to a nominal coded (or uncoded) time position in response to an information signal. Thus, each pulse in a train of pulses is typically delayed a different amount from its respective time base clock position by an individual code delay amount plus a modulation time shift. This modulation time shift is normally very small relative to the code shift. In a 10 Mpps system with a center frequency of 2 GHz, for example, the code may command pulse position variations over a range of 100 ns, whereas, the information modulation may shift the pulse position by 150 ps. This two-state 'early-late' form of time shift modulation is depicted in FIG. 4A.

A generalized expression for a pulse train with 'early-late' time-shift modulation over a data symbol time is:

$$s_{tr}(t) = \sum_{i=1}^{N_s} (-1)^{f_i} a_i w(c_i(t - T_i - \delta d_k), b_i)$$

where k is the index of a data symbol (e.g., bit), i is the index of a pulse within the data symbol, $N_s$ is the number of pulses per symbol, $(-1)^{f_i}$ is a coded polarity (flipping) pattern (sequence), $a_i$ is a coded amplitude pattern, $b_i$ is a coded pulse type (shape) pattern, $c_i$ is a coded pulse width pattern, and w(t, $b_i$) is a normalized pulse waveform of the $i^{th}$ pulse, $T_j^i$ is the coded time shift of the i'th pulse, δ is the time shift added when the transmitted symbol is 1 (instead of 0), $d_k$ is the data (i.e., 0 or 1) transmitted by the transmitter. In this example, the data value is held constant over the symbol interval. Similar expressions can be derived to accommodate other proposed forms of modulation.

An alternative form of time-shift modulation can be described as One-of-Many Position Modulation (OMPM). The OMPM approach, shown in FIG. 4B, involves shifting a pulse to one of N possible modulation positions about a nominal coded (or uncoded) time position in response to an information signal, where N represents the number of possible states. For example, if N were four (4), two data bits of information could be conveyed. For further details regarding OMPM, see "Apparatus, System and Method for One-of-Many Position Modulation in an Impulse Radio Communication System," Ser. No. 60/209,857, filed Jun. 7, 2000, assigned to the assignee of the present invention, and incorporated herein by reference.

Figure 4E:
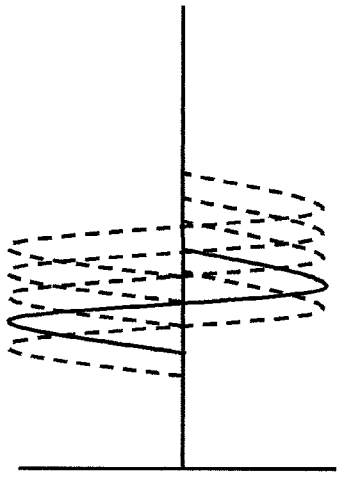
Figure 4D:
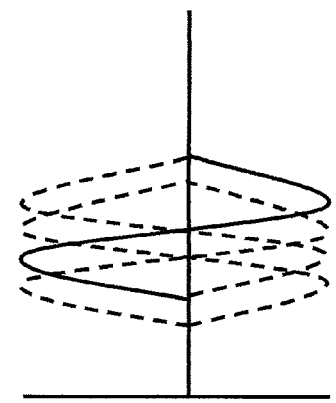

An impulse radio communications system can employ flip modulation techniques to convey information. The simplest flip modulation technique involves transmission of a pulse or an inverted (or flipped) pulse to represent a data bit of information, as depicted in FIG. 4C. Flip modulation techniques may also be combined with time-shift modulation techniques to create two, four, or more different data states. One such flip with shift modulation technique is referred to as Quadrature Flip Time Modulation (QFTM). The QFTM approach is illustrated in FIG. 4D. Flip modulation techniques are further described in patent application titled "Apparatus, System and Method for Flip Modulation in an Impulse Radio Communication System," application Ser. No. 09/537,692, filed Mar. 29, 2000, assigned to the assignee of the present invention, and incorporated herein by reference.

Vector modulation techniques may also be used to convey information. Vector modulation includes the steps of generating and transmitting a series of time-modulated pulses, each pulse delayed by one of at least four pre-determined time delay periods and representative of at least two data bits of information, and receiving and demodulating the series of time-modulated pulses to estimate the data bits associated with each pulse. Vector modulation is shown in FIG. 4E. Vector modulation techniques are further described in patent application titled "Vector Modulation System and Method for Wideband Impulse Radio Communications," application Ser. No. 09/169,765, filed Dec. 9, 1999, assigned to the assignee of the present invention, and incorporated herein by reference.

Reception and Demodulation

Impulse radio systems operating within close proximity to each other may cause mutual interference. While coding minimizes mutual interference, the probability of pulse collisions increases as the number of coexisting impulse radio systems rises. Additionally, various other signals may be present that cause interference. Impulse radios can operate in the presence of mutual interference and other interfering signals, in part because they typically do not depend on receiving every transmitted pulse. Except for single pulse per bit systems, impulse radio receivers perform a correlating, synchronous receiving function (at the RF level) that uses sampling and combining, or integration, of many pulses to recover transmitted information. Typically, 1 to 1000 or more pulses are integrated to yield a single data bit thus diminishing the impact of individual pulse collisions, where the number of pulses that must be integrated to successfully recover transmitted information depends on a number of variables including pulse rate, bit rate, range and interference levels.

Interference Resistance

Besides providing channelization and energy smoothing, coding makes impulse radios highly resistant to interference by enabling discrimination between intended impulse transmissions and interfering transmissions. This property is desirable since impulse radio systems must share the energy spectrum with conventional radio systems and with other impulse radio systems.

Figure 5A:
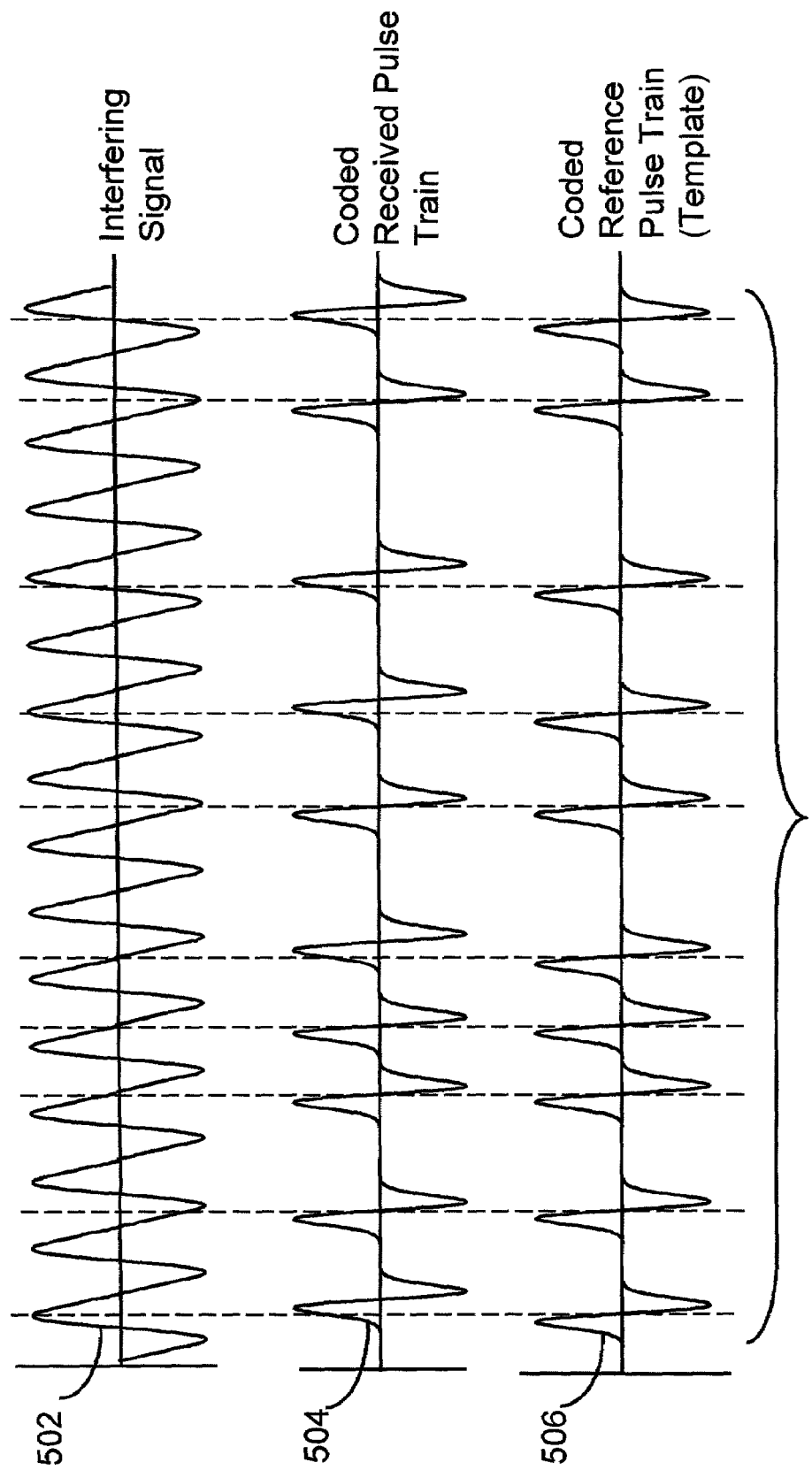
FIG. 5A illustrates representative signals of an interfering signal, a coded received pulse train and a coded reference pulse train.

FIG. 5A illustrates the result of a narrow band sinusoidal interference signal 502 overlaying an impulse radio signal 504. At the impulse radio receiver, the input to the cross correlation would include the narrow band signal 502 and the received ultrawide-band impulse radio signal 504. The input is sampled by the cross correlator using a template signal 506 positioned in accordance with a code. Without coding, the cross correlation would sample the interfering signal 502 with such regularity that the interfering signals could cause interference to the impulse radio receiver. However, when the transmitted impulse signal is coded and the impulse radio receiver template signal 506 is synchronized using the identical code, the receiver samples the interfering signals non-uniformly. The samples from the interfering signal add incoherently, increasing roughly according to the square root of the number of samples integrated. The impulse radio signal samples, however, add coherently, increasing directly according to the number of samples integrated. Thus, integrating over many pulses overcomes the impact of interference.

Processing Gain

Impulse radio systems have exceptional processing gain due to their wide spreading bandwidth. For typical spread spectrum systems, the definition of processing gain, which quantifies the decrease in channel interference when wideband communications are used, is the ratio of the bandwidth of the channel to the bit rate of the information signal. For example, a conventional narrow band direct sequence spread spectrum system with a 10 kbps data rate and a 10 MHz spread bandwidth yields a processing gain of 1000, or 30 dB. However, far greater processing gains are achieved by impulse radio systems, where the same 10 kbps data rate is spread across a much greater 2 GHz spread bandwidth, resulting in a theoretical processing gain of 200,000, or 53 dB.

Capacity

It can be shown theoretically, using signal-to-noise arguments, that for an impulse radio system with an information rate of a few tens of kbps, thousands of simultaneous channels could be available as a result of its exceptional processing gain.

The average output signal-to-noise ratio of a reference impulse radio receiver may be calculated for randomly selected time-hopping codes as a function of the number of active users, $N_u$, as:

$$S_{out}(N_u) = \cfrac{1}{\cfrac{1}{S_{out}(1)} + \cfrac{1}{N_s}\cfrac{\sigma_a^2}{m_p^2}\sum_{k=2}^{N_u}\left(\cfrac{A_k}{A_1}\right)}$$

where $N_s$ is the number of pulses integrated per bit of information, $A_1$ is the received amplitude of the desired transmitter, $A_k$ is the received amplitude of interfering transmitter k's signal at the reference receiver, and $$\sigma_{rec}^2$$

is the variance of the receiver noise component at the pulse train integrator output in the absence of an interfering transmitter. The waveform-dependent parameters $m_p$ and $\sigma_a^2$ are given by $$m_p = \int_{-\infty}^{\infty} w(t)[w(t) - w(t-\delta)]dt$$

and $$\sigma_a^2 = T_f^{-1} \int_{-\infty}^{\infty} \left[ \int_{-\infty}^{\infty} w(t-s)v(t)dt \right]^2 ds,$$

and where w(t) is the transmitted waveform, $\upsilon(t)=w(t)-w(t-\delta)$ is the template signal waveform, $\delta$ is the modulation time shift between a digital one and a zero value data bit, $T_f$ is the pulse repetition time, or frame time, and s is an integration parameter. The output signal to noise ratio that one might observe in the absence of interference is given by:

$$S_{out}(1) = \frac{(A_1 N_s m_p)^2}{\sigma_{rec}^2}$$

Where, $$\sigma_{rec}^2$$

is the variance of the receiver noise component at the pulse train integrator output in the absence of an interfering transmitter. Further details of this analysis can be found in R. A. Scholtz, "Multiple Access with Time-Hopping Impulse Modulation," Proc. MILCOM, Boston, Mass., Oct. 11–14, 1993.

Multipath and Propagation

One of the advantages of impulse radio is its resistance to multipath fading effects. Conventional narrow band systems are subject to multipath through the Rayleigh fading process, where the signals from many delayed reflections combine at the receiver antenna according to their seemingly random relative phases resulting in possible summation or possible cancellation, depending on the specific propagation to a given location. Multipath fading effects are most adverse where a direct path signal is weak relative to multipath signals, which represents a substantial portion of the potential coverage area of a typical radio system. In a mobile system, received signal strength fluctuates due to the changing mix of multipath signals that vary as the mobile units position varies relative to fixed transmitters, other mobile transmitters and signal-reflecting surfaces in the environment.

Impulse radios, however, can be substantially resistant to multipath effects. Impulses arriving from delayed multipath reflections typically arrive outside of the correlation time and, thus, may be ignored. This process is described in detail with reference to FIGS. 5B and 5C. FIG. 5B illustrates a typical multipath situation, such as in a building, where there are many reflectors 504B, 505B. In this figure, a transmitter 506B transmits a signal that propagates along three paths, the direct path 501B, path 1 502B, and path2 503B, to a receiver 508B, where the multiple reflected signals are combined at the antenna. The direct path 501B, representing the straight-line distance between the transmitter and receiver, is the shortest. Path 1 502B represents a multipath reflection with a distance very close to that of the direct path. Path 2 503B represents a multipath reflection with a much longer distance. Also shown are elliptical (or, in space, ellipsoidal) traces that represent other possible locations for reflectors that would produce paths having the same distance and thus the same time delay.

FIG. 5C illustrates the received composite pulse waveform resulting from the three propagation paths 501B, 502B, and 503B shown in FIG. 5B. In this figure, the direct path signal 501B is shown as the first pulse signal received. The path 1 and path 2 signals 502B, 503B comprise the remaining multipath signals, or multipath response, as illustrated. The direct path signal is the reference signal and represents the shortest propagation time. The path 1 signal is delayed slightly and overlaps and enhances the signal strength at this delay value. The path 2 signal is delayed sufficiently that the waveform is completely separated from the direct path signal. Note that the reflected waves are reversed in polarity. If the correlator template signal is positioned such that it will sample the direct path signal, the path 2 signal will not be sampled and thus will produce no response. However, it can be seen that the path 1 signal has an effect on the reception of the direct path signal since a portion of it would also be sampled by the template signal. Generally, multipath signals delayed less than one quarter wave (one quarter wave is about 1.5 inches, or 3.5 cm at 2 GHz center frequency) may attenuate the direct path signal. This region is equivalent to the first Fresnel zone in narrow band systems. Impulse radio, however, has no further nulls in the higher Fresnel zones. This ability to avoid the highly variable attenuation from multipath gives impulse radio significant performance advantages.

Figure 5D:
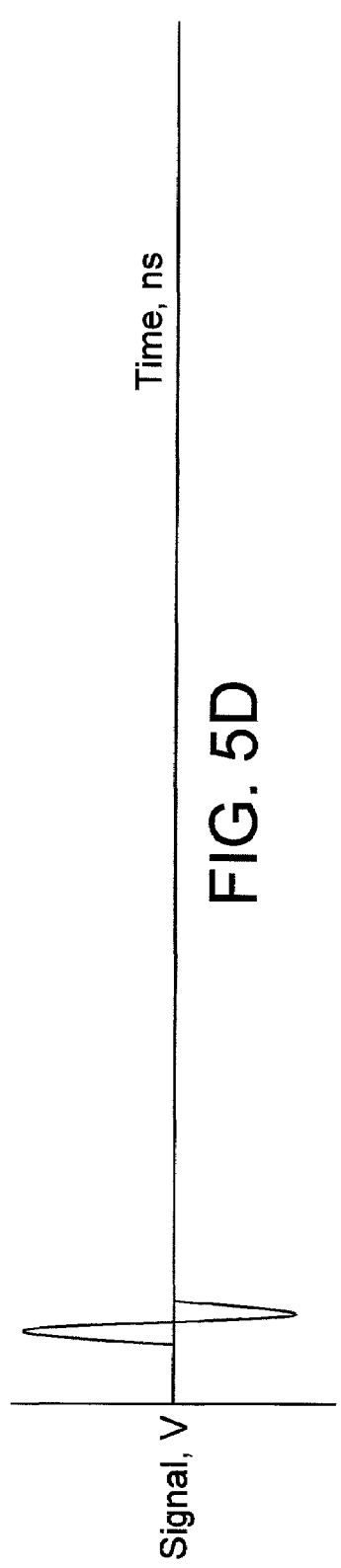
FIGS. 5D–5F illustrate a signal plot of various multipath environments.
Figure 5E:
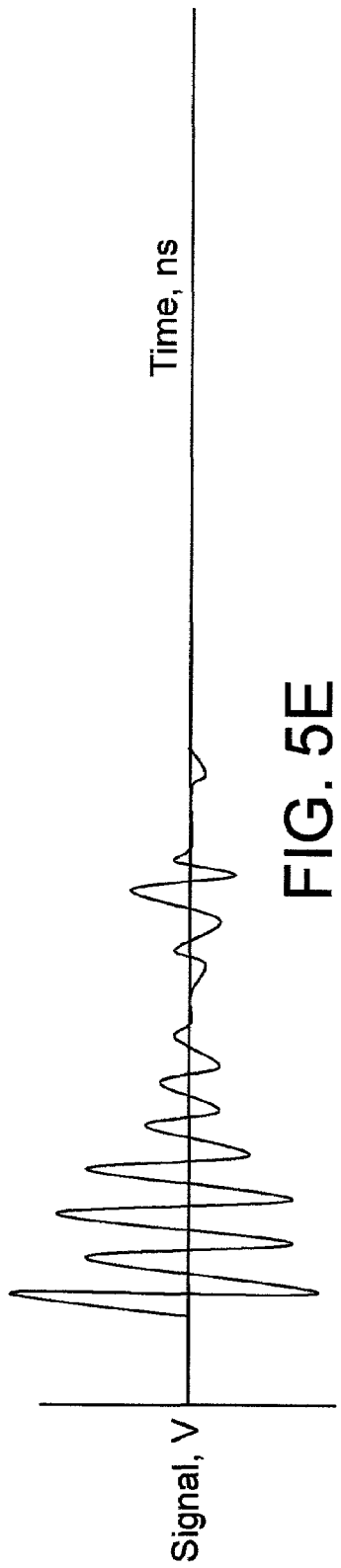
Figure 5F:
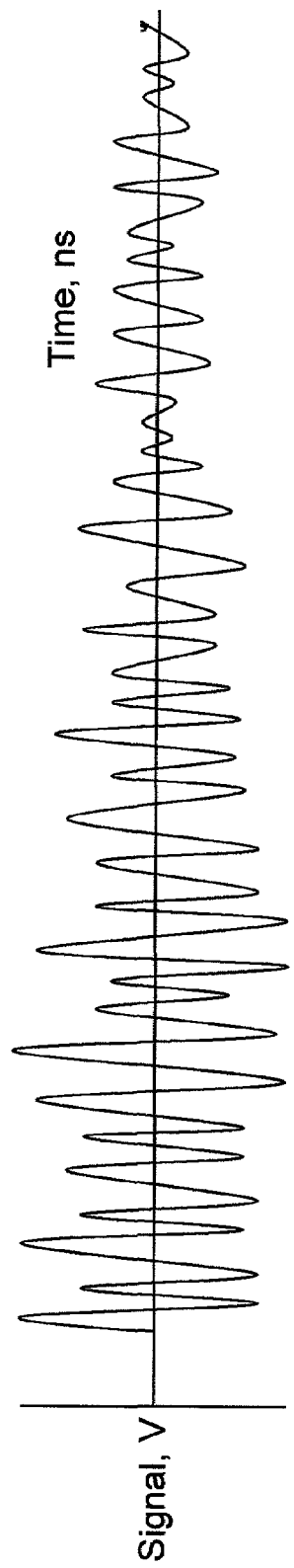

FIGS. 5D, 5E, and 5F represent the received signal from a TM-UWB transmitter in three different multipath environments. These figures are approximations of typical signal plots. FIG. 5D illustrates the received signal in a very low multipath environment. This may occur in a building where the receiver antenna is in the middle of a room and is a relatively short, distance, for example, one meter, from the transmitter. This may also represent signals received from a larger distance, such as 100 meters, in an open field where there are no objects to produce reflections. In this situation, the predominant pulse is the first received pulse and the multipath reflections are too weak to be significant. FIG. 5E illustrates an intermediate multipath environment. This approximates the response from one room to the next in a building. The amplitude of the direct path signal is less than in FIG. 5D and several reflected signals are of significant amplitude. FIG. 5F approximates the response in a severe multipath environment such as propagation through many rooms, from corner to corner in a building, within a metal cargo hold of a ship, within a metal truck trailer, or within an intermodal shipping container. In this scenario, the main path signal is weaker than in FIG. 5E. In this situation, the direct path signal power is small relative to the total signal power from the reflections.

An impulse radio receiver can receive the signal and demodulate the information using either the direct path signal or any multipath signal peak having sufficient signal-to-noise ratio. Thus, the impulse radio receiver can select the strongest response from among the many arriving signals. In order for the multipath signals to cancel and produce a null at a given location, dozens of reflections would have to be cancelled simultaneously and precisely while blocking the direct path, which is a highly unlikely scenario. This time separation of multipath signals together with time resolution and selection by the receiver permit a type of time diversity that virtually eliminates cancellation of the signal. In a multiple correlator rake receiver, performance is further improved by collecting the signal power from multiple signal peaks for additional signal-to-noise performance.

Figure 5G:
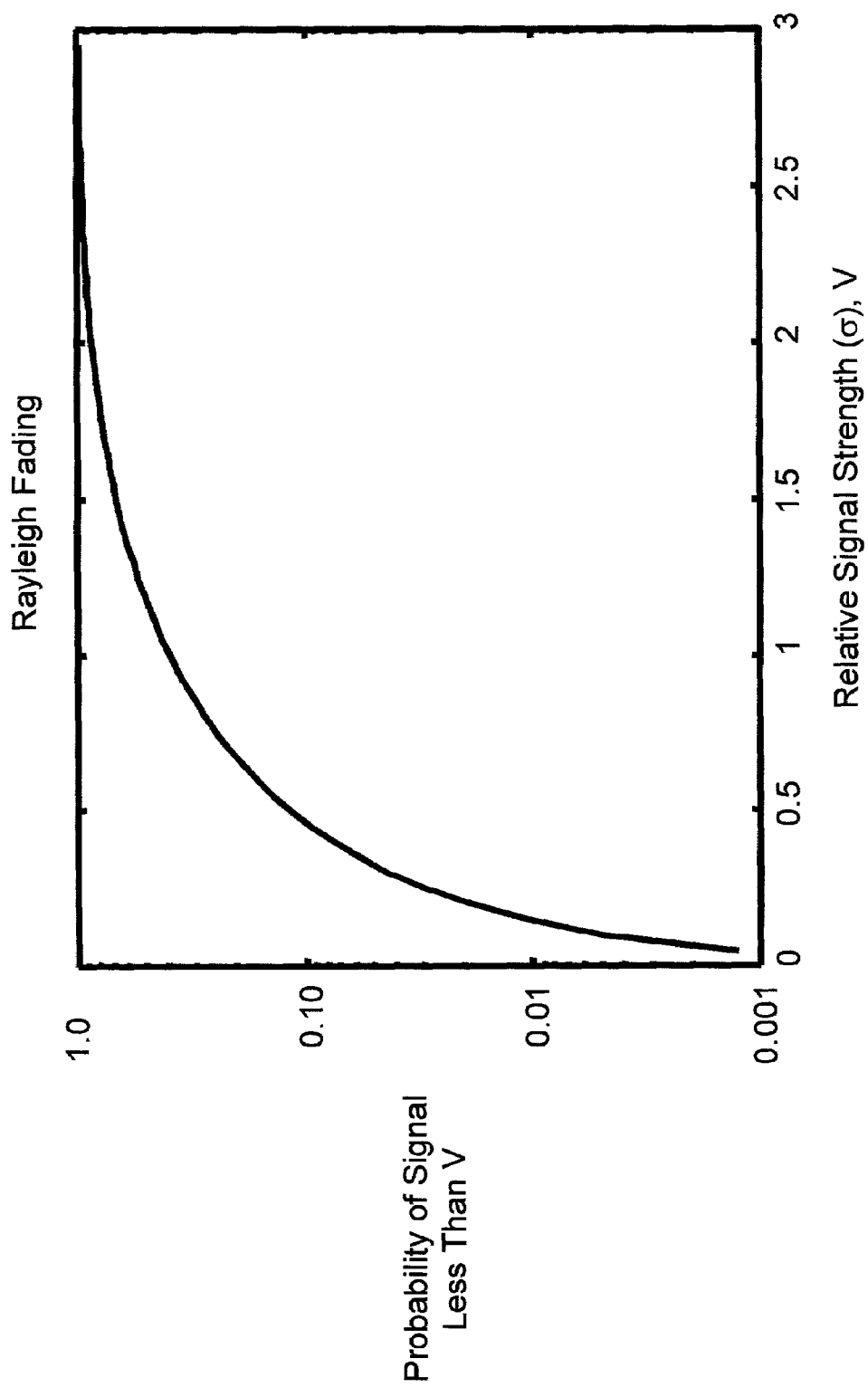
FIG. 5G illustrates the Rayleigh fading curve associated with non-impulse radio transmissions in a multipath environment.

In a narrow band system subject to a large number of multipath reflections within a symbol (bit) time, the received signal is essentially a sum of a large number of sine waves of random amplitude and phase. In the idealized limit, the resulting envelope amplitude has been shown to follow a Rayleigh probability density as follows:

$$p(r) = \frac{r}{\sigma^2} \exp\left(\frac{-r^2}{2\sigma^2}\right)$$

where r is the envelope amplitude of the combined multipath signals, and $2\sigma^2$ is the expected value of the envelope power of the combined multipath signals. The Rayleigh distribution curve in FIG. 5G shows that 10% of the time, the signal is more than 10 dB attenuated. This suggests that a 10 dB fade margin is needed to provide 90% link reliability. Values of fade margin from 10 dB to 40 dB have been suggested for various narrow band systems, depending on the required reliability. Although multipath fading can be partially improved by such techniques as antenna and frequency diversity, these techniques result in additional complexity and cost.

Figure 5H:
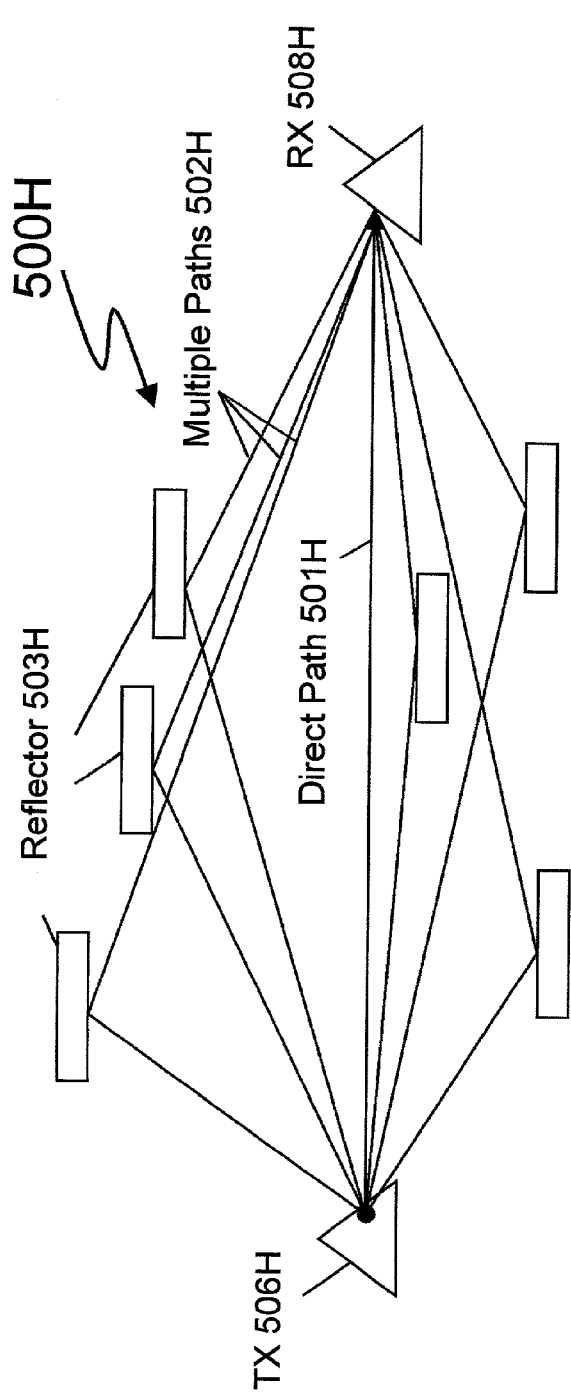
FIG. 5H illustrates a plurality of multipaths with a plurality of reflectors from a transmitter to a receiver.
Figure 5I:
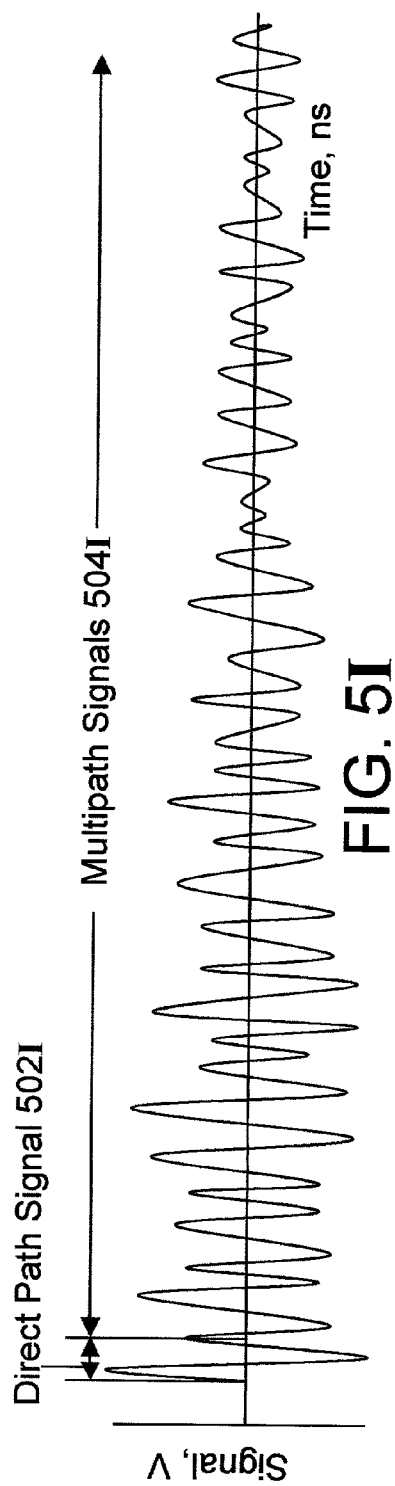
FIG. 5I graphically represents signal strength as volts vs. time in a direct path and multipath environment.

In a high multipath environment such as inside homes, offices, warehouses, automobiles, trailers, shipping containers, or outside in an urban canyon or in other situations where the propagation is such that the received signal is primarily scattered energy, impulse radio systems can avoid the Rayleigh fading mechanism that limits performance of narrow band systems, as illustrated in FIGS. 5H and 5I. FIG. 5H depicts an impulse radio system in a high multipath environment 500H consisting of a transmitter 506H and a receiver 508H. A transmitted signal follows a direct path 501H and reflects off of reflectors 503H via multiple paths 502H. FIG. 5I illustrates the combined signal received by the receiver 508H over time with the vertical axis being signal strength in volts and the horizontal axis representing time in nanoseconds. The direct path 501H results in the direct path signal 502I while the multiple paths 502H result in multipath signals 504I. UWB system can thus resolve the reflections into separate time intervals which can be received separately. Thus, the UWB system can select the strongest or otherwise most desirable reflection from among the numerous reflections. This yields a multipath diversity mechanism with numerous paths making it highly resistant to Rayleigh fading. Whereas, in a narrow band systems, the reflections arrive within the minimum time resolution of one bit or symbol time which results in a single vector summation of the delayed signals with no inherent diversity.

Distance Measurement and Positioning

Impulse systems can measure distances to relatively fine resolution because of the absence of ambiguous cycles in the received waveform. Narrow band systems, on the other hand, are limited to the modulation envelope and cannot easily distinguish precisely which RF cycle is associated with each data bit because the cycle-to-cycle amplitude differences are so small they are masked by link or system noise. Since an impulse radio waveform has minimal multi-cycle ambiguity, it is feasible to determine waveform position to less than a wavelength in the presence of noise. This time position measurement can be used to measure propagation delay to determine link distance to a high degree of precision. For example, 30 ps of time transfer resolution corresponds to approximately centimeter distance resolution. See, for example, U.S. Pat. No. 6,133,876, issued Oct. 17, 2000, titled "System and Method for Position Determination by Impulse Radio," and U.S. Pat. No. 6,111,536, issued Aug. 29, 2000, titled "System and Method for Distance Measurement by Inphase and Quadrature Signals in a Radio System," both of which are incorporated herein by reference.

In addition to the methods articulated above, impulse radio technology in a Time Division Multiple Access (TDMA) radio system can achieve geo-positioning capabilities to high accuracy and fine resolution. This geo-positioning method is described in co-owned, co-pending application titled "System and Method for Person or Object Position Location Utilizing Impulse Radio," application Ser. No. 09/456,409, filed Dec. 8, 1999, and incorporated herein by reference.

Power Control

Power control systems comprise a first transceiver that transmits an impulse radio signal to a second transceiver. A power control update is calculated according to a performance measurement of the signal received at the second transceiver. The transmitter power of either transceiver, depending on the particular setup, is adjusted according to the power control update. Various performance measurements are employed to calculate a power control update, including bit error rate, signal-to-noise ratio, and received signal strength, used alone or in combination. Interference is thereby reduced, which may improve performance where multiple impulse radios are operating in close proximity and their transmissions interfere with one another. Reducing the transmitter power of each radio to a level that produces satisfactory reception increases the total number of radios that can operate in an area without mutial interference. Reducing transmitter power can also increase transceiver efficiency.

For greater elaboration of impulse radio power control, see patent application titled "System and Method for Impulse Radio Power Control," application Ser. No. 09/332,501, filed Jun. 14, 1999, assigned to the assignee of the present invention, and incorporated herein by reference.

Exemplary Transceiver Implementation

Transmitter

Figures 6, 7:
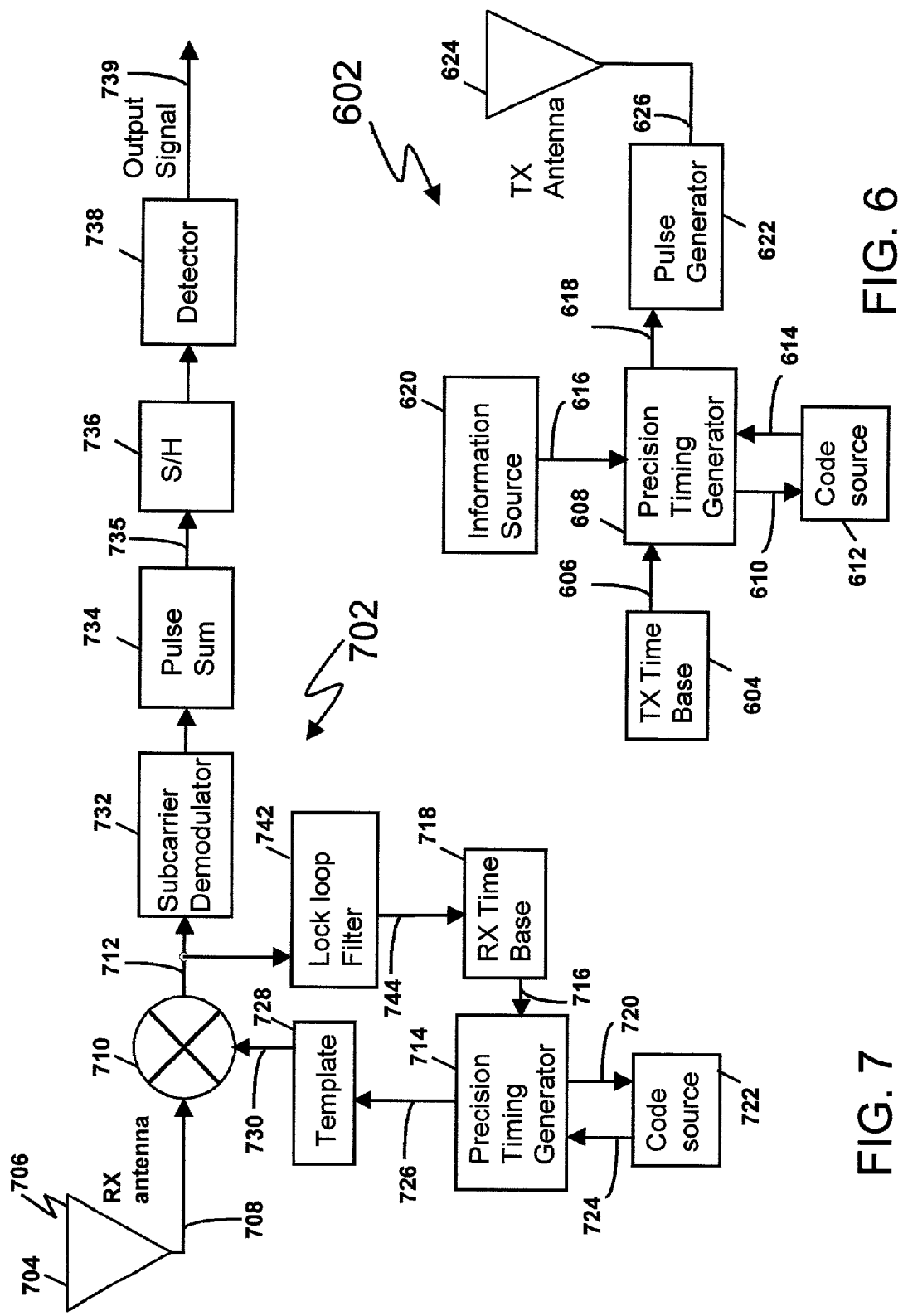
FIG. 6 illustrates a representative impulse radio transmitter functional diagram.
FIG. 7 illustrates a representative impulse radio receiver functional diagram.

An exemplary embodiment of an impulse radio transmitter 602 of an impulse radio communication system having an optional subcarrier channel will now be described with reference to FIG. 6.

The transmitter 602 comprises a time base 604 that generates a periodic timing signal 606. The time base 604 typically comprises a voltage controlled oscillator (VCO), or the like, having a high timing accuracy and low jitter. The control voltage to adjust the VCO center frequency is set at calibration to the desired center frequency used to define the transmitter's nominal pulse repetition rate. The periodic timing signal 606 is supplied to a precision timing generator 608.

The precision timing generator 608 supplies synchronizing signals 610 to the code source 612 and utilizes the code source output 614, together with an optional, internally generated subcarrier signal, and an information signal 616, to generate a modulated, coded timing signal 618.

An information source 620 supplies the information signal 616 to the precision timing generator 608. The information signal 616 can be any type of intelligence, including digital bits representing voice, data, imagery, or the like, analog signals, or complex signals.

A pulse generator 622 uses the modulated, coded timing signal 618 as a trigger signal to generate output pulses. The output pulses are provided to a transmit antenna 624 via a transmission line 626 coupled thereto. The output pulses are converted into propagating electromagnetic pulses by the transmit antenna 624. The electromagnetic pulses (also called the emitted signal) propagate to an impulse radio receiver 702, such as shown in FIG. 7, through a propagation medium. In a preferred embodiment, the emitted signal is wide-band or ultrawide-band, approaching a monocycle pulse as in FIG. 1B. However, the emitted signal may be spectrally modified by filtering of the pulses, which may cause them to have more zero crossings (more cycles) in the time domain, requiring the radio receiver to use a similar waveform as the template signal for efficient conversion.

Receiver

An exemplary embodiment of an impulse radio receiver (hereinafter called the receiver) for the impulse radio communication system is now described with reference to FIG. 7.

The receiver 702 comprises a receive antenna 704 for receiving a propagated impulse radio signal 706. A received signal 708 is input to a cross correlator or sampler 710, via a receiver transmission line, coupled to the receive antenna 704. The cross correlation 710 produces a baseband output 712.

The receiver 702 also includes a precision timing generator 714, which receives a periodic timing signal 716 from a receiver time base 718. This time base 718 may be adjustable and controllable in time, frequency, or phase, as required by the lock loop in order to lock on the received signal 708. The precision timing generator 714 provides synchronizing signals 720 to the code source 722 and receives a code control signal 724 from the code source 722. The precision timing generator 714 utilizes the periodic timing signal 716 and code control signal 724 to produce a coded timing signal 726. The template generator 728 is triggered by this coded timing signal 726 and produces a train of template signal pulses 730 ideally having waveforms substantially equivalent to each pulse of the received signal 708. The code for receiving a given signal is the same code utilized by the originating transmitter to generate the propagated signal. Thus, the timing of the template pulse train matches the timing of the received signal pulse train, allowing the received signal 708 to be synchronously sampled in the correlator 710. The correlator 710 preferably comprises a multiplier followed by a short term integrator to sum the multiplier product over the pulse interval.

The output of the correlator 710 may be coupled to an optional subcarrier demodulator 732, which demodulates the subcarrier information signal from the optional subcarrier, when used. The purpose of the optional subcarrier process, when used, is to move the information signal away from DC (zero frequency) to improve immunity to low frequency noise and offsets. The output of the subcarrier demodulator is then filtered or integrated in the pulse summation stage 734. A digital system embodiment is shown in FIG. 7. In this digital system, a sample and hold 736 samples the output 735 of the pulse summation stage 734 synchronously with the completion of the summation of a digital bit or symbol. The output of sample and hold 736 is then compared with a nominal zero (or reference) signal output in a detector stage 738 to provide an output signal 739 representing the digital state of the output voltage of sample and hold 736.

The baseband signal 712 is also input to a lowpass filter 742 (also referred to as lock loop filter 742). A control loop comprising the lowpass filter 742, time base 718, precision timing generator 714, template generator 728, and correlator 710 is used to maintain proper timing between the received signal 708 and the template. The loop error signal 744 is processed by the loop filter to provide adjustments to the adjustable time base 718 to correct the relative time position of the periodic timing signal 726 for best reception of the received signal 708.

In a transceiver embodiment, substantial economy can be achieved by sharing part or all of several of the functions of the transmitter 602 and receiver 702. Some of these include the time base 718, precision timing generator 714, code source 722, antenna 704, and the like.

FIGS. 8A–8C illustrate the cross correlation process and the correlation function. FIG. 8A shows the waveform of a template signal. FIG. 8B shows the waveform of a received impulse radio signal at a set of several possible time offsets. FIG. 8C represents the output of the cross correlator for each of the time offsets of FIG. 8B. For any given pulse received, there is a corresponding point that is applicable on this graph. This is the point corresponding to the time offset of the template signal used to receive that pulse. Further examples and details of precision timing can be found described in U.S. Pat. No. 5,677,927, and commonly owned co-pending application application Ser. No. 09/146,524, filed Sep. 3, 1998, titled "Precision Timing Generator System and Method," both of which are incorporated herein by reference.

Because of the unique nature of impulse radio receivers, several modifications have been recently made to enhance system capabilities. Modifications include the utilization of multiple correlators to measure the impulse response of a channel to the maximum communications range of the system and to capture information on data symbol statistics. Further, multiple correlators enable rake pulse correlation techniques, more efficient acquisition and tracking implementations, various modulation schemes, and collection of time-calibrated pictures of received waveforms. For greater elaboration of multiple correlator techniques, see patent application titled "System and Method of using Multiple Correlator Receivers in an Impulse Radio System", application Ser. No. 09/537,264, filed Mar. 29, 2000, assigned to the assignee of the present invention, and incorporated herein by reference.

Methods to improve the speed at which a receiver can acquire and lock onto an incoming impulse radio signal have been developed. In one approach, a receiver includes an adjustable time base to output a sliding periodic timing signal having an adjustable repetition rate and a decode timing modulator to output a decode signal in response to the periodic timing signal. The impulse radio signal is cross-correlated with the decode signal to output a baseband signal. The receiver integrates T samples of the baseband signal and a threshold detector uses the integration results to detect channel coincidence. A receiver controller stops sliding the time base when channel coincidence is detected. A counter and extra count logic, coupled to the controller, are configured to increment or decrement the address counter by one or more extra counts after each T pulses is reached in order to shift the code modulo for proper phase alignment of the periodic timing signal and the received impulse radio signal. This method is described in more detail in U.S. Pat. No. 5,832,035 to Fullerton, incorporated herein by reference.

In another approach, a receiver obtains a template pulse train and a received impulse radio signal. The receiver compares the template pulse train and the received impulse radio signal. The system performs a threshold check on the comparison result. If the comparison result passes the threshold check, the system locks on the received impulse radio signal. The system may also perform a quick check, a synchronization check, and/or a command check of the impulse radio signal. For greater elaboration of this approach, see the patent application titled "Method and System for Fast Acquisition of Ultra Wideband Signals," application Ser. No. 09/538,292, filed Mar. 29, 2000, assigned to the assignee of the present invention, and incorporated herein by reference.

A receiver has been developed that includes a baseband signal converter device and combines multiple converter circuits and an RF amplifier in a single integrated circuit package. For greater elaboration of this receiver, see the patent application titled "Baseband Signal Converter for a Wideband Impulse Radio Receiver," application Ser. No. 09/356,384, filed Jul. 16, 1999, assigned to the assignee of the present invention, and incorporated herein by reference.

Edge-Based Signal Detection

Process Overview

The basic principle of operation of the present invention will now be described with reference to a system block diagram and its representative waveforms. These principles will then be applied to single, dual, and multiple multiplier embodiments of the invention.

Figure 20:
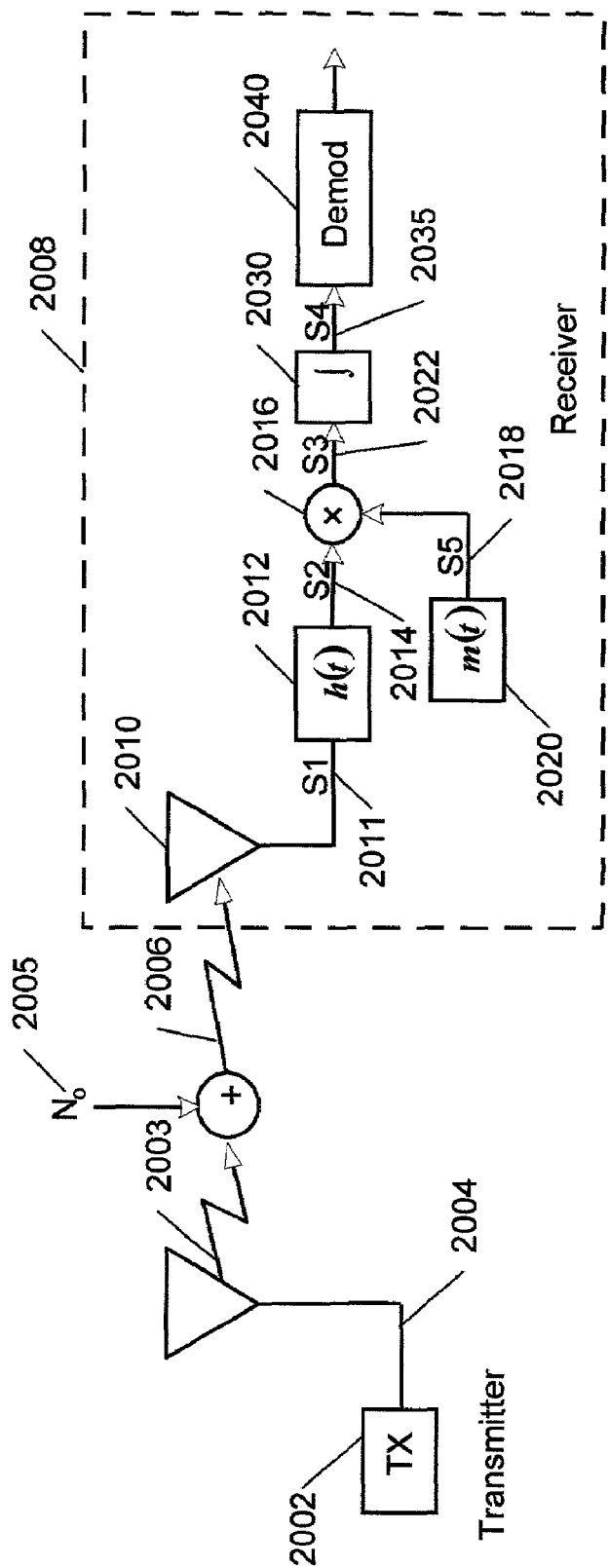
FIG. 20 is a block diagram utilized in the discussion of the advantages of optimizing filter and detect signal in accordance with the present invention.

The operation of the invention will also be described by reference to FIG. 20. FIG. 20 is a representative block diagram of an exemplary system in accordance with the present invention. Referring to the figure, the transmitter 2002 generates a signal 2003 that is transmitted into a medium through which it propagates to a receiving antenna 2010. The medium may also couple noise and/or interference 2005 to the receiving antenna. The receiver comprises a multiplier 2016, a detect signal generator 2020 and a detector or demodulator 2040. The receiver may also comprise a front end processing chain 2012, the effect of which on the signal is represented by the transfer function h(t) which includes all wave shaping in the receiver chain. This wave shaping is attributable to such elements as the antenna, band selection filters, amplifiers, T/R switches and optimizing filters designed to optimize the conversion. The detect function, m(t), drives the multiplier 2016 to effect the desired conversion. The multiplier output S3 is then filtered, typically using an integrate and dump circuit 2030, and the resulting output S4 is fed to a detector 2040 to detect and, if desired, demodulate the signal.

Operation of the present invention using this system may be more clearly understood with reference to a set of illustrative waveforms. FIG. 9A is a set of idealistic illustrative waveforms useful for describing the operation of the invention. Actual waveforms will typically contain overshoot or additional signal cycles or lobes, or may be the result of many multipath reflections. These effects will be discussed infra. In the context of a longer waveform these waveforms illustrate the operations on a single cycle of the longer waveform.

Referring to FIG. 9A and the corresponding signals in FIG. 20, S2 represents a signal presented to the multiplier. It should be understood that Signal S2 can include any processing provided in the optional front end 2012. S2 is then multiplied by detect function S5, resulting in multiplier output S3. This function is then integrated, resulting in the integrator output S4.

Figure 9C:
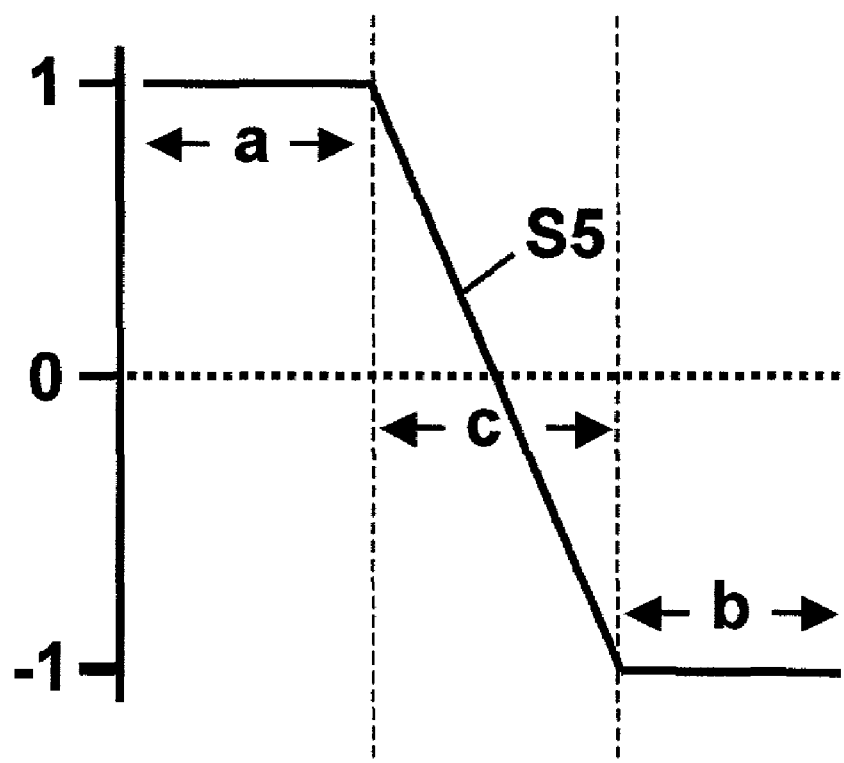
FIG. 9C illustrates the principle regions of a detection function.

FIG. 9C shows a detect function S5 in greater detail. The detect function comprises a positive transfer interval a, wherein the input is multiplied by one, a negative transfer interval b, wherein the input is multiplied by negative one, and a transition interval c, wherein the multiplier transitions from multiplying by one to multiplying by negative one. The transition interval, in its simplest form, can be an abrupt, near-zero time interval. In practice the function in this transition interval may slope or have a particular shape which may impart additional benefits to the signal response. Although detect function S5 is shown transitioning from positive to negative, obviously, the transition could also be from negative to positive. Thus, this transition may have a positive or negative slope.

FIG. 9B represents the same sequence of operations shown in FIG. 9A, but with an input pulse S2 of opposite polarity. In this sequence the same detect function S5 is used, but the result is an output S3 of the opposite polarity, which results in a negative integrated output S4. In this manner, it can be seen that a conversion to baseband is accomplished without either match template correlation or rectangular pulse sampling.

Figure 9D:
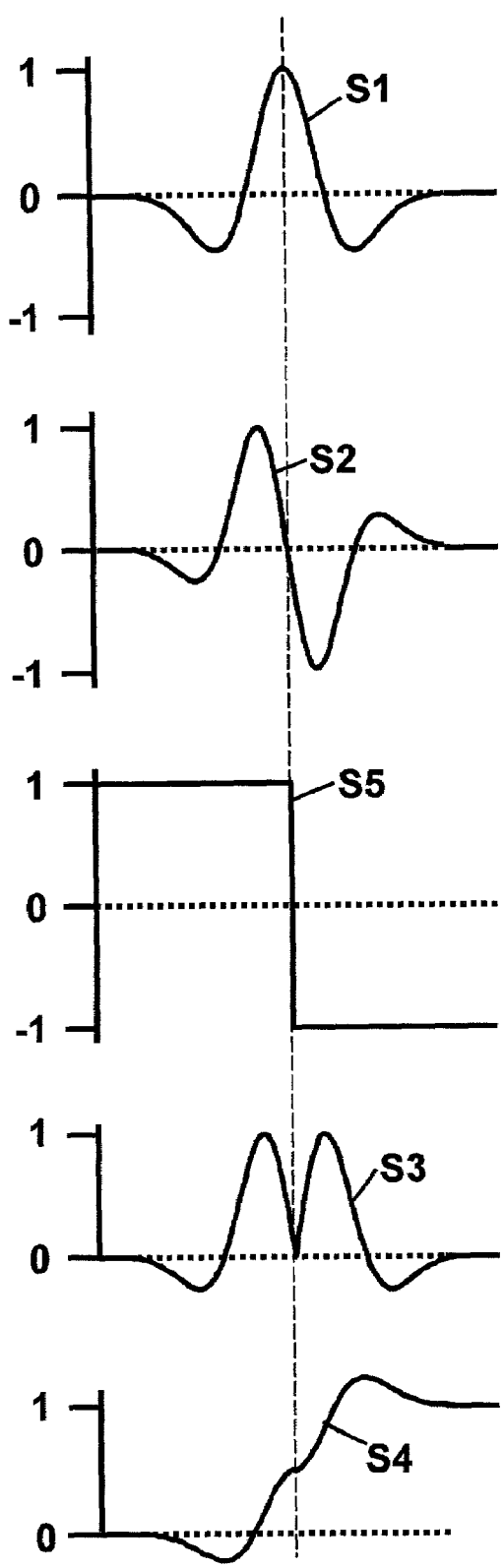
FIG. 9D illustrates the operation of the present invention using an alternative set of waveforms.

In FIG. 9D, S1 represents a possible received waveform at the antenna terminals. This waveform is then processed by the receiver input train 2012, which may optionally include such components as a transmit receive switch, various amplifiers, and optimizing filters. The composite transfer function of which is represented by the block h(t) 2012. The filter output S2 is fed to the multiplier 2016 as an input signal. The multplier 2016 multiplies the input signal S2 by a detect signal S5 provided by a detect signal generator 2020. Detect signal S5 operates on the input signal S2 to provide a reversal of polarity about the zero crossing of the multiplier input signal S2. This results in a net positive integration in signal S4.

Note that the signal cycles before and after the zero crossing containing the reversal are not rectified and accordingly do not add to the integrated result. This seeming loss of rectified signal as compared with a simple rectifier does not necessarily result in a less optimal receiver. In fact, when configured with a properly optimized filter h(t), this single cycle rectification can provide near optimal performance that would be degraded by full rectification.

In a similar manner as the previous case of FIG. 9B, an opposite polarity transmit pulse will produce an opposite polarity integrated result at S4, as can be appreciated by one skilled in the art.

Figure 26:
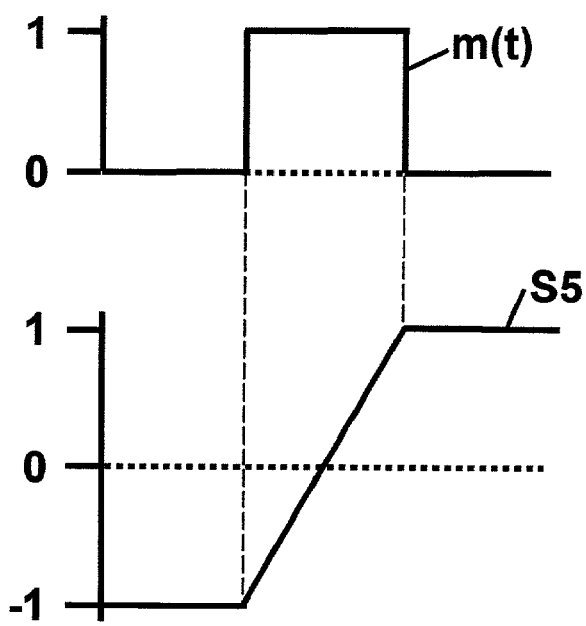

The abrupt transition of the detect waveform S5 of FIGS. 9A and 9B may not be achievable or desirable in all systems. An alternative model of the transition is a slope as shown in FIG. 26 or a smooth curve as in FIG. 27. As long as these transitions occur in a small fraction (e.g. ½ or less) of the cycle to be rectified, the multiplier will operate with good efficiency. In fact, careful design of the transition shape can optimize the response of the multiplier by tailoring the frequency response to match the signal and reject noise.

Several basic architectures have been identified for implementing the edge detection principle. First, a single stage architecture will be described along with variations for improving performance, then a multiple stage architecture exemplified in the dual stage architecture will be described along with its variations.

Single Stage Detection

Figure 9E:
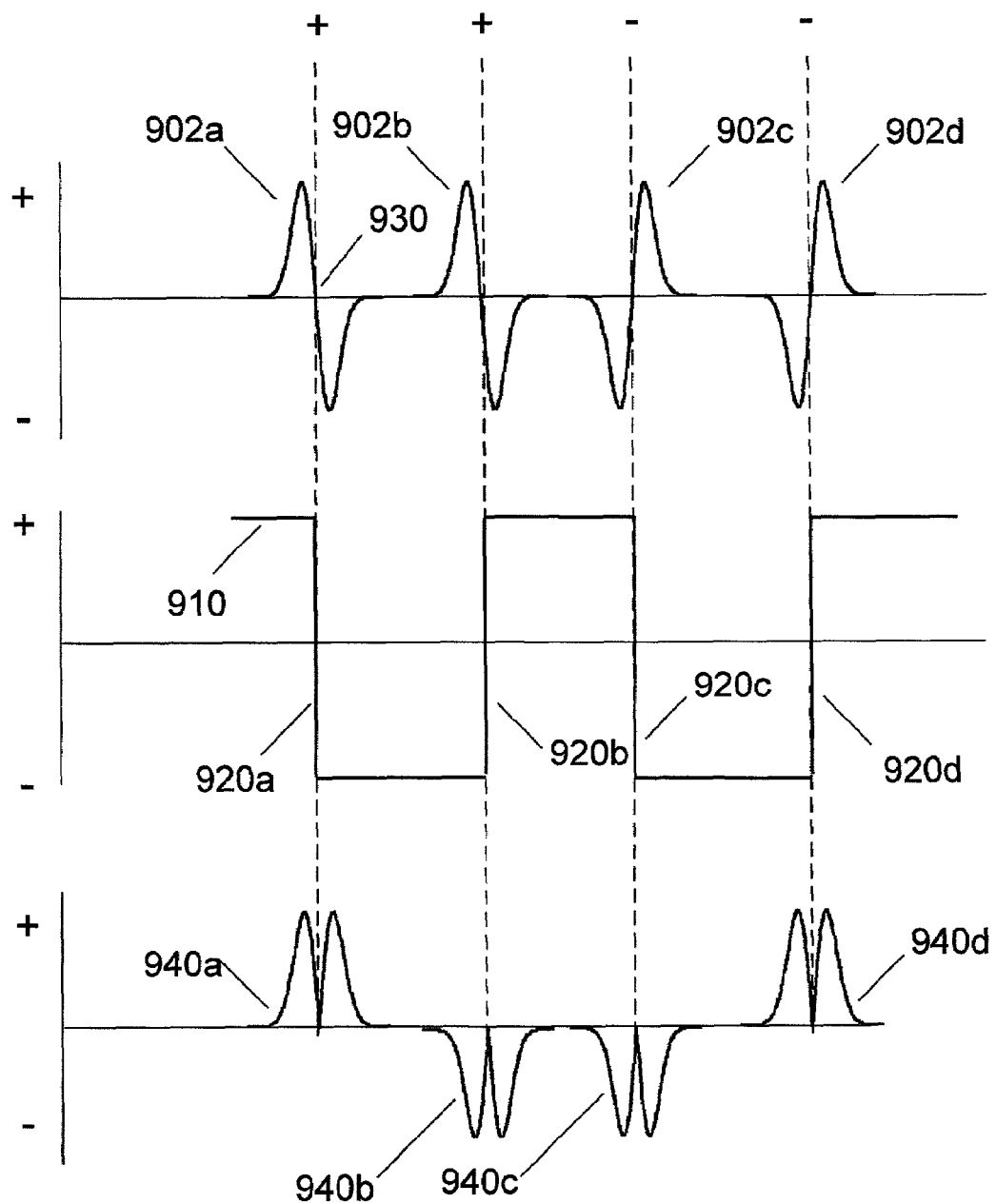
FIG. 9E illustrates the operation of the present invention using a exemplary pulse sequence.

With reference to FIG. 9E, the basic embodiment of the present method mixes the received pulses 902a, 902b, 902c, 902d with a detect signal 910 comprised of substantially instantaneous, i.e. substantially vertical, transitions 920a, 920b, 920c, 920d such that a transition is timed to occur at a zero crossing 930 of any received pulse 902a. As used herein, a positive pulse 902a, b is one whose waveform is positive then negative, and a negative pulse 902c, d is one whose waveform is negative then positive as described in co-owned and co-pending application Ser. No. 09/537,692, titled "Apparatus, System and Method for Flip Modulation in an Impulse Radio Communications System," filed Mar. 29, 2000 referenced above. The result is a rectified energy signal 940. A transition from positive to negative 920a, applied in this manner to a positive pulse 902a will result in pulse energy that is rectified positive 940a. A transition in the same direction 920c applied to a negative pulse 902c will result in a pulse that is rectified negative 940c. A transition from negative to positive 920b applied to a positive pulse 902b will result in a negatively rectified pulse 940b. The same polarity shift 920d applied to a negative pulse 902d will result in a positively rectified pulse 940d. Hereafter, transitions timed to occur at pulse zero crossing may be referred to as "edges", "detecting edges."

Figure 10:
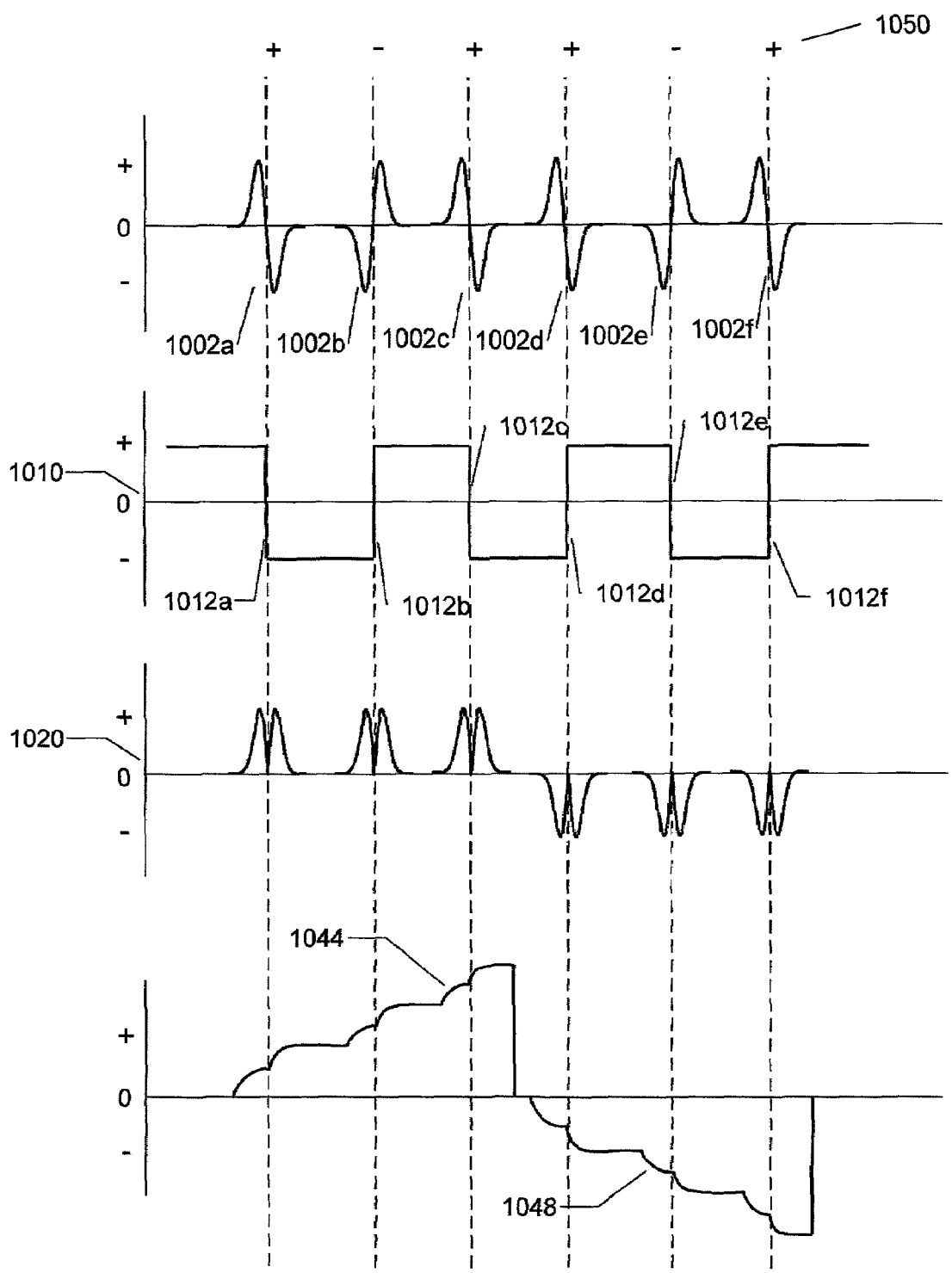
FIG. 10 illustrates the reception of data in accordance with the present invention.

It should be noted that the polarity of pulses comprising the train can be in accordance with a code, similar to a polarity or "flip" coding technique. For example, in FIG. 10, a series of received pulses 1002a, 1002b, 1002c, 1002d, 1002e, 1002f, were transmitted in accordance with a polarity-based code 1050 according to a flip modulation scheme. A detect signal 1010 comprising a series of substantially instantaneous detecting edges 1012a–f is applied to the received pulses 1002a–f, such that the polarity changes occur at or about the zero-crossings of the received pulses 1002a–f. Note that the direction and timing of the detecting edges 1012a–f of the detect signal 1010 correspond to the polarity-based code 1050. The result is a series of rectified pulses 1020. The rectified pulses 1020 are integrated or summed over a bit interval, to obtain positive and negative ramps 1044, 1048, respectively.

Figure 11:
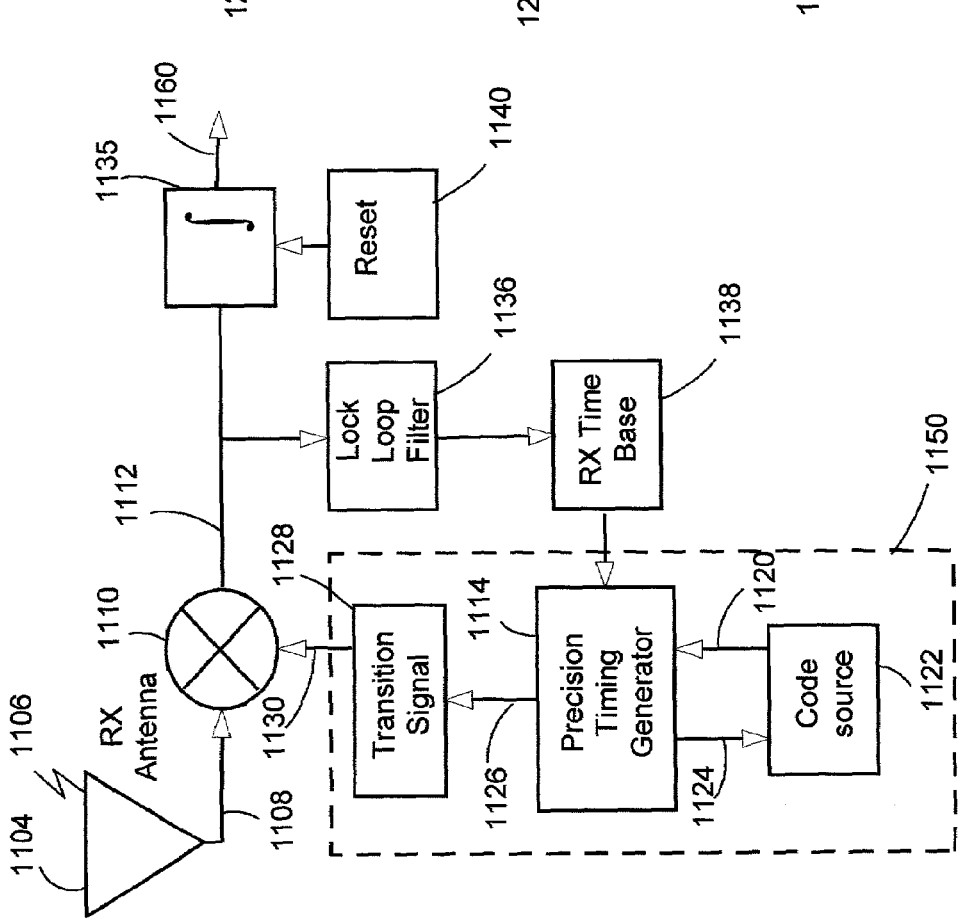
FIG. 11 is an exemplary system block diagram in accordance with the present invention.

An exemplary receiver that embodies this method is discussed with reference to FIG. 11. The receiver antenna 1104 is coupled to a first multiplier 1110. Multiplier 1110 can be effected by a mixing circuit, a Gilbert Cell multiplier or similar converter. It should be noted that the signal, once mixed, does not have to be integrated over the interval of the sample as described above, although a multiplier outputting to a short-term integrator may be advantageous in some circumstances. The present embodiment comprises a detect signal generator 1150. However, the detect signal generator 1150 comprises a transition signal generator 1128. A transition signal is a sequence of alternating, substantially instantaneous energy transitions, usually occurring between maximum positive and negative excursions. Components capable of generating such transition signals are known in the art. The detect signal generator 1150 provides a detect signal 1130 to the multiplier timed such that the transitions occur at the zero crossings of the incoming pulses. The output of the multiplier 1110 is a rectified pulse signal 1112. The rectified pulse signal 1112 is sent to an integrator 1135. A reset signal 1140 is sent into the integrator 1135 at every bit interval to clear the integrator 1135. The receiver could also comprise a low noise amplifier (not shown) prior to the multiplier 1110.

Figure 12:
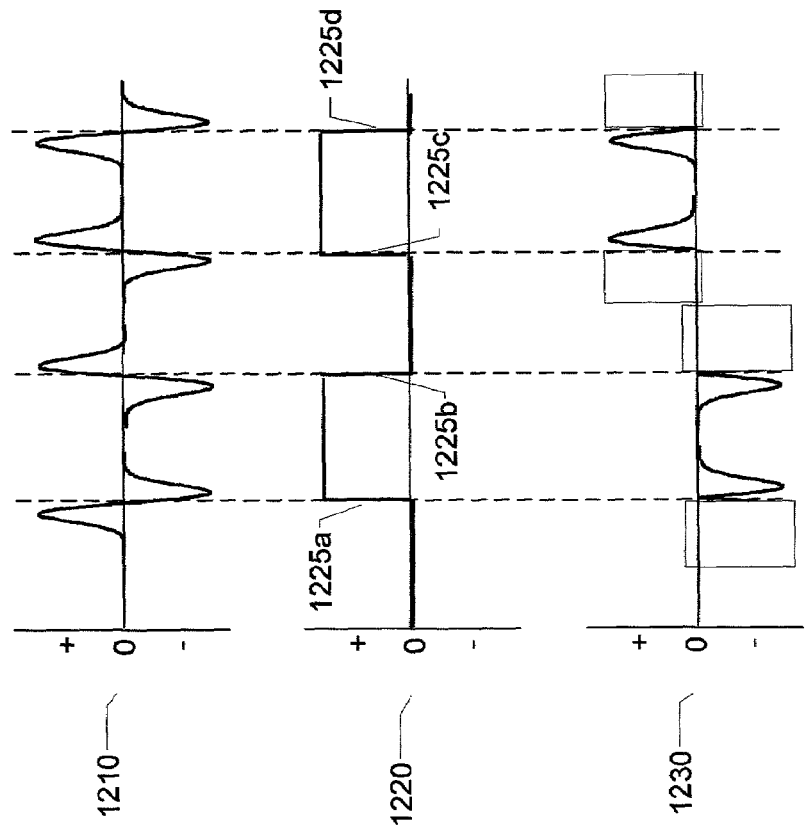
FIG. 12 illustrates the operation of the present invention with a non-bipolar detection function.

In other systems, transitions or detection edges could be employed that do not cycle between negative and positive polarity. With reference to FIG. 12, a signal 1210 comprised of a series of pulses of varying polarity is mixed with a detect signal 1220 comprised of detecting edges 1225a–d. The detecting edges 1225a–d only transition from 0 to positive energy. The result is a series of half-rectified pulses 1230. Likewise, the detect signal could be comprised of transitions from zero energy to maximum negative energy.

Figure 13:
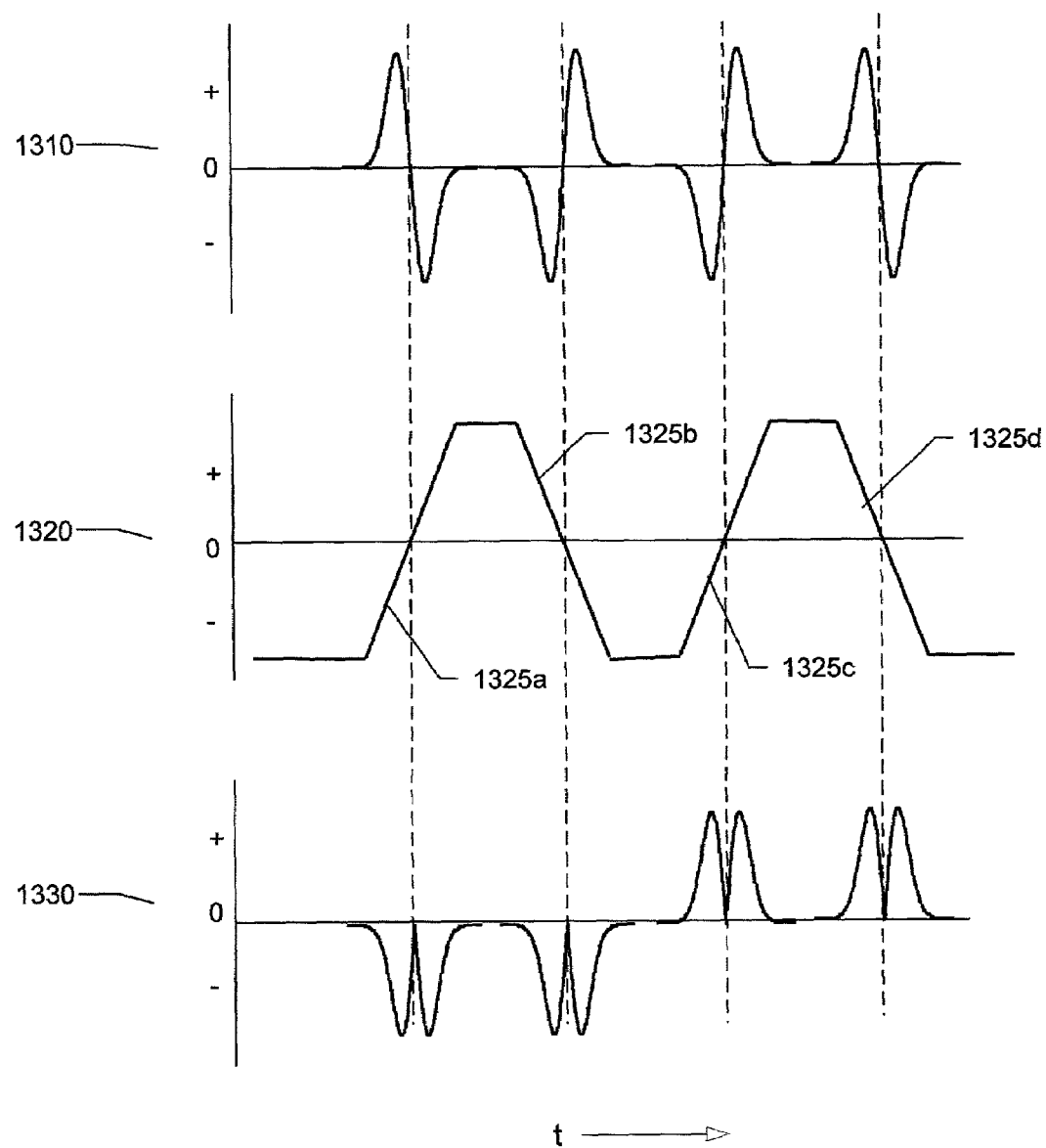
FIG. 13 illustrates the use of a sloped transition function in accordance with the present invention.

An alternative embodiment of the present method uses a detect signal 1010 comprising, not substantially instantaneous detecting edges, but sloped, or non-vertical, detecting edges, again, applied to the received impulse signal such that the transitions occur at or about the zero crossings of the pulses. FIG. 13 is a timing diagram showing such a method. A detect signal 1320 is comprised of non-instantaneous transitions 1325a–d which are timed to occur at or about the zero crossing of pulses in the received signal 1310. The result, again, is a series of rectified pulses 1330. This alternative advantageously improves the signal-to-noise ratio ("SNR") because the sloped transition acts as a low pass filter, reducing high-frequency content beyond that contained in the received waveform. Sample high frequency energy contains only noise and only degrades the SNR of the sample. Best results are obtained when the magnitude of the slope of the transition approximates the magnitude of the slope, or rise time, of the pulse waveform occurring roughly at the zero crossing. It should be noted that if the slope of the detect signal transition is less than the slope of the received pulse S2, the energy recovered in the rectified output S3 may be significantly reduced.

Alternative methods typically utilize a square sampling function requiring both turning on and off for each conversion resulting in two edges required for each conversion. In addition, these two edges must be carefully timed relative to one another and must have a faster transition rate than the functions required by the present invention. The ability to use fewer edges at a lower transition rate can result in both circuit and power consumption savings. The use of fewer edges allows the use of lower speed clocks and/or the elimination of dependent timing circuits needed for determining the second edge. Lower speed clocks reduce the power requirements for clock circuits and reduce the size of divider chains needed to support these clocks. The ability to use a lower transition rate edge allows power savings, transistor size savings and enables the use of lower cost, lower performance semiconductor processes.

An additional advantage relates to simplifying and enabling UWB and other systems to operate at high chipping rates. (In pulsed UWB, this relates to high pulse rates.) High chipping rate systems are often preferred for very high data rate or high channel capacity systems. In these systems, events (pulses, clocks, samples, etc.) occur in rapid succession. Each event requires a settling time before a new event can occur without undue coupling from one to the next. The simplicity of the edge converter allows shorter settling times and thus higher chipping rates for these systems, which in turn allows higher data rates and higher channelization capacity.

Simply alternating polarity shifts in the detecting signal, however, limits the set of polarity code combinations that can be used in the received pulse train. In other words, if the detect signal is merely a sequence of square, i.e. substantially vertical, transitions, alternating in direction, then the pulses in the received pulse train must be of a certain polarity so that they may be properly recovered when the transition "edge" is applied to them. Thus, the set of polarity combinations of the pulses in the received pulse train is limited.

Figure 14:
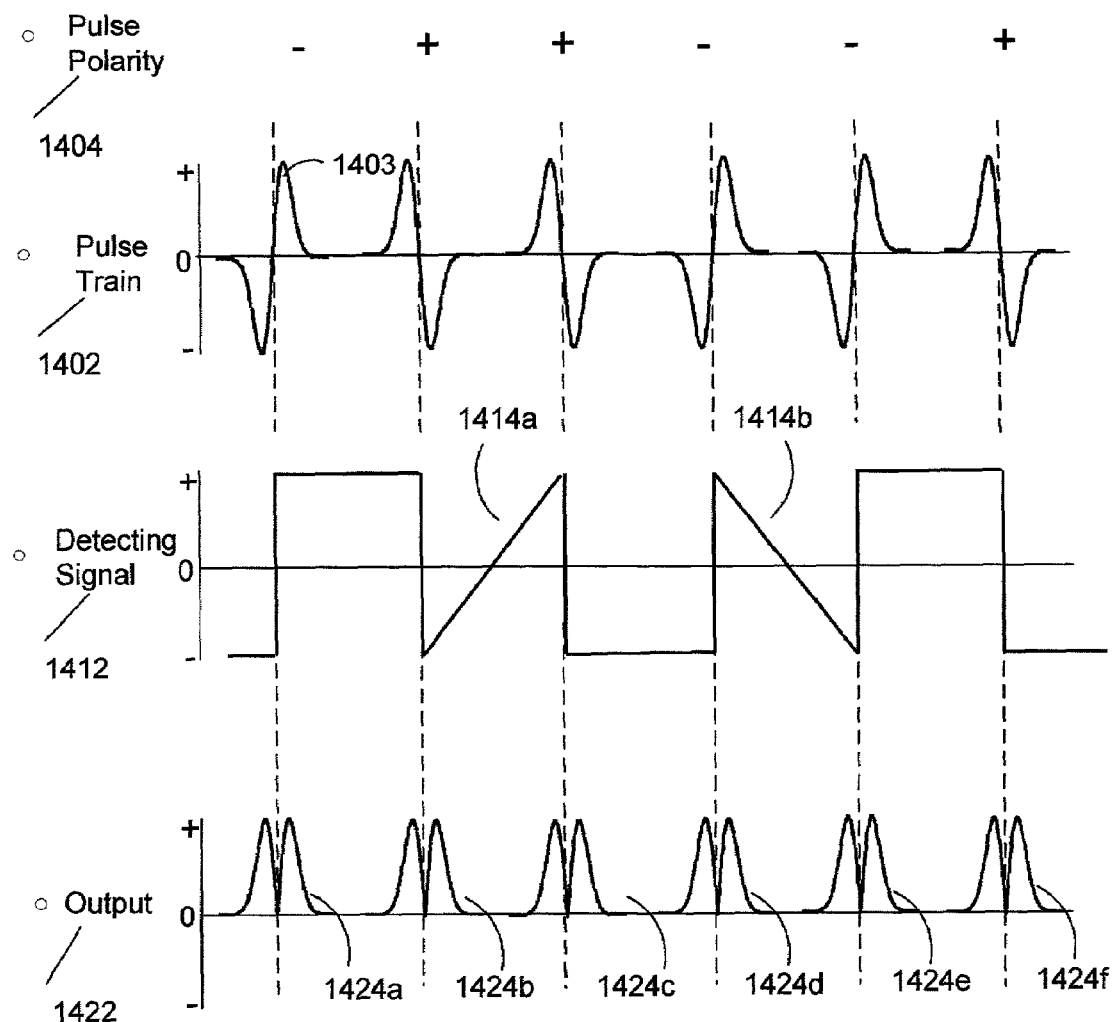
FIG. 14 illustrates the use of non-detecting transitions to allow additional flexibility in detection slope direction.

However, configuring the detect signal to use non-instantaneous or "sloped" non-detecting transitions in between the edges used to detect the pulses permits use of the detect signal without regard for the direction of the received pulse polarity. FIG. 14 shows an exemplary detect signal 1412 applied to an impulse signal 1402 comprised of pulses 1403 wherein the polarity of the pulses 1404 are in accordance with a code. In between pulses, a sloped non-detecting transition 1414a, 1414b in the detect signal 1412 occurs. The resulting signal 1422 comprises rectified pulses 1424a–f and the rectified signal was not constrained to alternating transition direction. By using sloped non-detecting transitions between detecting edges in the detect signal, the detect signal 1412 may be constructed such that it may correspond to and detect any polarity-coded impulse signal. An additional benefit is that the effects of multi-path noise may be mitigated by applying the sloped non-detecting transitions during those periods resulting in reduced noise response in the rectified output 1422. Moreover, these sloped non-detecting transitions do not have to be linear, but may correspond to second or third order polynomial or exponential functions, as well as other functions, in order to optimally reduce expected noise. These functions may be produced by driving filters with fast rising edge or pulse functions or by generating deterministic slopes. Examples of useful functions include raised cosine functions, Hamming, Hanning, and other window functions commonly used in signal processing technology.

Multiple Stage Detection and Demodulation

Figure 15:
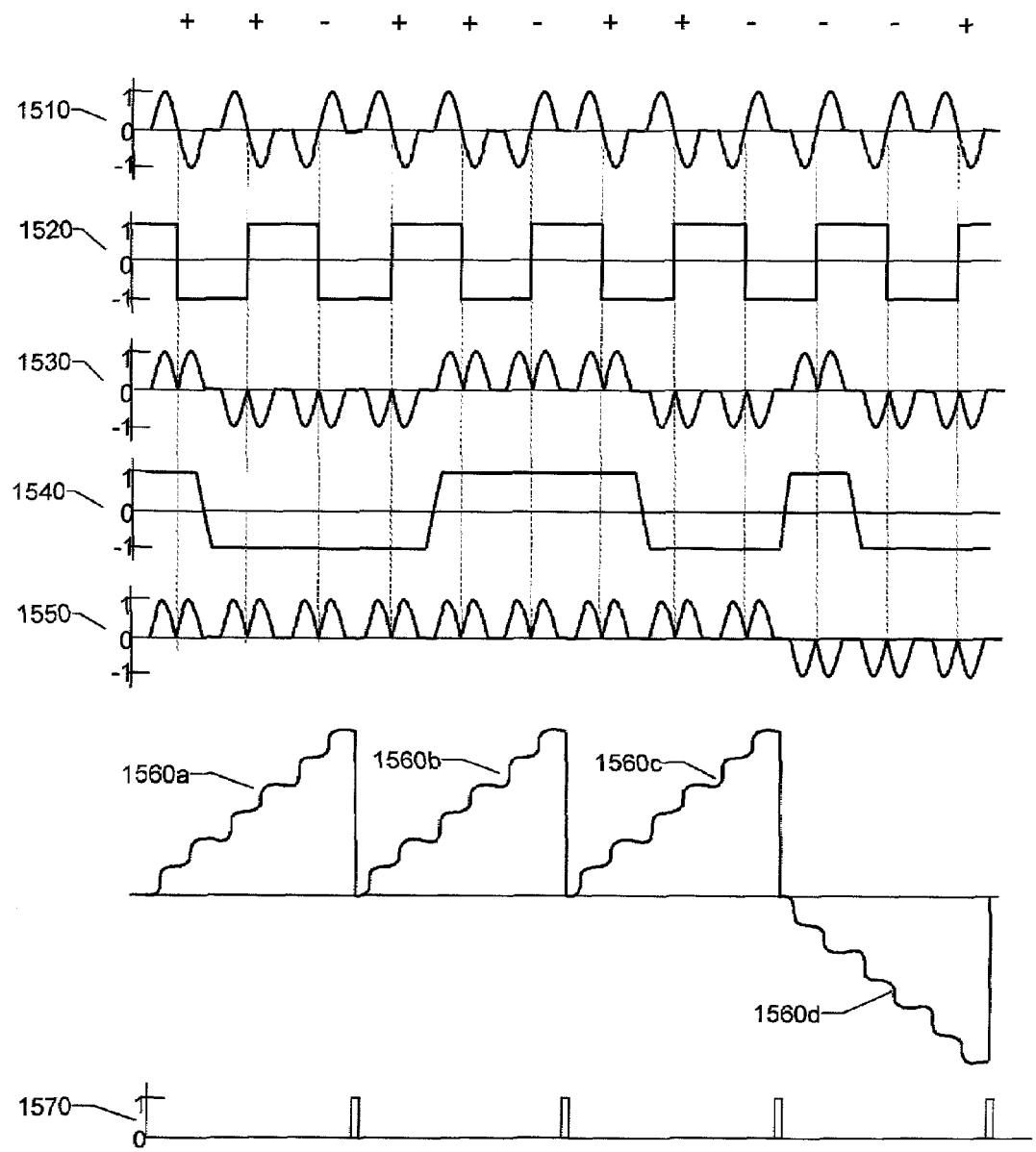
FIG. 15 illustrates the separation of the detection signal from the decode signal.
Figure 16:
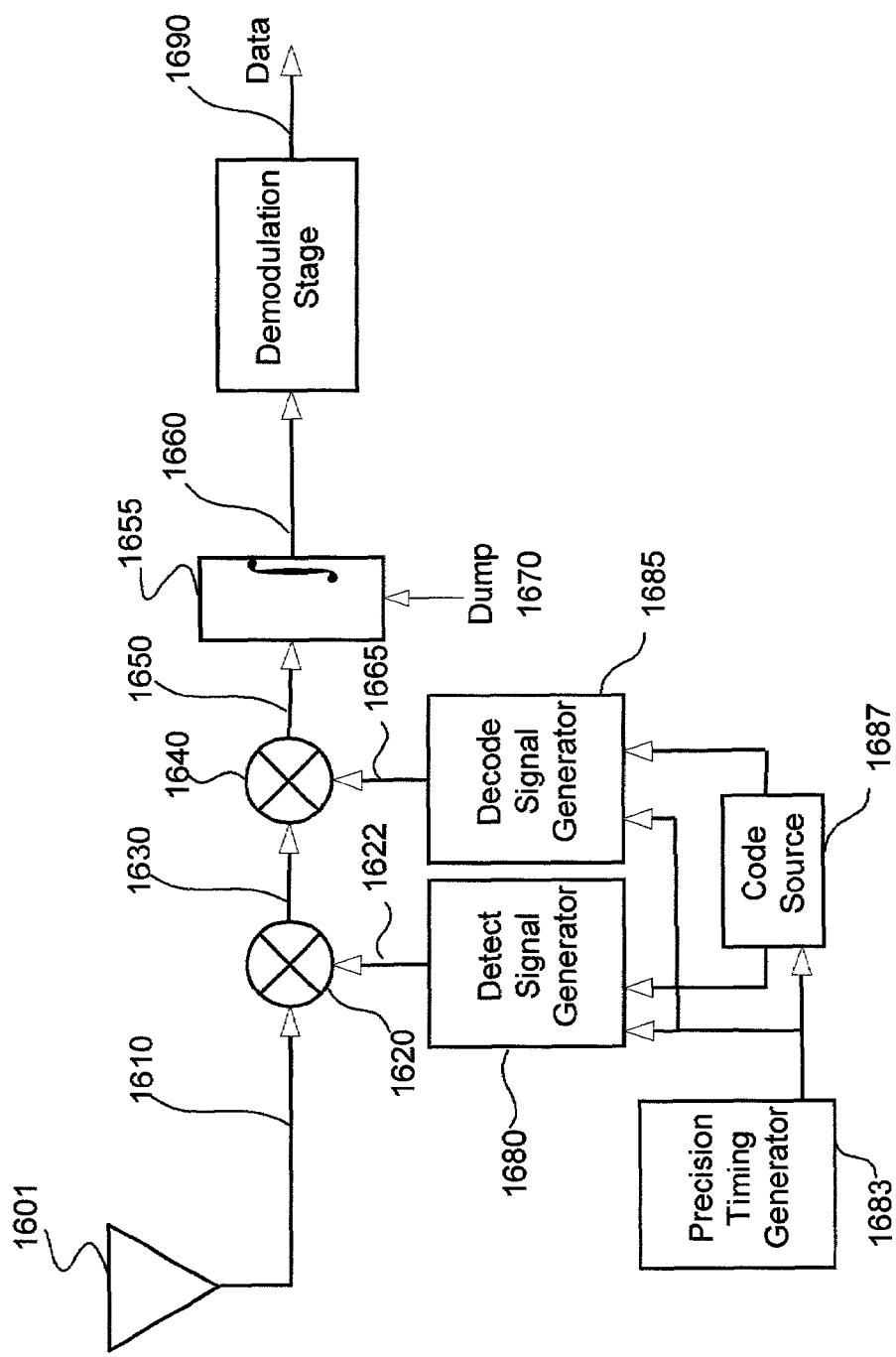
FIG. 16 is a system block diagram of a dual multiplier receiver in accordance with the present invention.

The edge-based technique may be utilized in combination with other extraction techniques to exploit polarity-coded signals and other signals. The edge detection process may be divided into multiple stages to effect certain processing. One set of advantages relates to separating the detection or conversion process from the decoding process. An exemplary system illustrating this principle in a dual stage embodiment as shown in FIGS. 15 and 16. FIG. 15 is a timing diagram of the waveforms relating to the system of FIG. 16. Waveform 1510 represents an exemplary received signal polarity modulated with a three pulse code. In this example the code sequence is [+1 +1 −1]. Each pulse group is then polarity modulated with a data sequence. In the example shown, the data sequence is [1 1 1 0], which results in a modulation sequence of [+1 +1 +1 −1]. The receiver of FIG. 16 employs in a first stage an edge-based detect signal 1520 comprising alternating transitions applied to a received signal of a polarity-coded pulse train 1510 to produce first stage rectified pulses 1530. In a second stage, a decode signal 1540 may be applied to the first-stage rectified pulses 1530 which results in a second-stage inverted signal sequence 1550 comprising certain of the rectified pulses 1530 being inverted in accordance with a pre-defined code. The decode signal 1540 may comprise a series of transitions that are substantially instantaneous, but can be relatively slow when compared to the transitions of the detect signal 1520, since these transitions occur between pulses where no desired signal is present. This portion of the circuit may operate at a base band bandwidth with associated savings in power and cost. The second-stage inverted signal sequence 1550 resulting from the application of the decode signal 1540 to the rectified signal 1530 comprises sets of like-polarized energy signals which may be used to build integration ramps 1560a, 1560b, 1560c 1560d. These ramps are the result of integrating the signal of 1550 in an integrate and dump circuit. This integrator is reset to zero in accordance with a dump signal 1570 occurring after the last pulse in a data bit is integrated. In this system, the data state is determined by the polarity of the signal at the end of the ramps. Thus, the receiver is shown to be recovering the data pattern of [1 1 1 0] according to waveform 1560.

It should be noted that the sequence in which the decode signal and the detect signal 1520 is applied may be reversed. In such an embodiment, the decode signal is applied to the first multiplier and the detect signal is applied to the second multiplier.

FIG. 16 depicts an exemplary receiver using this technique. The receiver antenna 1601 output 1610 is coupled to a first multiplier 1620 which applies the detect signal 1622 from the detect signal generator 1680. The output 1630 of the first multiplier 1620 is fed to a second multiplier 1640 and is mixed with a decode signal 1665 from a decode signal generator 1685. The detect signal generator 1680 and the decode signal generator 1685 can be responsive to a common code source 1687, such that both output in a coordinated manner to produce the desired code. In the alternative, the detect signal generator 1680 and the decode signal generator 1685 may be responsive to separate code sources (not shown). A precision timing generator 1683 controls the system timing. The product 1650 of the second correlator 1640 is supplied to an integrator 1655 to produce the correlation output. (Multiplying two signals and integrating the result is referred to as correlation.) This integrator may also be configured to integrate multiple pulses and produce multiple pulse ramp signals as shown in waveform 1560 Optionally, a reset, or dump, control signal 1670 can be sent from a reset signal generator (not shown) to the integrator 1655 at every bit interval to clear the integrator 1655. The output of the integrator 1660 is then fed to the demodulation or detection stage where the data value 1690 is determined.

In an alternative embodiment (not shown) an integrator, or filter, may be placed after the first multiplier 1620 to integrate each pulse before the decode 1640 operation.

Figure 17:
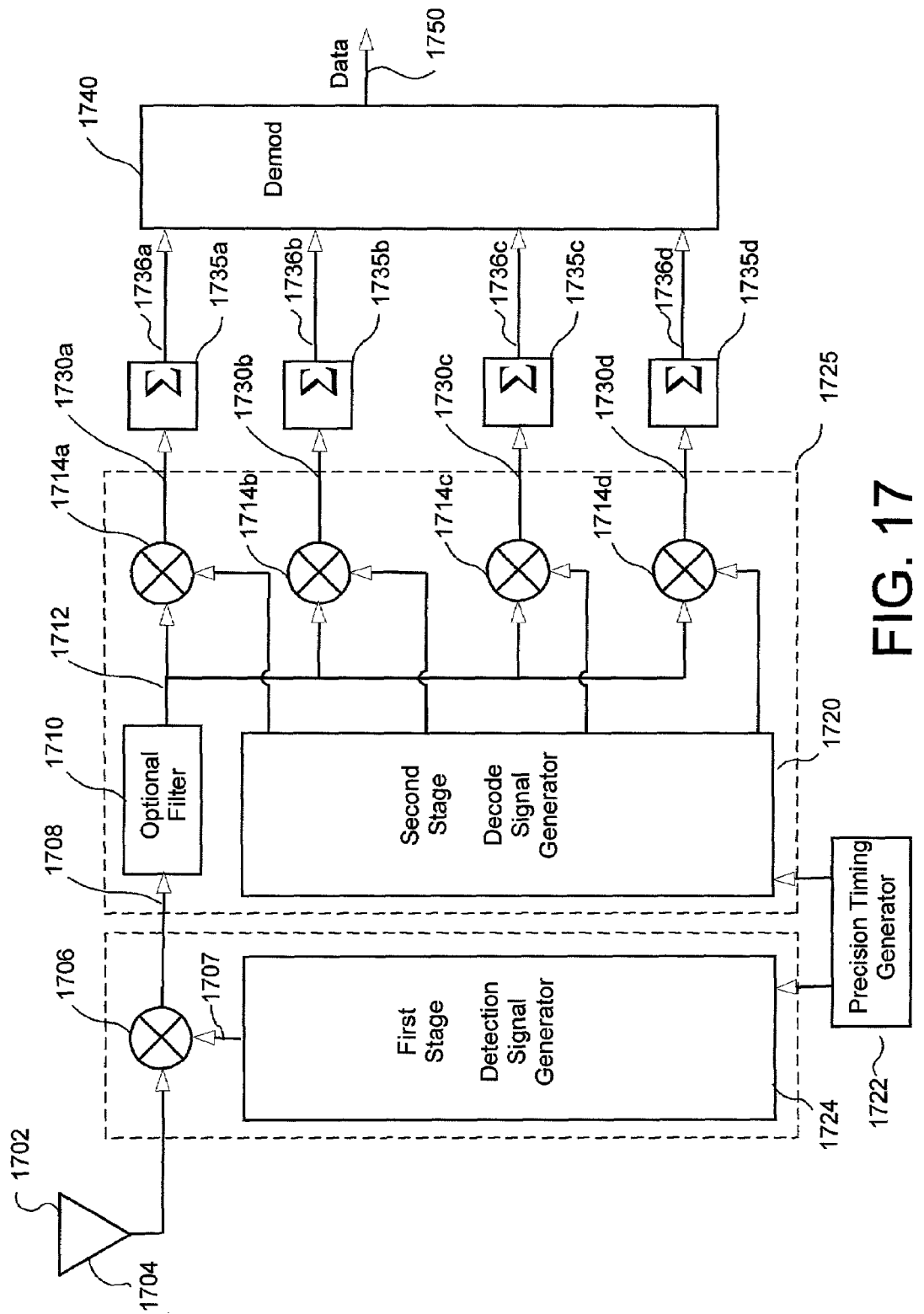
FIG. 17 is a system block diagram of a multiple parallel second correlator embodiment of the present invention.

FIG. 17 illustrates an exemplary receiver employing an additional embodiment of the present method that utilizes a plurality of correlators in parallel in the second stage. Referring to the figure, an impulse signal 1702 is received by an antenna 1704 and is processed by first-stage conversion 1706 which, in this example, assumes a detect signal, as described above, is multiplied by the pulse signal to obtain an output 1708 comprising a plurality of rectified pulses that can correspond to a polarity-based code. The output 1708 of first-stage conversion 1706 can then be fed to an optional filter 1710.

The filter 1710 may have a low pass and or a high pass characteristic. The low pass character is for removing high frequency noise above the information bandwidth of the signal at this point in the circuit. Since, for simple binary modulation, the Nyquist information bandwidth would be half of the bit rate, typically, a low pass cutoff frequency slightly above this value would be used. The high pass characteristic could be used to eliminate DC bias and low frequency noise such as $$\frac{1}{f}$$

noise typical in semiconductor amplifiers. When a high pass characteristic is employed, it is necessary to accommodate the low frequency component of information modulation. One method of DC bias removal is to eliminate this component by ensuring there is an even number of pulses per bit and designing the code such that half of the pulse signal detections are positive and half are negative to balance the DC component. Further discussion of these principles can be found in U.S. Pat. No. 5,677,927 to Fullerton et al, which has been incorporated herein by reference.

The filter output 1712 is sent to a plurality of correlators 1714*a*, 1714*b*, 1714*c*, and 1714*d*. A buffer amplifier (not shown) may be used for uniform loading and decoupling of signals among these elements. Each correlator 1714*a–d* is fed its respective decoding signal from a second stage decoding signal generator 1720 which generates decode pattern signals that are synchronized with the detect signal used in the first stage conversion 1706. The second stage correlation outputs 1730*a*, 1730*b*, 1730*c* and 1730*d* proceed through separate integrators 1735*a*, 1735*b*, 1735*c* and 1735*d* coupled to a demodulation stage 1740 to convert the result into binary or analog signals according to the modulation type. In the case of flip modulation, the detection stage may be a comparator.

It should be noted that it is possible at this stage to integrate multiple pulse signals in this stage 1735 before completion of the integration function. This is especially useful in the case where multiple pulses are used for each data bit. For instance, if eight pulses are used for each data bit, the integrator is reset before the first pulse is received and the signal is integrated on the storage element for the duration of each pulse and retained on the storage element between pulses such that the final state from one pulse is the initial state for the next pulse. This operation is continued for the completion of eight pulses at which point the output is provided to the next stage. If the integration is done using analog circuits, the output may be provided to a sample and hold or directly to a detector or to an analog-to-digital converter for conversion to digital for further processing. The further processing may include interference rejection, additional integration gain, DC bias removal and other algorithms in addition to detection. In one embodiment of the present invention, an edge-based detect signal is used for the first stage and a bandpass filter is used to process the signal before the second stage multipliers. This configuration has an advantage in that the correlators 1714*a–d* may be designed for much lower frequency operation than the first stage correlator. This can usually result in lower power consumption and smaller transistor area and simpler design, which is especially desirable since this is the stage that is configured in plurality.

Systems Utilizing a Plurality of Second Stage Correlators.

The dual-stage, multi-correlator design enables several techniques for improving channelization, interference resistance, and flexibility. In addition, some of the embodiments described possess features that allow multiple, layered modulation schemes which advantageously increase data throughput. In all of these below-described versions, the first stage correlator output is a rectified signal corresponding to a polarity-based code. In one system, the second-stage code generator 1720 supplies multiple different codes to the respective second stage correlators; each code, or channel, corresponding to one second stage correlator and a unique code associated only with that second stage correlator. Such a receiver system may search for signals on multiple codes simultaneously, and upon detection of a particular code, the channel represented by that code may be selected for further processing such as signal tracking and demodulation to receive that channel. The remaining codes would typically be ignored in this case.

In another system, the first stage correlator output represents a rectified signal corresponding to a polarity based code. The second-stage code generator 1720 supplies multiple different codes that are orthogonal or possess low cross-correlation. In such a constellation of codes, a code may be used to deliver multiple data bits of information. For instance, if eight such codes are available, a single code may represent three digital bits of information. Such a system would have eight correlators, each configured to receive its respective code. Upon completion of the integration of a pulse train representing three bits of information (a symbol), the correlator with the greatest magnitude output would determine the data value of the respective three bits.

In another system, the second-stage code generator supplies multiple code shifts of the same code using a code with low autocorrelation side lobes, such as a Barker code, for example. These code shifts may be used to perform a rapid search for a signal on this code by searching at the multiple code modulo time shifts in parallel. When any single signal detection is determined, that signal is selected for further processing such as signal tracking and demodulation to receive that channel. The remaining summation outputs would typically be ignored in this case.

In another system, again the multiple code generator supplies multiple code shifts of the same code using a code with low autocorrelation side lobes, such as a Barker code, for example. In this system, the multiple shifts of the same code are used as a constellation of multiple modulation states. In a similar example to the multiple different codes, if eight such code shifts are available, a single code shift may represent three digital bits of information. A system of modulation could employ, for instance, a position-type modulation scheme similar to that described in co-owned and co-pending application Ser. No. 09/875,290, entitled "Apparatus, System and Method for One-of-Many Positions Modulation in an Impulse Radio Communications System," filed Jun. 7, 2001, and incorporated by reference herein.

Figure 18A:
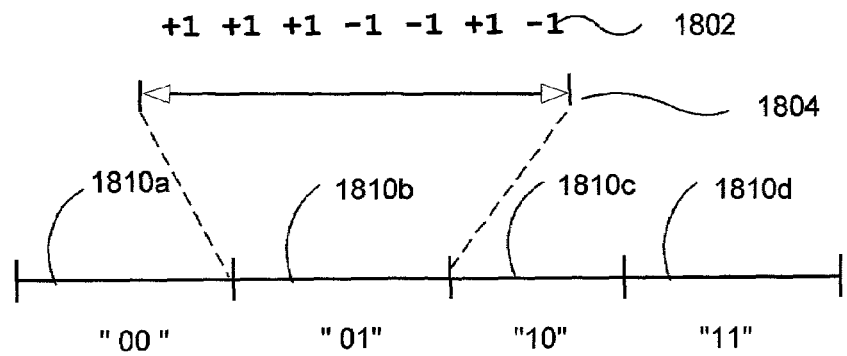

For example, referring to FIG. 18, an exemplary Barker Code 1802 describes a code modulo 1804. For illustration purposes, a modulation scheme could use four time frames in time corresponding to one of four data states: "00," 1810*a* "01," 1810*b* "10," 1810*c* and "11" 1810*d*. In this example scheme, a code modulo is transmitted such that it is positioned in time in one of the four possible frames.

Figure 18B:
Figure 18C:

In an alternative embodiment, the code may be shifted in position by an integral code position interval. FIG. 18B illustrates such a set of shifted codes. In this system, one of the codes would be selected based on its respective two data bits. At the receiver, the correlator 1735 with the highest output would determine the output data 1750. Note that these codes include positive and negative pulses as well as zero pulses. In a further alternative embodiment, the code may be rotated to obtain multiple states as shown in FIG. 18C.

Note that the code illustrated in FIG. 18 is the Barker length 7 code. The Barker length 7 and length 11 codes are especially useful to UWB systems because of their relatively flat spectral properties. Other length Barker codes are good, but not as particularly good as length 7 and length 11. Since the FCC regulates transmit power based on spectral density, a flat spectrum is a very desirable property.

Figure 19A:
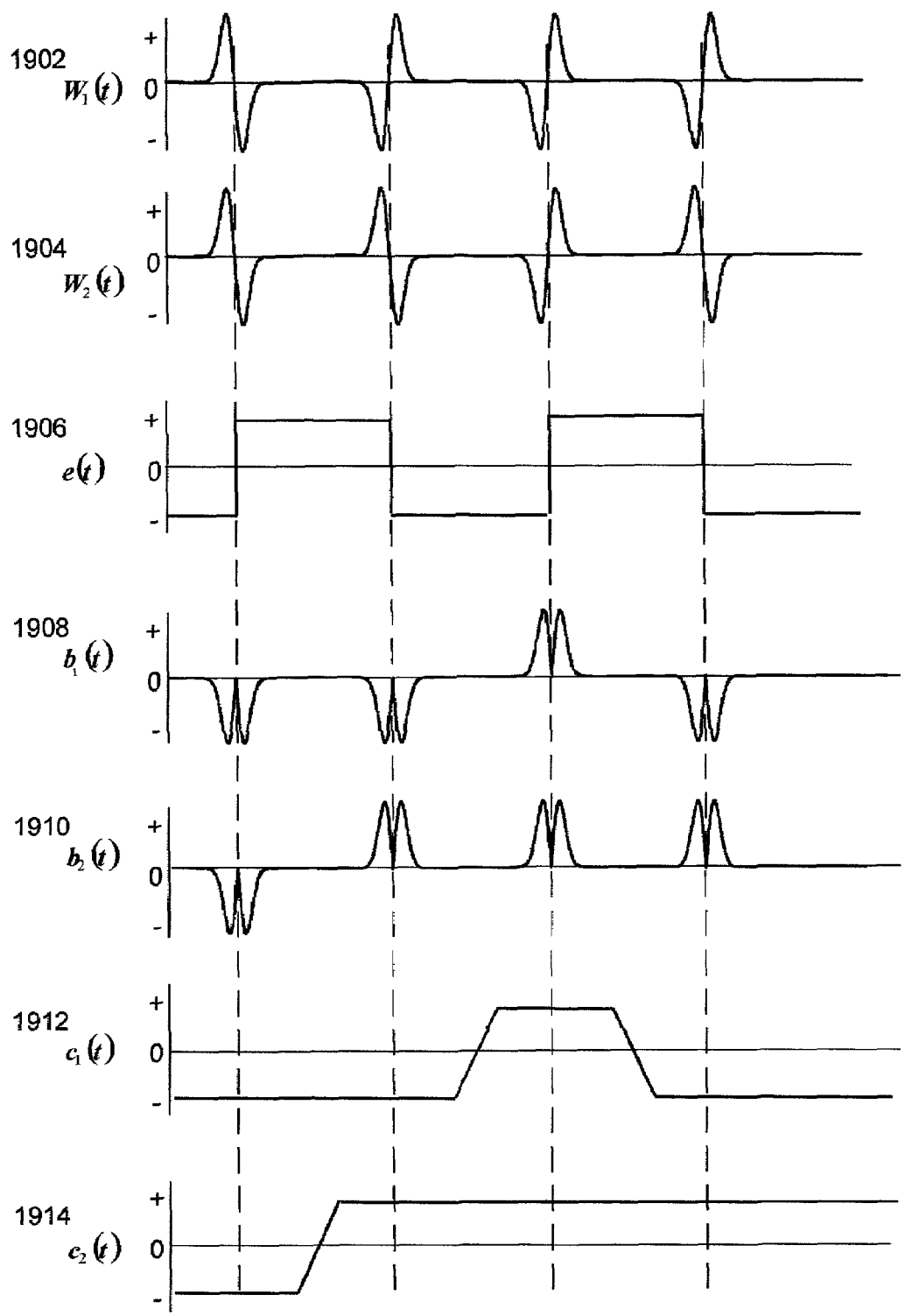
FIGS. 19A and 19B illustrate the operation of the multiple parallel second correlator embodiment of the present invention.
Figure 19:
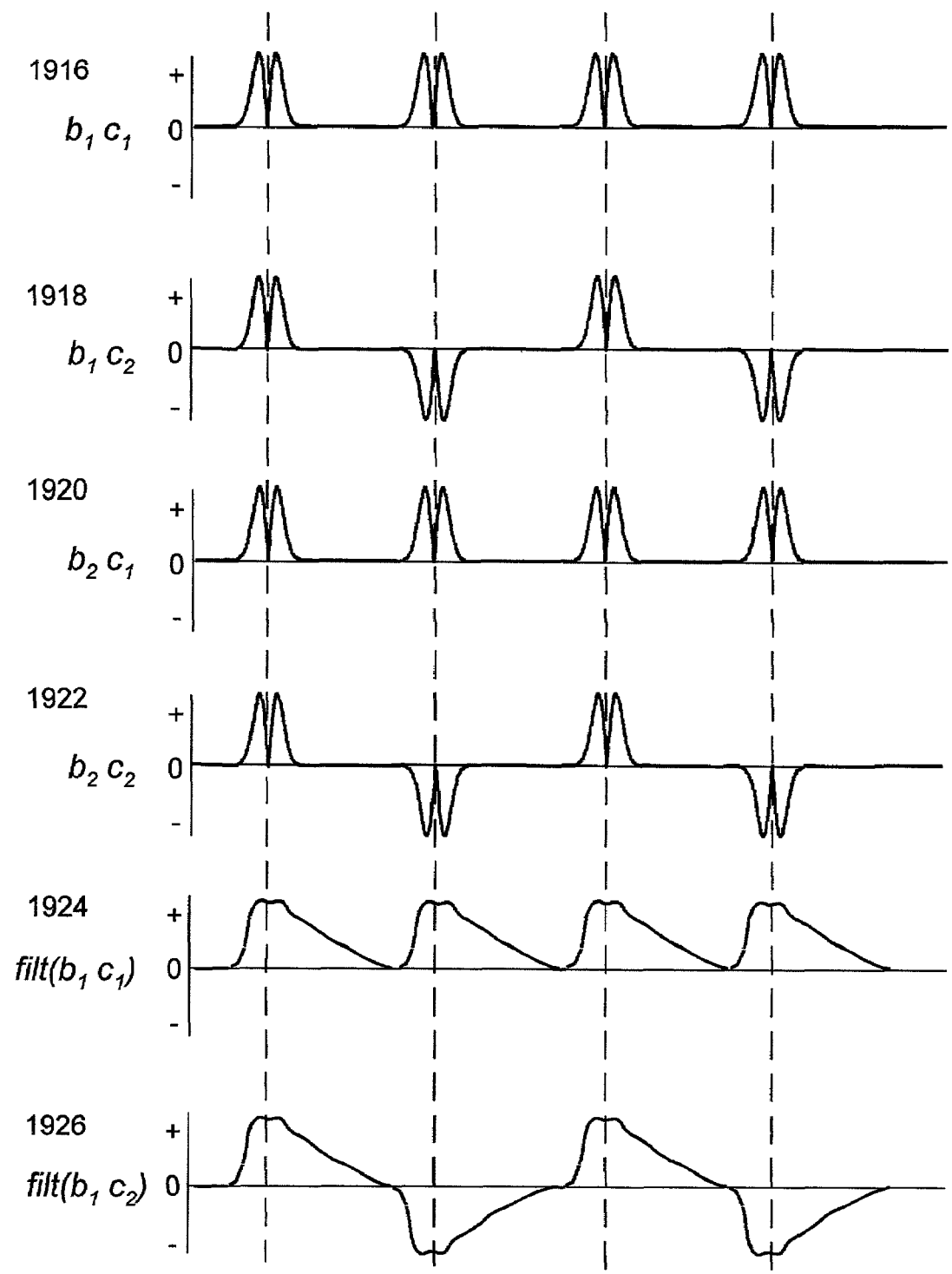

FIGS. 19A and 19B are timing diagrams illustrating the waveforms of one embodiment of the present invention employing a multiple correlator second stage similar to the system diagrammed in FIG. 17. This sequence of waveforms illustrates an example of the dual stage multiple code concept, in this case illustrating a signal set where one of two codes is sent to represent one digital bit of information. This concept can be extended to one of N codes representing $\log_2(N)$ bits or to N of M codes with (M choose N) states potentially representing $\log_2$(M choose N) bits. The two-code embodiment would use two second stage correlators shown in FIG. 17, e.g. 1714a and 1714b. The use of more codes would permit the use of more second stage correlators.

Referring to FIG. 19A, signal 1902 represents a first possible received pulse train using a first code and signal 1904 represents a second possible received pulse train using a second code. If the first code 1902 is sent it may represent a data value of "1", and if the second code 1904 is sent it may represent a data value of "0". In this manner, a digital bit may be sent by sending either the first code 1902 or the second code 1904. The received pulse train, either the first code 1902 or the second code 1904 whichever is received, is then multiplied by a detect signal 1906 to produce its respective rectified output signal 1908, 1910. A first rectified output 1908 results from the multiplication of first code 1902 and detect signal 1906. A second rectified output 1910 results from the multiplication of second code 1904 and detect signal 1906.

The respective rectified output is then delivered to a first correlator 1714a and a second correlator 1714b. A first decode signal 1912 is supplied to the first correlator 1714a by the second stage decode signal generator 1720. A second decode signal 1914 is provided to second correlator 1714b by decode signal generator. Application of first decode signal 1912 to first rectified output 1908 results in first decoded signal 1916. Likewise a second decoded signal 1918 would result from application of second decode signal 1914 to first rectified output 1908. Although not shown, it can be appreciated that when signal 1916 is integrated in the manner of signal 1560 of FIG. 15, it will result in a positive signal output. On the other hand, when signal 1918 is integrated, it will result in an output of zero. In a similar manner, if second code 1904 is received and converted to second rectified output 1910, application of the first decode signal to second rectified output 1910 will result in the first decoded signal 1920 at the first correlator 1714a. Application of the second decode signal 1914 to the second rectified output 1910 will result in second decoded signal 1922 at the second correlator 1714b. Thus, the demodulation 1740 circuit can be designed to determine the highest output from among its inputs and set the associated data bits accordingly. In this example, if the first correlator is higher than the second correlator, the output is a "1," otherwise it is a "0."

In an alternative embodiment, the optional filter 1710 may be implemented. Signal 1924 illustrates a representative output of the second multiplier 1730a for the case where signal 1902 is the received signal and decode signal 1912 is used as a decode. Compare 1924 with its unfiltered alternative 1916. In a similar manner signal 1926 is a filtered alternative for signal 1918.

In a further method of utilizing the system of FIG. 17, multiple codes, such as the pulse streams of 1902 and 1904 may be sent simultaneously, each separately polarity modulated by its separate information stream and the two signals summed at the transmitter and received summed at the receiver. In this case, the summation signals 1736a–d represent independent received information streams and may be demodulated accordingly.

Filter/Template Manipulation

It is often instructive to evaluate a radio system with respect to its performance in an additive white Gaussian noise (AWGN) channel. This is useful because thermal noise is very close to this model and an unknown interference with relatively flat spectral density can be modeled this way. Studies of the AWGN channel have resulted in the optimality criteria for the matched template correlating receiver and the matched filter sampling receiver. This optimality criteria is not necessarily applicable to particular known interferers, but is generally regarded as a good guideline for system design. This section introduces a method of blending the features of a matched template correlating receiver with a matched filter receiver to achieve equivalent optimal performance with realizable components. These principles are first discussed with respect to a generalized correlating receiver and then applied to the edge detection receiver.

A basic embodiment of such a receiver in accordance with the present invention is shown in FIG. 20. An ultra wideband transmitter 2002 generates an impulse radio signal 2004 that is transmitted 2003 through a propagation medium. The impulse radio signal 2004 may be a single Gaussian monocycle pulse, group of pulses, a wavelet function, a pulse comprising several cycles, chirp pulse or other wideband signal collectively referenced hereinafter as a pulse. During propagation, the impulse radio signal 2004 may be subjected to an interference signal or an ambient noise signal, $N_O$, 2005. The impulse radio signal 2004 combined with the ambient noise 2005, hereinafter referred to as s(t) 2006 is then received by an ultra wideband receiver 2008.

Signal s(t) 2011 is received at the receiver 2008 by an antenna 2010, and is then shaped by a filter 2012 with an impulse response of h(t) 2014. The filter output 2014 is passed to a correlator mixer 2016. The receiver includes a manipulated detect signal generator 2020 that generates a detect signal, m(t) 2018 which is also sent to the correlator mixer 2016. The correlator 2016 comprises a multiply and short-term integrate function. The detect signal m(t) 2018, is synchronously mixed with the output 2014 of the filter 2012 and the product 2022 is sent to an integrator 2030 to produce an output signal, which may be an analog or a digital signal.

The relationship between the signal s(t) 2011, the filter response h(t) 2014 and the detect signal m(t) 2022 conforms to the following equation for receiver optimality, expressed in the frequency domain for ease of operation:

$$S(f) = \overline{H(f)} \cdot M(f) \qquad (1)$$

for all $f \in (-\infty, \infty)$ where M(f) is the Fourier transform of m(t), S(f) is the Fourier transform of s(t), and H(f) is the Fourier transform of h(t), and the overbar indicates the complex conjugate. It should be noted that for this analysis, the filter transfer function, h(t) 2014 can include the shaping effects of any filters in the transmitter, a transmitting and receiving antennae, amplifiers, transmit/receive switch, interference rejection filters, or other stages required to deliver the signal to the mixer.

A matched filter receiver typically employs a filter h(t) 2012 that is the time-reversed and delayed version of the signal s(t), i.e. h(t)=s(T−t), where T is the time delay required to make the filter realizable. The effect of the filter is the autocorrelation function of s(t). Equation (1) is satisfied when m(t) is a delta sampling function, i.e. m(t)=δ(T−t). Conversely, if h(t) were an all pass filter, i.e. h(t)=1 then m(t)=s(t) which represents a matched template correlating receiver.

However, the same gain in signal-to-noise ratio can be realized by manipulating both the filter h(t) 2014 and the detect signal m(t) 2022. From Equation $$M(f) = \frac{S(f)H(f)}{|H(f)|^2} \quad (2)$$

(2)
and $$H(f) = \frac{\overline{S(f)}M(f)}{|M(f)|^2} \quad (3)$$

Performance analysis of this concept with respect to the present invention is facilitated in with reference to FIG. 20. Signal s(t) 2011 comprises:

$\beta s + n_w$ where $\beta$ is a data bit, either +1 or −1, $n_w$ is Gaussian white noise process with two-sided power spectral density function (PSD) $S\{n_w\}(f) = N_0/2$. The signal is acted upon by filter 2012 and the response 2014 of the filter is $\beta s * h + n$ where $n = n_w * h$ This response is a mean-zero Gaussian process with PSD $$S\{n\}(f) = \frac{N_0}{2}|H(f)|^2$$

The correlated output 2035 of the integrator 2030, which results from the application of the detect signal m(t) to the filter response 2014, is $v = \beta\mu + \sigma Z$, where Z is a unit normal random variable (mean 0, variance 1), $$\mu = \langle s * h, m \rangle \quad (4)$$
$$= \langle SH, M \rangle$$

where $$\langle a, b \rangle = \int_{-\infty}^{\infty} a(u)\overline{b(u)}du,$$

the "*" denotes convolution, and $\sigma Z = \langle m, n \rangle$ is a normal random variable with mean zero and variance. It can be shown that $$\sigma^2 = \frac{N_0}{2}\int_{-\infty}^{\infty}|H(f)M(f)|^2 df = \frac{N_0}{2}\|HM\|^2. \quad (5)$$

where

-continued $$\|a\|^2 = \langle a, a \rangle = \int_{-\infty}^{\infty}|a(u)|^2 du.$$

The sign of the correlated output $v$ 2035 determines the demodulated bit $\tilde{\beta}$ as follows: assuming without loss of generality that $\mu > 0$, we set $\tilde{\beta} = \text{sgn}(v)$, the sign of the quantity $v$. A bit-error occurs when $\tilde{\beta} \neq \beta$, or equivalently, when $\beta v < 0$. Hence the bit-error rate $p_e$ is $$p_e = Pr(\beta v < 0) \quad (6)$$
$$= Pr(\beta\sigma Z < -\mu)$$
$$= Q\left(\frac{\mu}{\sigma}\right)$$
$$= \frac{1}{\sqrt{2\pi}}\int_{\frac{\mu}{\sigma}}^{\infty} \exp(-x^2/2)dx$$

Note that $$\frac{\mu^2}{\sigma^2} = 2\frac{\langle SH, M \rangle^2}{N_0\|HM\|^2}$$
$$= 2\frac{\langle S, \overline{H}M \rangle^2}{\|S\|^2\|\overline{H}M\|^2}\left(\frac{\|S\|^2}{N_0}\right)$$

Receiver performance can be shown by letting $\kappa$ represent receiver efficiency. $\kappa$ is defined by $$\kappa = \frac{\langle S, \overline{H}M \rangle^2}{\|S\|^2\|\overline{H}M\|^2} \quad (7)$$

Signal energy per bit $E_b$ is given by $E_b = \|S\|^2$.

Applying Equation (6), the bit-error rate can be expressed as $$p_e = Q\left(\sqrt{2\kappa\frac{E_b}{N_0}}\right). \quad (8)$$

Using the Cauchy-Schwartz inequality, we have $|\langle S, \overline{H}M \rangle| \leq \|S\|\|\overline{H}M\|$ with equality if and only if $\overline{H}(f)M(f) = c \cdot S(f) \quad (9)$ for all frequencies f, for some constant c, a gain term, which may be assumed to equal 1 without loss of generality. Therefore $\kappa \leq 1$, and the optimal receiver efficiency $\kappa = 1$ is attained if and only if (9) holds. Thus this equation shall be hereinafter referred to as the optimality condition.

In this example, the units of the correlated output, $v$, 2035 are volts, and $v^2$ represents the energy that the receiver sends to the demodulation stage 2040. The usable, i.e. non-random, information-bearing, energy contained in ν is, of course, $\mu^2=<S,\overline{H}M>^2$. Using a familiar property of inner products, we can write $$\mu^2=\|S\|^2\|\overline{H}M\|^2\cos^2\theta \qquad (10)$$

where θ is the angle between the S and $\overline{H}M$, considered as vectors. Clearly, one way to maximize $\mu^2$ is to make θ either 0 or π; stated in another way, it is desirable that the signal vector S is parallel to our receiver vector $\overline{H}M$. Solving for $\cos^2\theta$ in equation (10), and recalling the definition (7) of κ, we see that $$\kappa=\cos^2\theta \qquad (11)$$

Figure 21B:
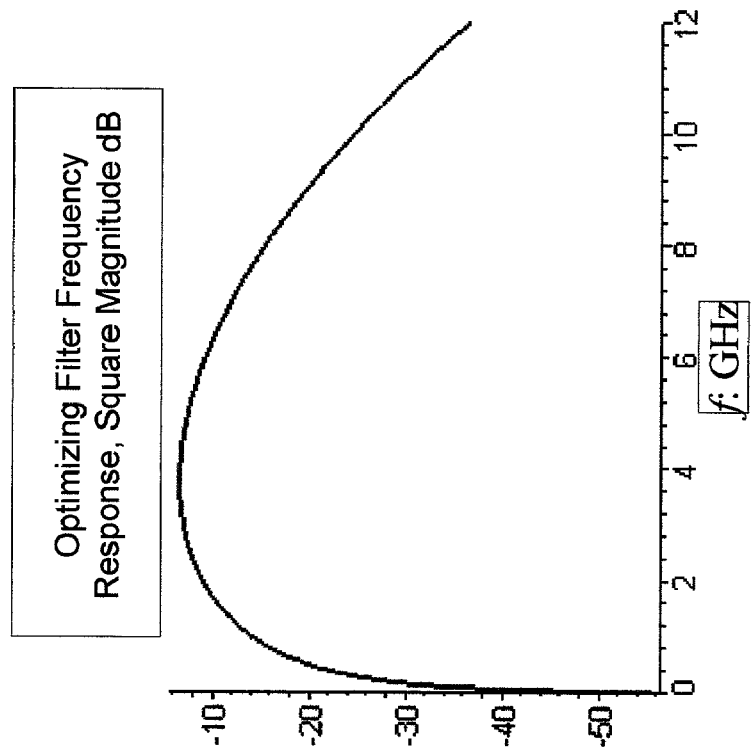
FIGS. 21A and 21B illustrate the time and frequency response relating to an exemplary optimizing filters.
Figure 21A:
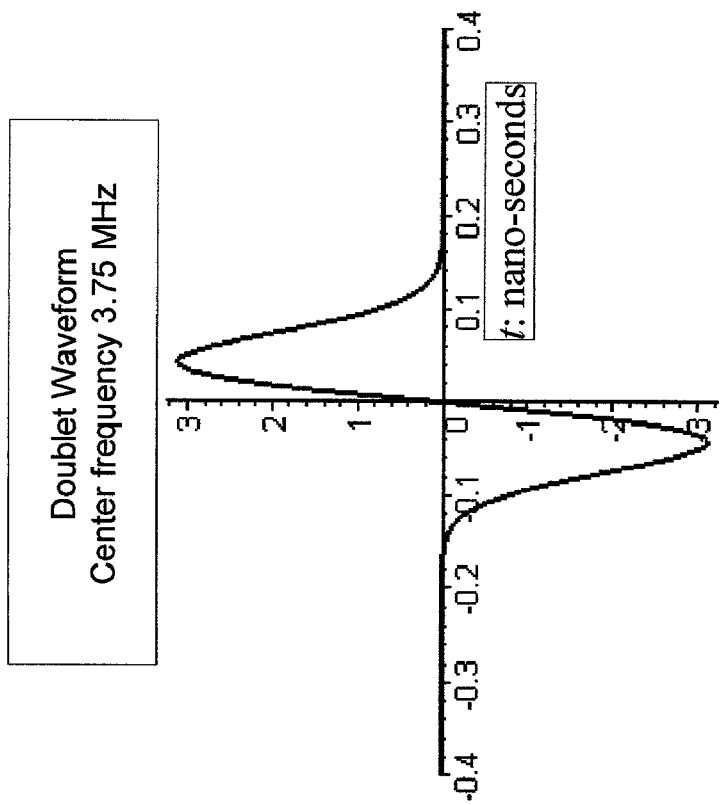

As an example of detect signal manipulation and its effects upon receiver efficiency, consider a matched filter receiver design, i.e., where the filter response, h(t) 2014, is the time-reversed signal. Assume, for example, the signal $$s(t)=Cte^{-2\pi^2 f_c^2 t^2},$$

where C is an arbitrary constant. Assume the signal, s(t) 2011 is a so-called Gaussian monocycle, similar to that shown in FIG. 1A, and widely used as a pulse model for UWB radio and radar systems. In this example, the peak frequency response of the signal occurs at $f=f_c$. FIG. 21A shows a Gaussian doublet waveform with a center frequency, $f_c$, of 3.75 GHz. FIG. 21B displays the frequency response of the filter 2012 from FIG. 20, assuming in this example only that it is a matched filter.

Let m(t) 2018 be a rectangular correlator template signal of variable width W such that $$m(t)=\frac{1}{W}(u(t+W/2)-u(t-W/2))$$

where u is the unit step function. It should be noted that the detect signal, m(t), 2018 has been normalized with the 1/W term, though this is not necessary for the analysis). Since the filter is matched precisely to the signal, the optimal window width is of course W=0, which corresponds to the ideal sampler of the typical matched filter receiver. However, as disclosed above, the perfect ideal sampler is the Dirac delta function, which is merely a theoretical construct. In practice the delta function may only be approximated and therefore, may result in reduced efficiency, i.e. κ<1.

For a practical system, it is useful to understand how fast the receiver efficiency degrades as the window is widened. In this example, the receiver efficiency κ can be computed exactly as a function of template width W; the result is $$\kappa=\frac{\pi^2 f_c^2 W^2 e^{-\frac{1}{2}\pi^2 f_c^2 W^2}}{1-e^{-\pi^2 f_c^2 W^2}}. \qquad (15)$$

Figures 22A, 22B:
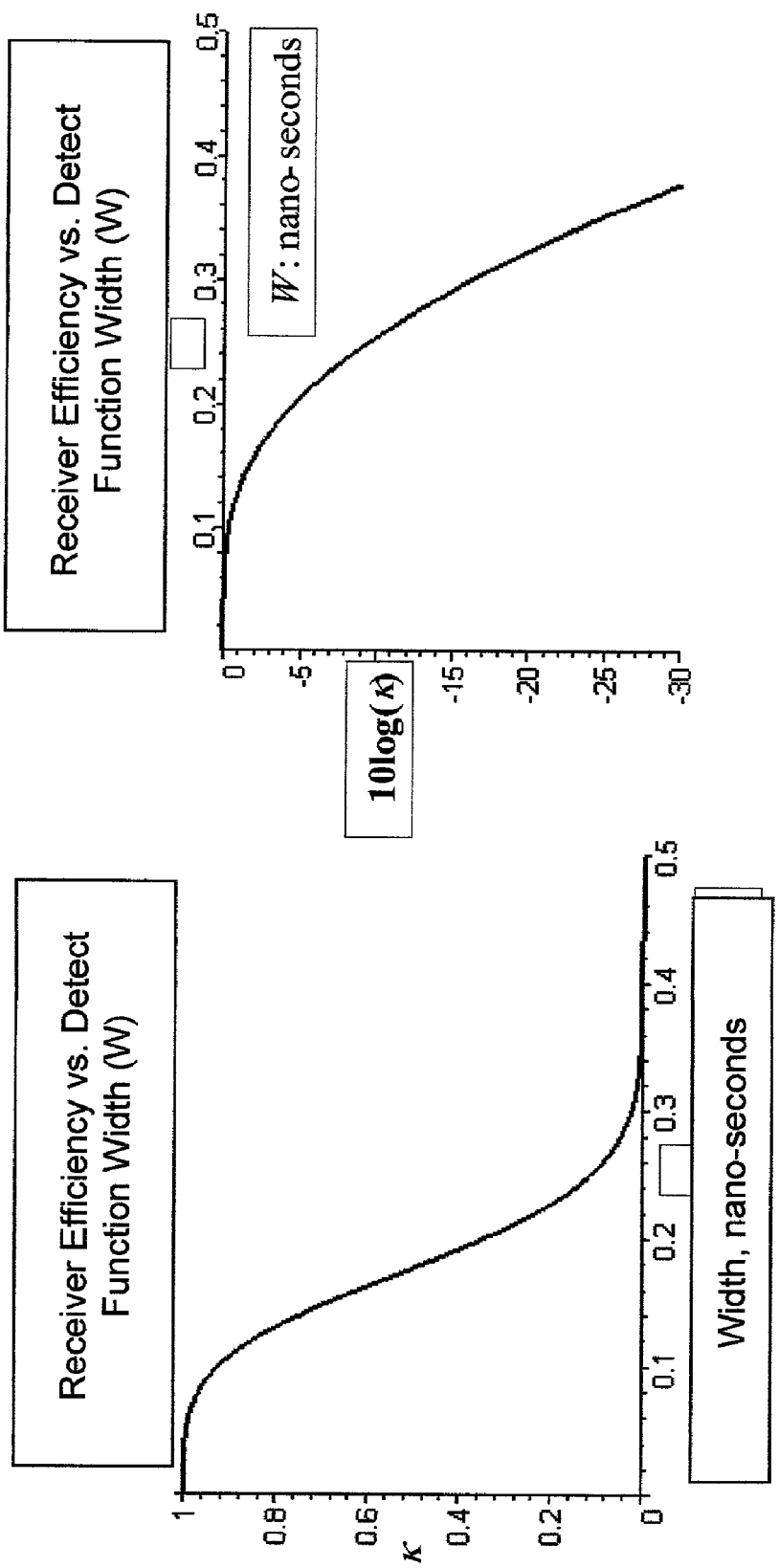
FIGS. 22A and 22B illustrate receiver efficiency of an exemplary system in accordance with the present invention.

FIG. 22 shows a plot of κ versus a plot of template width W. It shows that there is negligible reduction in receiver efficiency over a large range of widths W. This very slow degradation in κ as a function of W can be understood by expanding the expression (8) for κ in a power series about W=0; the result is $$\kappa=1-\frac{1}{24}\pi^4 f_c^4 W^4+\frac{7}{5760}\pi^8 f_c^8 W^8+\cdots$$

Thus, the $1-CW^4$ behavior near W=0 is at the root of the slow decrease of κ near W=0.

Now, using the Gaussian monocycle for s(t) 2011 as an example, the effects of manipulation of the template where the filter response h(t) 2014 is not matched will be shown. In the frequency domain, the representation of s(t) 2011 is $$S(f)=-iC\frac{f}{f_c}e^{-\frac{1}{2}\frac{f^2}{f_c^2}}.$$

For convenience, and merely for this example, the constant $C=C(f_c)$ is selected so that $\|S\|=1$. The receiver bit-template is given by $$m(t)=\frac{e^{-\frac{1}{2}\frac{t^2}{W^2}}}{\sqrt{2\pi}\,W}$$

Note that in this example, m(t) is just a Gaussian "bell-curve" with standard deviation W. The width of m(t) 2018 is approximately 3W. The optimality condition can be used to construct a filter H(f) 2014 that yields in an optimal receiver, i.e. where κ=1. The result, using Equation (3), is $$H(f)=\frac{\overline{S}(f)M(f)}{|M(f)|^2} \qquad (16)$$

$$=iC\frac{f}{f_c}e^{-\frac{1}{2}\frac{f^2}{f_c^2}(1-4\pi^2 W^2 f_c^2)}$$

where C is another arbitrary constant. Note that such a filter is capable of implementation meaning, its impulse response has finite energy, if and only if the discriminant, $1-4\pi^2 W^2 f_c^2$, is positive, or equivalently, $$W<\frac{1}{2\pi f_c} \qquad (17)$$

Edged-Based Detection Using Filter/Detect Signal Manipulation

A functional diagram depicting a filter/detect signal receiver using edge-based detection is shown in FIG. 23A. Referring to this figure, it can be seen that many of the elements are the same as shown in FIG. 20, with the addition of a differentiator 2304 responsive to the filter h(t) 2302 and an integrator 2314 responsive to detect function m(t) generator 2312. This system can be shown to meet the same match filter optimality criteria for best signal to noise in an AWGN channel as the system shown in FIG. 20. Recalling this optimality criteria (Equation 1 from above), i.e. the conjugate of the filter response 2302 correlated with the detect function 2312 should ideally be equal to the signal. Thus:

$$S(f) = \overline{H(f)} \cdot M(f) \quad (1)$$

But, in the system of FIG. 23A, the filter 2302 output is differentiated and the detect function 2312 output is integrated. Recalling the Fourier relationships for differentiation and integration:

$$F\left(\frac{dh(t)}{dt}\right) = 2\pi j f H(f) \quad (20)$$

$$F\left(\int_{-\infty}^{t} m(t) dt\right) = \frac{1}{2\pi j f} M(f) + M(0)\delta(f)$$

By selecting detection functions, m(t) with zero DC component, and substituting equations (20) in to (1):

$$S(f) = \frac{j2\pi f \overline{H(f)} M(f)}{j2\pi f} = \overline{H(f)} M(f)$$

Thus, these two changes maintain the same optimality criteria for the matched filter receiver. It should be noted that it is also possible to maintain the optimality criteria by placing the integral 2314 in the signal path and the differentiator 2304 in the detect function signal path 2312. Furthermore, the detect function generator 2312 could combine the functions of function signal generation and integration or differentiation to produce the desired detect signal S5, shown in FIG. 23B as a detect signal generator e(t) 2316. Likewise, the signal filter 2302 may combine the filter transfer function hI(t) and differentiation (or integration) to produce a composite transfer function, g(t) 2306. Additionally, direction of the transition in the detect signal m(t) may be altered by simply-inverting this signal.

Figure 23:
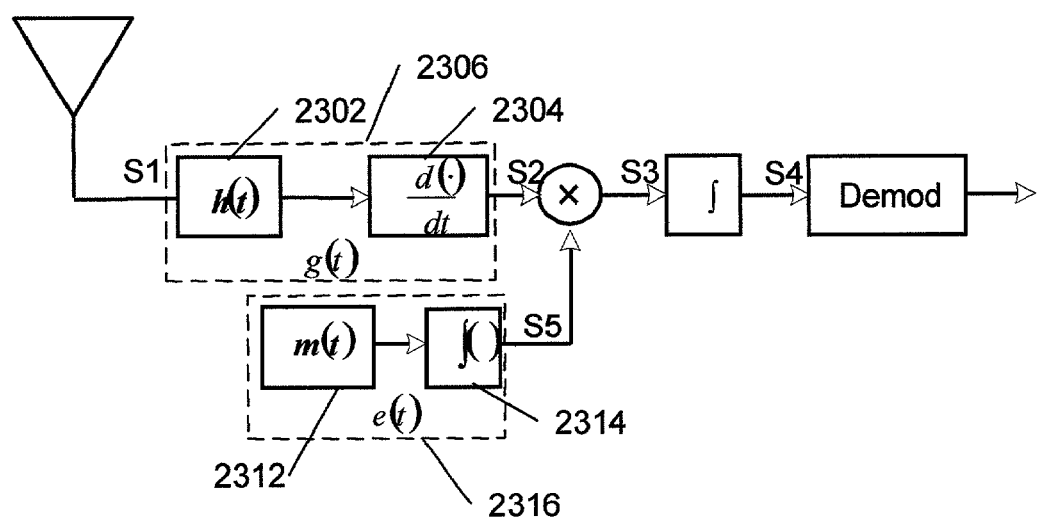
FIG. 23 is a system block diagram showing a relationship of an embodiment of the present invention to conventional analysis methods.
Figure 24:
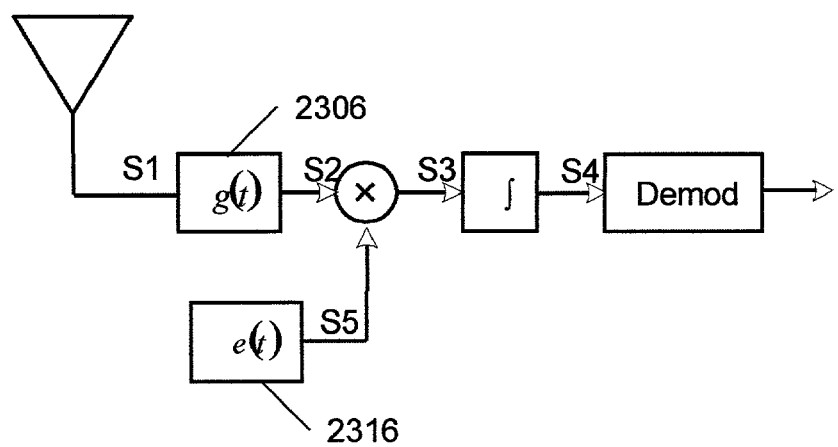
FIG. 24 is a system block diagram of one embodiment of the present invention.
Figure 25:
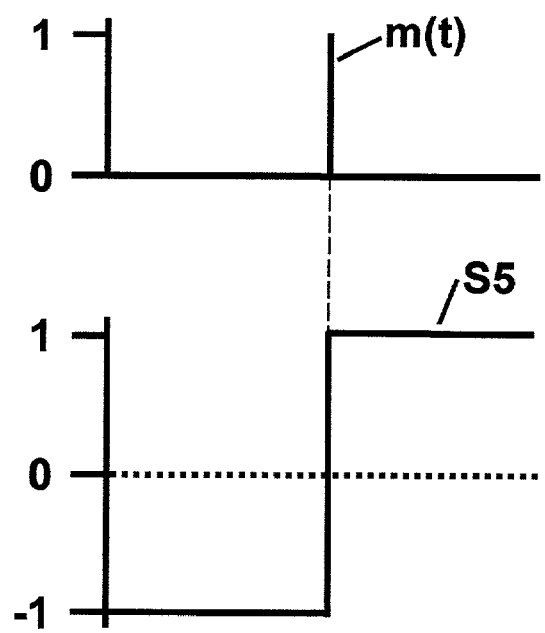
FIGS. 25–37 illustrate possible useful detection functions.
Figure 27:
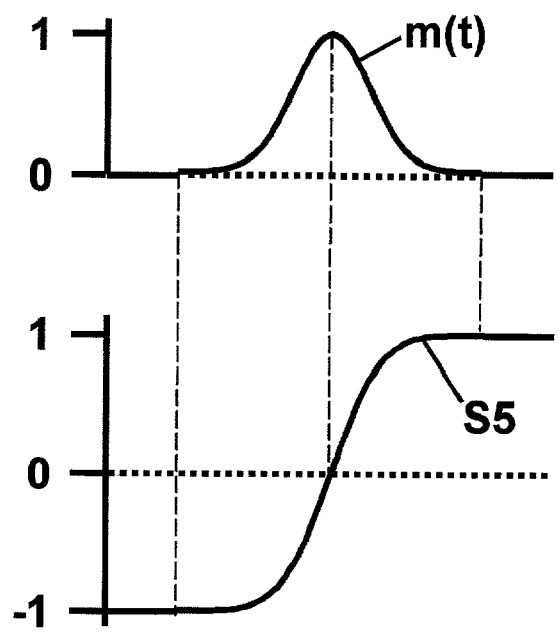
Figure 28:
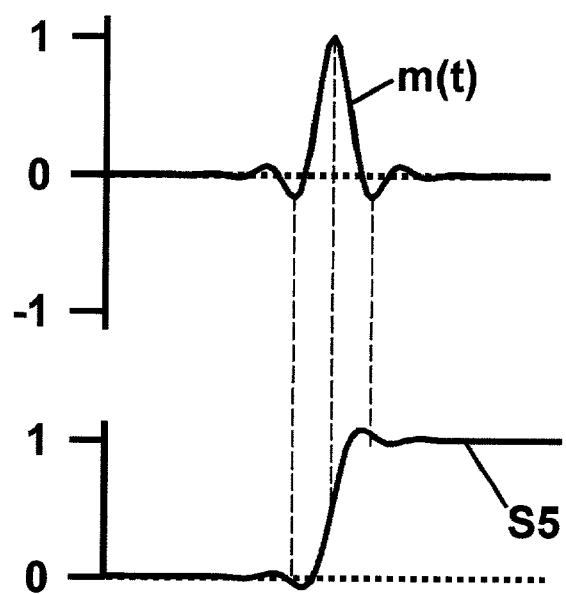

FIGS. 25 through 37 illustrate some examples of detect generator functions m(t) with their associated integrals that can be used to generate detect signals e(t) S5 for use in the system of FIG. 23. FIG. 25 illustrates an idealized delta function m(t). The integral S5 is an idealized step function, or idealized digital rising edge. FIG. 26 illustrates an idealized square sampling pulse m(t). The integral S5 is an idealized ramp. This ramp would be a first order model of a digital rising edge with the rise time modeled by the rise time of S5. FIG. 27 is an idealized Gaussian sampling pulse m(t). The integral S5 is an idealized Gaussian ramp. This could be representative of a typical high speed rising edge with curved beginning and ending. FIG. 28 depicts a Gaussian enveloped sine pulse detect signal function m(t) along with its integral S5.

Figure 29:
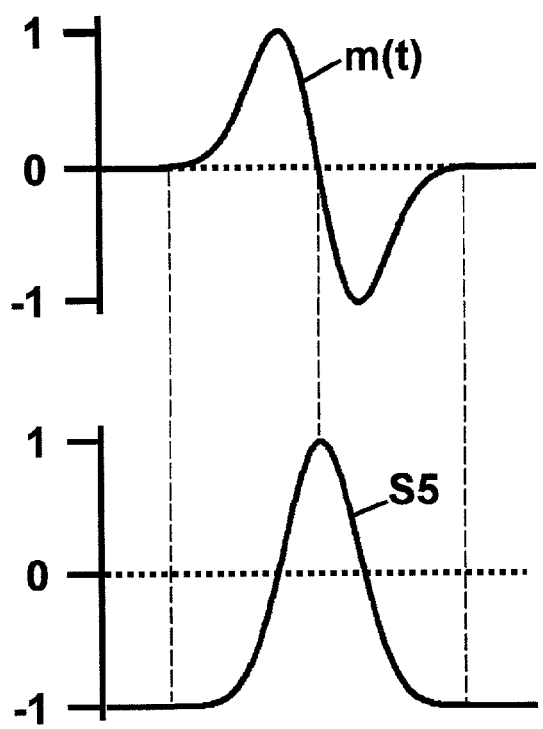
Figure 30:
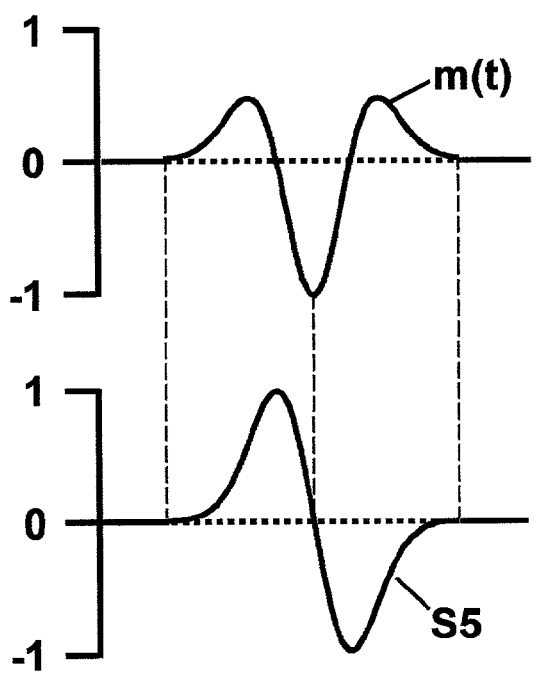
Figure 31:
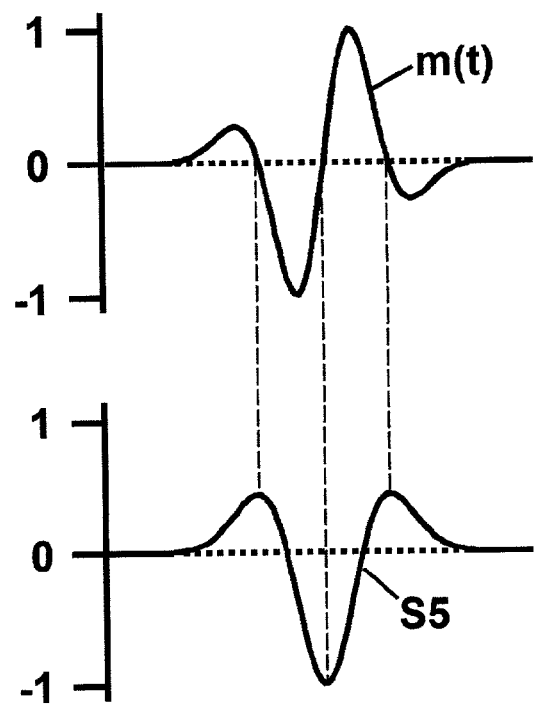

FIGS. 29–37, depict multiple edge detection signals suggested by the integral relationship. FIG. 29 depicts a Gaussian doublet sampling pulse m(t) with a Gaussian pulse as the integral S5. This is an extension of the single edge concept to two edges. Note also that a system using a doublet in the match detect embodiment could use a single pulse in the integral match function embodiment. This suggests a potential for simplification. FIG. 30 represents a system with a Gaussian triplet match template m(t). The integral detect signal S5 is a doublet in this case. Also suggesting potential for simplification of the hardware. FIG. 31 a fourth order Gaussian pulse m(t) and its integral S5.

Figure 32:
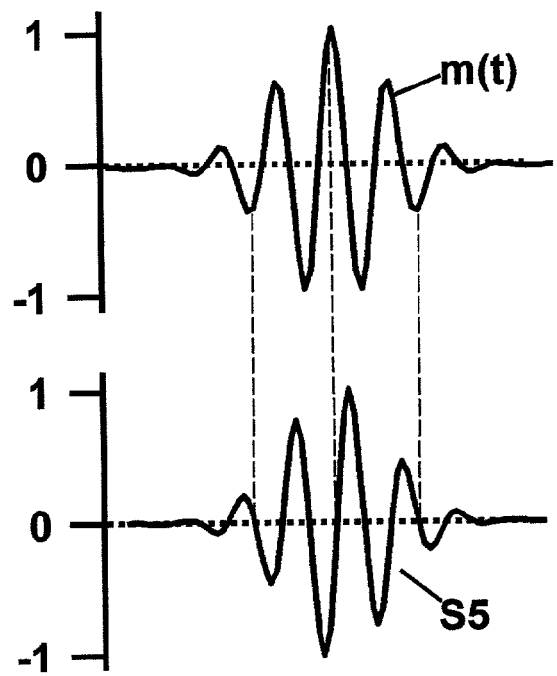
Figure 33:
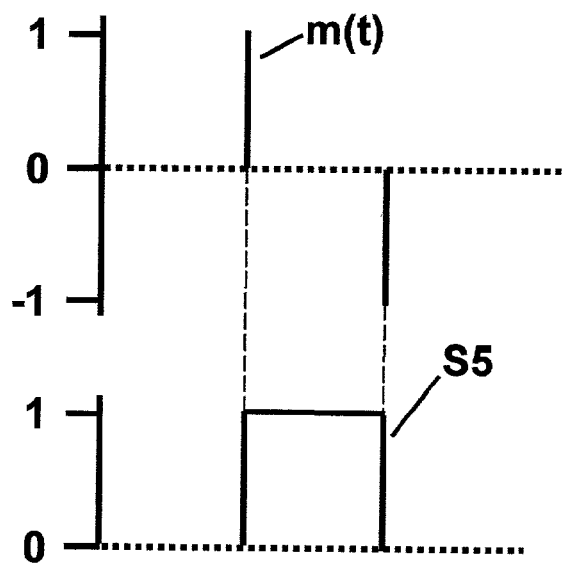
Figure 34:
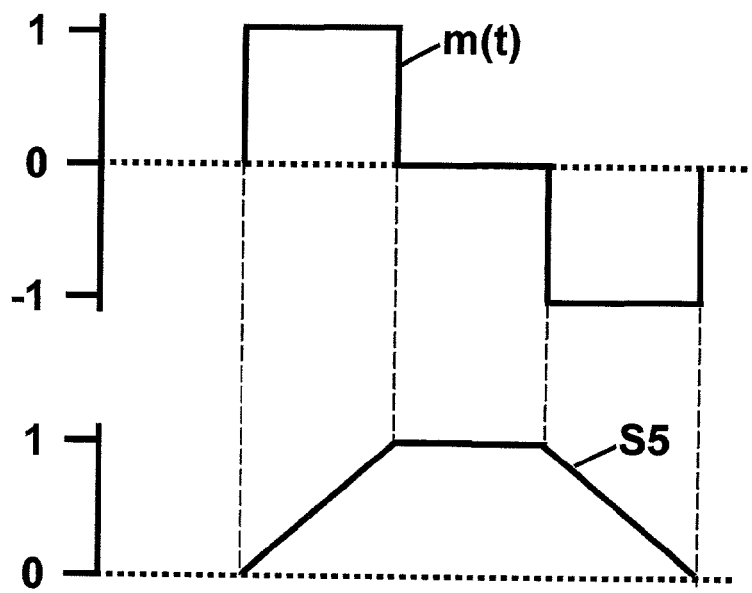
Figure 35:
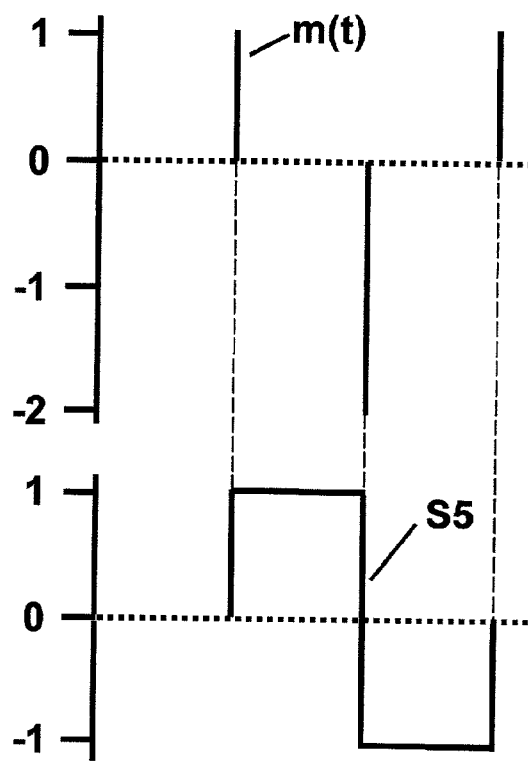
Figure 36:
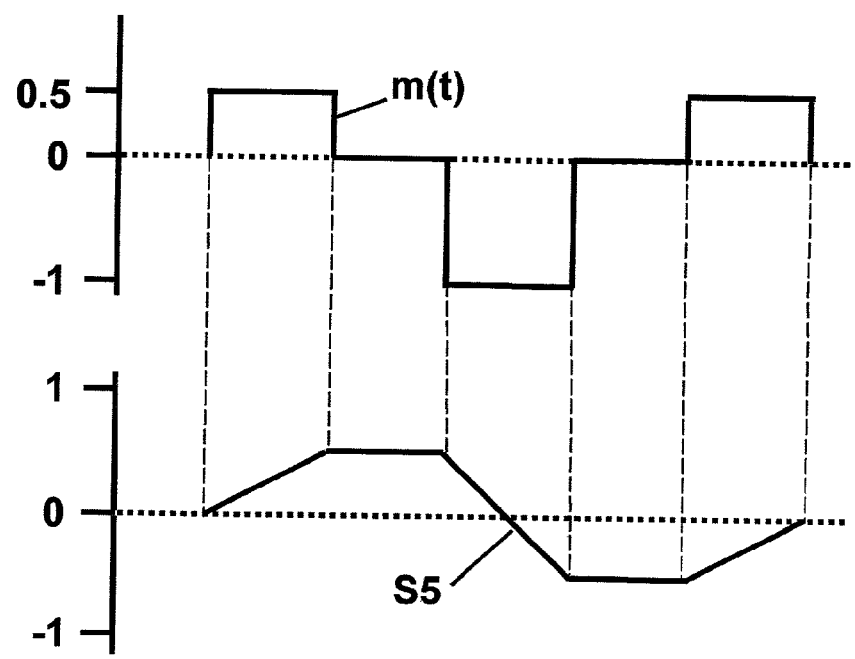
Figure 37:
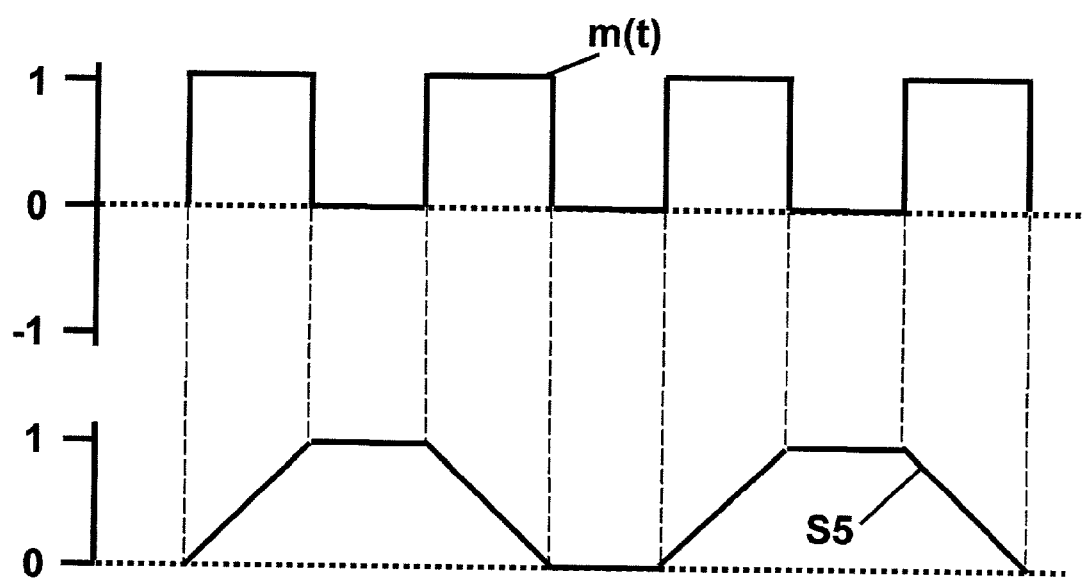

FIG. 32 illustrates another Gaussian enveloped sine pulse m(t) and its integral S5 function. The increased number of zero crossings as shown in this pulse typically indicate a more narrow band system. FIG. 33 represents a system with a dual impulse sample function m(t) with two pulses of opposite polarity. The integral detect signal S5 is a rectangular sample pulse. FIG. 34 represents a more realistic system of FIG. 33 where the rise times of the integral sample pulse S5 are modeled and the equivalent rectangular pulse samples are shown in the detect function m(t). FIG. 35 represents a triplet of impulse sample functions m(t) and the corresponding integral detect signal S5. FIG. 36 represents a triplet m(t) of FIG. 35 with the rise times of the integral detect signal S5 represented. Finally, FIG. 37 represents a multicycle sample function m(t) and the equivalent integral detect signal S5.

Figure 38A:
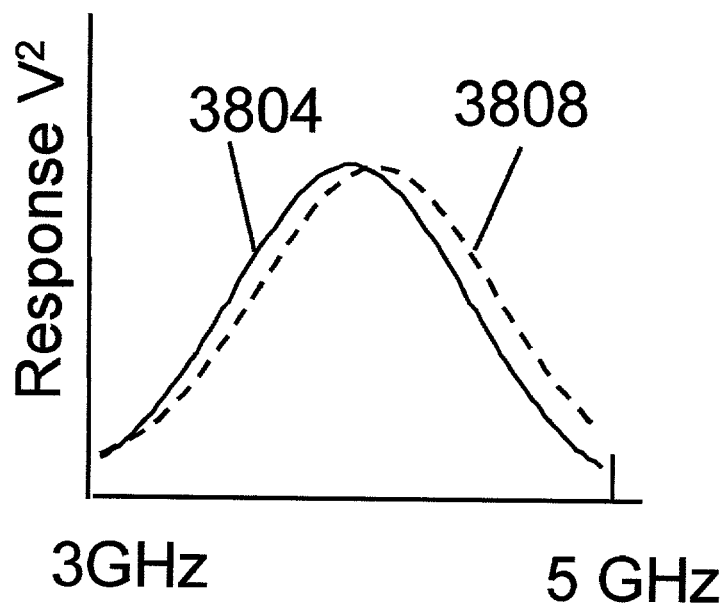
FIGS. 38A and 38B illustrate the frequency response of a typical single transition detect function.

FIG. 38A illustrates the spectral response shift imparted by the differentiator. An exemplary received signal frequency response curve 3804 of the filter output 2302 associated with receiving a Gaussian monocycle pulse similar to that shown in FIG. 1A. Juxtaposition with the frequency response of the differentiated output 3808, signal S5 from FIG. 23 occurring after the differentiator element 2304 shows an incidental benefit of using the differentiator is that the frequency response is shifted to enhance the higher frequencies.

Figure 38B:
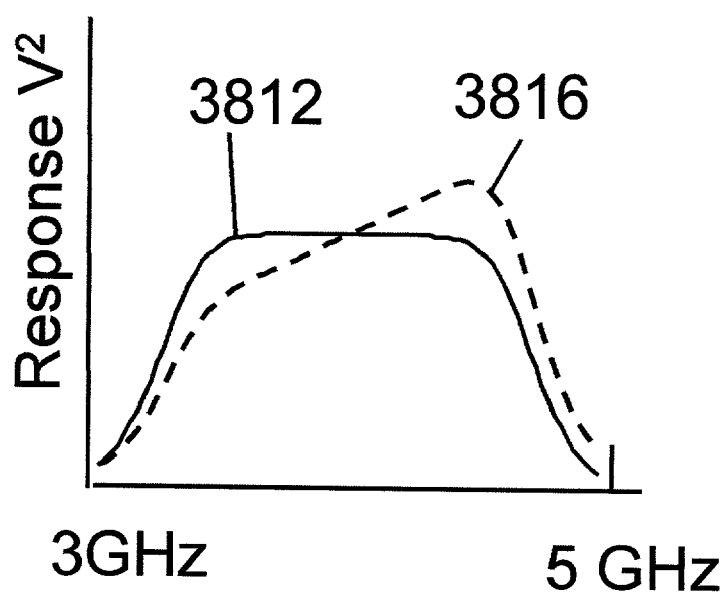
Figure 39A:
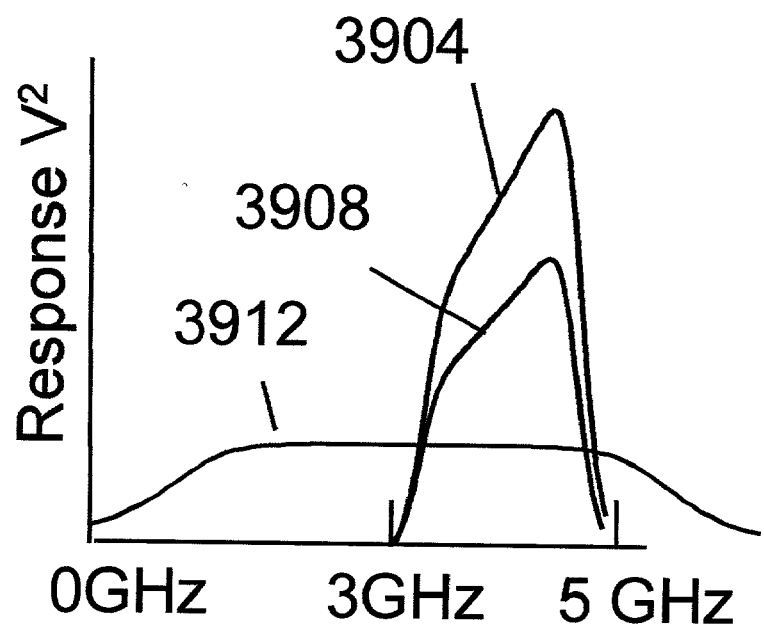
FIGS. 39A and 39B illustrate potential internally generated noise.
Figure 39B:
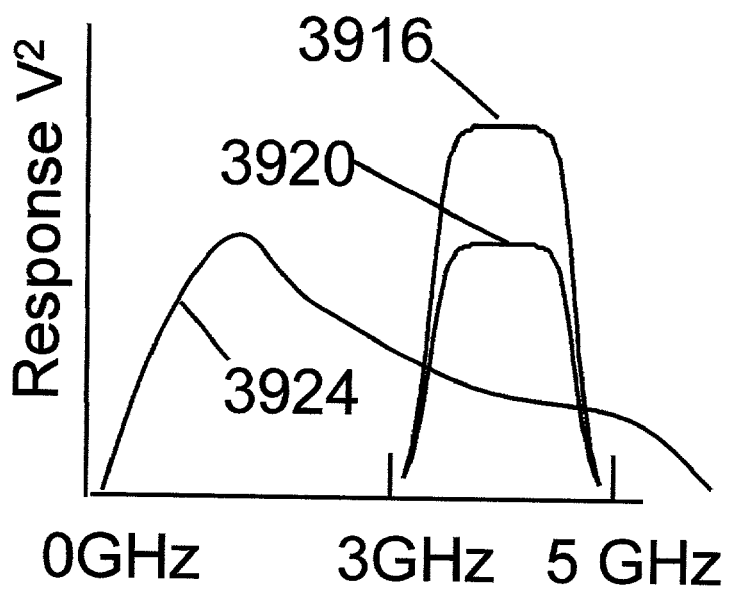

Similarly, FIG. 38B illustrates the effect of the differentiator 2304 on a band limited system with a flat frequency response in the pass band. The rounded corners represent the effect of realistic filters. The band illustrated is from 3 GHz to 5 GHz as might be utilized in a UWB application. In FIG. 38B, the response of the system filter without differentiation 3812 compared to the system frequency response with differentiation 3816 shows again that the higher frequencies are enhanced as a result of the differentiator 2304. The two response plots are normalized to the same response at the center frequency. Again, it should be noted that the system filter 2302 and differentiator 2304 may be combined into a single filter with the composite transfer function, g(t) 2306.

It is envisioned that many features of the various embodiments described herein can be controlled by a processor (not shown). The processor can control both the detection signal generator and, in a dual-stage configuration, the second stage code generator or there can be separate processors for each stage. The processor can be implemented by a field programmable gated array (FPGA), a central processing unit (CPU) with a memory or other logic device.

The processor in effect comprises a computer system. Such a computer system includes, for example, one or more processors that are connected to a communication bus. The computer system can also include a main memory, preferably a random access memory (RAM), and can also include a secondary memory. The secondary memory can include, for example, a hard disk drive and/or a removable storage drive. The removable storage drive reads from and/or writes to a removable storage unit in a well-known manner. The removable storage unit, represents a floppy disk, magnetic tape, optical disk, and the like, which is read by and written to by the removable storage drive. The removable storage unit includes a computer usable storage medium having stored therein computer software and/or data.

The secondary memory can include other similar means for allowing computer programs or other instructions to be loaded into the computer system. Such means can include, for example, a removable storage unit and an interface. Examples of such can include a program cartridge and cartridge interface (such as that found in video game devices), a removable memory chip (such as an EPROM, or PROM) and associated socket, and other removable storage units and interfaces which allow software and data to be transferred from the removable storage unit to the computer system.

Computer programs (also called computer control logic) are stored in the main memory and/or secondary memory. Computer programs can also be received via the communications interface. Such computer programs, when executed, enable the computer system to perform certain features of the present invention as discussed herein. In particular, the computer programs, when executed, enable a control processor to perform and/or cause the performance of features of the present invention. Accordingly, such computer programs represent controllers of the computer system of a transceiver.

In an embodiment where the invention is implemented using software, the software can be stored in a computer program product and loaded into the computer system using the removable storage drive, the memory chips or the communications interface. The control logic (software), when executed by a control processor, causes the control processor to perform certain functions of the invention as described herein.

In another embodiment, features of the invention are implemented primarily in hardware using, for example, hardware components such as application specific integrated circuits (ASICs) or field-programmable gated arrays (FPGAs). Implementation of the hardware state machine so as to perform the functions described herein will be apparent to persons skilled in the relevant art(s). In yet another embodiment, features of the invention can be implemented using a combination of both hardware and software.

As always, a variety of design tradeoffs are available to allow one skilled in the art to optimize performance to meet the requirements of a particular application. As described above and shown in the associated drawings, the present invention comprises a new method and apparatus for converting signals to baseband signals. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

What is claimed is:

1. A method of converting a radio frequency signal to a baseband signal, said radio frequency signal comprising a plurality of impulses, comprising the steps of:
    a. changing each of said plurality of impulses into rectified pulses by mixing with said radio frequency signal a detect signal, said detect signal comprising precisely timed detecting transitions, such that said detecting transitions occur substantially coincident with a zero-crossing of each of said impulses; and
    b. obtaining said baseband signal by integrating one or more rectified pulses.

2. The system according to claim 1, wherein said detecting transitions are substantially instantaneous.

3. The method according to claim 2, further comprising the steps of:
    a. obtaining a decoded signal by mixing with said rectified pulses a decode signal; and
    b. obtaining said baseband signal by integrating said decoded signal.

4. The method according to claim 2, wherein said detecting transitions are functions, M(f), such that $$M(f) = \frac{S(f)H(f)}{|H(f)|^2}$$

where S(f) is a received signal in the frequency domain, H(f) is a filter response in the frequency domain such that where f is frequency and t is time.

$$H(f) \neq \begin{cases} e^{-2\pi jft}S(f), \\ 1 \end{cases}.$$

5. The method according to claim 2, wherein said detecting transitions are functions, E(f), such that $$E(f) = \frac{S(f)G(f)}{|G(f)|^2}$$

where S(f) is a frequency domain expression of a received signal, and G(f) is a frequency domain expression of a differentiated filter response where f is frequency.

6. The method according to claim 1, wherein said detect signal comprises said detecting transitions and sloped non-detecting transitions.

7. The method according to claim 1, wherein said detecting transitions are non-instantaneous.

8. The method according to claim 7, wherein said detecting transitions are functions, M(f), such that $$M(f) = \frac{S(f)H(f)}{|H(f)|^2}$$

where S(f) is a received signal in the frequency domain, H(f) is a filter response in the frequency domain such that where f is frequency and t is time.

$$H(f) \neq \begin{cases} e^{-2\pi jft}S(f), \\ 1 \end{cases}.$$

9. The method according to claim 7, wherein said detecting transitions are functions, E(f), such that $$E(f) = \frac{S(f)G(f)}{|G(f)|^2}$$

where S(f) is a frequency domain expression of a received signal, and G(f) is a frequency domain expression of a differentiated filter response where f is frequency.

10. An apparatus for converting a radio frequency signal to a baseband signal, said radio frequency signal comprising a plurality of impulses, comprising:
    a. an antenna for receiving the radio frequency signal;
    b. a detect signal generator, an output of said detect signal generator being a detect signal comprised of a plurality of transitions substantially coincident with zero-crossing of each of said impulses, said detect signal generator comprising:

i. a code source;

ii. a timing generator coupled to said code source; and iii. a transition signal generator responsive to said timing generator;

c. a first multiplier responsive to said antenna and to said detect signal generator, said first multiplier having a rectified output; and d. a means for integrating said rectified output responsive to said first multiplier to produce the baseband signal.

11. The apparatus according to claim 10, further comprising:

a. a decode signal generator;

b. a second multiplier responsive to said first multiplier and to said decode signal generator, said second multiplier having a decoded output; and c. a means for integrating said decoded output responsive to said second multiplier.

12. The apparatus according to claim 10, further comprising a filter responsive to said antenna coupled to said first multiplier, said filter having a filter response, H(f), such that $$H(f) \neq \begin{cases} e^{-2\pi jft}S(f), \\ 1 \end{cases}$$

where S(f) is a received signal, f is frequency and t is time, and wherein said detect signal generator has an output, M(f), such that $$M(f) = \frac{S(f)H(f)}{|H(f)|^2}.$$

13. The apparatus according to claim 12, further comprising a differentiator responsive to said filter and an integrator responsive to said detect signal generator.

14. The apparatus according to claim 12, further comprising an integrator responsive to said filter and a differentiator responsive to said detect signal generator.

15. The apparatus according to claim 10, further comprising:

a. one or more second stage correlators coupled to said first multiplier and responsive to a second stage decode signal generator; and b. means for integrating output of said one or more second stage correlators responsive to said second stage correlators.

16. The apparatus according to claim 15, further comprising a buffer responsive to said first multiplier and having an output sent to said one or more second stage correlators.

17. The apparatus according to claim 15, further comprising a high pass filter responsive to said first multiplier and having an output sent to said one or more second stage correlators.

18. The apparatus according to claim 15, further comprising a low pass filter responsive to said first multiplier and having an output sent to said one or more second stage correlators.

* * * * *